United States Patent [19]
Koo

[11] Patent Number: 5,430,586
[45] Date of Patent: Jul. 4, 1995

[54] TAPE EXTRACTOR AND PAD LIFTER FOR EXTRACTING TAPE FROM A CASSETTE CENTER WELL, AND RELATED METHOD

[76] Inventor: Kah O. Koo, 803-6631 Minoru Boulevard, Richmond, British Columbia, Canada, V6Y 1Z1

[21] Appl. No.: 977,267
[22] Filed: Nov. 16, 1992

Related U.S. Application Data

[63] Continuation-in-part of Ser. No. 923,840, Aug. 3, 1992.

[51] Int. Cl.⁶ .......................................... G11B 15/665
[52] U.S. Cl. ........................................................ 360/95
[58] Field of Search ............................ 360/84, 85, 95; 242/197, 198, 199, 200, 338

[56] References Cited

U.S. PATENT DOCUMENTS

| | | | |
|---|---|---|---|
| 2,911,215 | 11/1959 | Cousino | 271/2.18 |
| 3,612,539 | 10/1971 | Bragas et al. | 274/4 C |
| 3,759,465 | 9/1973 | Janssen et al. | 242/199 |
| 3,770,902 | 11/1973 | Witt | 179/100.2 |
| 3,784,761 | 1/1974 | Moritan et al. | 360/85 |
| 3,797,036 | 3/1974 | Eibensteiner | 360/85 |
| 3,823,896 | 7/1974 | Finkelstein | 242/191 |
| 3,825,944 | 7/1974 | Terao et al. | 360/85 |
| 3,902,680 | 9/1975 | Neff | 242/198 |
| 4,050,087 | 9/1977 | Kishi | 360/96 |
| 4,117,520 | 9/1978 | Kajino et al. | 360/95 |
| 4,130,848 | 12/1978 | Amano et al. | 360/132 |
| 4,323,936 | 4/1982 | Beltler et al. | 360/85 |
| 4,413,293 | 11/1983 | Hathaway | 360/85 |
| 4,814,910 | 3/1989 | Kaku et al. | 360/85 |
| 4,933,788 | 6/1990 | Patel et al. | 360/85 |
| 4,970,612 | 11/1990 | Renders et al. | 360/95 |
| 4,974,101 | 11/1990 | Sturm et al. | 360/90 |
| 5,014,140 | 5/1991 | Nishida et al. | 360/85 |

FOREIGN PATENT DOCUMENTS

| | | |
|---|---|---|
| 0187024 | 7/1986 | European Pat. Off. |
| 55-160363 | 12/1980 | Japan |
| 2195488 | 4/1988 | United Kingdom |

OTHER PUBLICATIONS

Nakamichi CR-7A/CR-5A—"Discrete Head Cassette Decks".
Nakamichi 680ZX/670ZX/660ZX —"Auto Azimuth Alignment".
Nakamichi 680—"2-Speed Discrete Head Cassette Deck" Above Brochures all Published Prior to 16 Nov. 1991.
Patent Abstract of Japan JP, A,58 001 848 (Fujitsu K.K.) 07 Jan. 1983.
2 Sheets of Inventor's Explanatory Sketches of Conventional Pressure Pad Lifters (Unpublished).

*Primary Examiner*—Stuart S. Levy
*Assistant Examiner*—William R. Korzuch
*Attorney, Agent, or Firm*—Bull, Housser & Tupper

[57] ABSTRACT

The invention permits extraction of a magnetic tape from a conventional audio cassette for processing the tape externally of the cassette to reduce prior art tape-to-head alignment problems. A tape holder is first retracted and inserted in to a cassette well and is then extended adjacent an inside face of the tape. Prior to extracting the tape, tape guides are inserted into the well to prevent undesirable contact between extracted tape portions and the cassette body. The tape holder draws a length of extracted tape from the cassette so that the tape passes a fixed magnetic head as the tape holder attains a final position, or alternatively, as the tape holder approaches a final position, the head is moved to contact the extracted length of tape. In some embodiments, the tape is extracted from one of the two outer wells of the cassette, in which case the remaining outer well provides access for one capstan and pressure roller only. In other embodiments, a pad lifter displaces the pressure pad in the center well of the cassette, to permit extraction of the tape from the center well, thus permitting a capstan and pressure roller to access both outer wells.

37 Claims, 41 Drawing Sheets

Fig. 2 (Mode I)

Fig. 3 (Mode A)

Fig. 4 (Mode C)

Fig. 5 (Mode E)

Fig. 6 (Mode H)

Fig. 7 (Mode J)

Fig. 21 (Mode A)

Fig. 22 (Mode C)

Fig. 23 (Mode E)

Fig. 30 (Mode A)

Fig. 31 (Mode B)

Fig. 32 (Mode C)

Fig. 33 (Mode D)

Fig. 34 (Mode E)

TAPE EXTRACTOR AND PAD LIFTER FOR EXTRACTING TAPE FROM A CASSETTE CENTER WELL, AND RELATED METHOD

CROSS REFERENCES TO RELATED APPLICATIONS

This is a continuation-in-part of my co-pending application Ser. No. 07/923,840, filed 3 Aug. 1992 and entitled "TAPE CASSETTE PROCESSING APPARATUS AND METHOD".

BACKGROUND OF THE INVENTION

The invention relates to an apparatus and method for processing a magnetic tape housed within a cassette, in particular for performing all normal functions such as record, playback, fast forward, rewind, search and cue etc. on a conventional audio cassette.

To overcome problems associated with prior art so-called "open reel" or "reel-to-reel" tape recorders, Philips Export BV of The Netherlands introduced the so-called "Compact Cassette". The term "Philips", "Compact Cassette", "Digital Compact Cassette" and "DCC" as used herein are trademarks or terms associated with Philips Export BV of The Netherlands. This cassette has been in use for nearly 30 years and was originally developed for low fidelity dictation purposes, where recording fidelity was not a priority. Since then, use of the cassette expanded considerably to include high fidelity music recordings and many problems and shortcomings associated with these new uses were recognized and overcome, but some still remain.

In particular, problems associated with accurate azimuth alignment of the tape as it passes across a magnetic head have not yet been solved satisfactorily at a reasonable cost. Tape alignment is controlled primarily by at least one fixed tape guide located "upstream" of the magnetic head, and by location of the cassette body or shell within the cassette compartment. This is because tape guidance is partially dependent upon guide structures which are integral to the cassette shell itself, and thus errors in the location of the cassette shell and manufacturing errors in the shell itself can contribute to azimuth errors as the tape passes across the magnetic head. Because the tape has a relatively slow tape speed and narrow audio track width, these alignment errors can aggravate azimuth errors in the tape which can contribute to a loss in recording fidelity, particularly for relatively high frequencies. This problem was recognized and many attempts have been made to reduce the problems of azimuth misalignment in tape transports. One approach was to improve accuracy of manufacturing of the cassette shell by using physically stable materials manufactured to close tolerances. While this improved azimuth alignment accuracy to some extent, accumulation of mechanical positioning tolerances between the cassette shell and the cassette compartment, and in other areas tended to detract from recording/playback fidelity. In some expensive recording and playback apparatus, the manufacturer provides a user adjustable head alignment system which, while permitting adjustment for a particular cassette, would require re-adjustment for another cassette or an opposite side of the same cassette due to small dimensional variations among individual cassette shells which can affect effective tape-to-head alignment, particularly when a tape is played back on a machine different from the one it was recorded on. More complex automatic self-aligning head mechanisms require complex electronic and servo-devices which increase the costs considerably.

The above description relates primarily to analog audio cassette tapes, and while digitally recorded tapes overcome many of the problems inherent with analog tapes, initial accurate alignment of a digital tape with the heads would considerably reduce read/write errors of digital data and thus augment error correction systems in the digital audio processor to provide a robust high fidelity recording and playback system.

One approach to avoid cassette shell problems is to extract the tape from the cassette for recording and playback. In the video cassette field, it is well known to provide a cassette which is specifically adapted to permit the tape to be automatically extracted or withdrawn from the cassette and loaded onto a drive mechanism for processing. Such cassettes are specially adapted to permit easy withdrawal of the tape by providing a hinged or sliding gate mechanism along a front edge of the cassette, which is opened to facilitate access for extraction of the tape when appropriate. The tape is extracted from the cassette because the video head is too large to be accepted in the cassette and requires an extensive tape wrap and precise head to tape alignment for proper recording and playback of video and audio signals. There are many patents on video cassette mechanisms, all of which show moveable gates to permit easy access to the tape for extraction. Some advanced audio cassette also show movable gates to permit easy access to the tape.

U.S. Pat. Nos. 3,797,036 (Eibensteiner) and 4,323,936 (Beitler et al) both issued to U.S. Philips Corporation, and U.S. Pat. Nos. 3,825,944 (Terao et al) and 4,413,293 (Hathaway) issued to Victor Company of Japan and Ampex Corporation respectively, disclose video cassette transport mechanisms. U.S. Pat. Nos. 4,050,087 (Kishi et al) and 4,130,848 (Amans et al) both issued to Sony Corporation disclose an audio transport and cassette termed Elcaset (Trademark). U.S. Pat. No. 4,814,910 (Kaku et al) issued to Hitachi Corporation discloses a Betamax (Trademark) video transport, and U.S. Pat. No. 4,933,788 (Patel et al) issued to Seagate Corporation, discloses an audio/data transport, the so-called DAT (Digital Audio Tape) cassette.

The Compact Cassette was not designed for easy, automatic tape extraction and has a fixed processing edge portion with access openings or "wells" to permit access to the tape for engagement by one or more magnetic heads, and at least one set of a pinch roller and capstan for driving the tape. The wells at the processing edge portion of the cassette are defined by webs which extend transversely between edges of the generally flat, broad parallel faces of the cassette. These webs are intended to enclose part of the exposed portion of tape running across the processing edge of the cassette body to minimize tape spillage and are not normally in contact with the tape surface. Thus, such webs generally have relatively rough surface features, often including a seam defining the shell halves, which in applicant's opinion, present a potential hazard of tape damage to a length or loop of tape as it is extracted from the cassette because they are not intended to guide the tape.

The present applicant is aware of two patents showing structure for extracting the magnetic tape generally perpendicularly from a conventional Compact Cassette, and for loading the tape into a transport mechanism for processing the tape externally of the cassette. Neither of the patents disclose that the tape is extracted for improvement of tape-to-head alignment accuracy or recording/playback fidelity. The first of these patents, namely U.S. Pat. No. 3,612,539 is issued to Blaupunkt Werke GmbH, and the inventor is Peter Bragas. This patent provides a long, variable length of extracted tape loop for educational use, in which a time-delayed effect between different sound tracks on the tape can be achieved by scanning the extracted tape. The tape is drawn from the cassette through an end well of the cassette and along a path generally at right angles to the cassette. It would appear that the tape is drawn across inwardly facing edges of a web which could result in damage to the tape surface. Few details are given on the means of locating the magnetic heads adjacent the tape, or of driving the tape.

The second patent is U.S. Pat. No. 3,902,680 issued to the Bell and Howell Company, in which the inventor is Joseph J. Neff. This patent discloses a relatively complex mechanical "escalator" mechanism for drawing a tape through the center well of the cassette for the purpose of improving versatility and performance and overcoming problems with the size of the magnetic heads and speed stability inherent in the early cassette mechanisms. When the tape is extracted from the cassette, the escalator mechanism skews the tape vertically from an original plane, i.e. moves the tape laterally out of a plane containing edges of tape wound on the supply and take-up reels. Since tape or back tension is almost always necessary during a loading process to keep the tape taut while being threaded, chances of tape damage are increased if the tape is skewed vertically while back tension is applied. While this reference shows the extracted tape loop passing around rollers as the tape leaves and enters the cassette well, the rollers do not pass into the well, and thus it appears that the tape contacts inwardly facing front edges of a web adjacent the well, which contact could damage the tape due to the relatively rough surfaces of these edges which originally were not intended to contact the tape surface.

In both patented structures described above, the tape drawn from the cassette passes in a generally U-shaped tape loop and the only areas available for magnetic head contact with the tape are the "straight" sides of the loop. In this arrangement, relatively high tape back tension on the supply reel is necessary to provide sufficient tension for proper head contact which can aggravate wear of the tape. To provide clearance for the escalator mechanism to withdraw the tape, the magnetic head assembly is positioned initially remotely from the tape, and then is moved to contact the tape when recording/playback operations are required. Furthermore, in both structures, the tape extraction mechanism extends some considerable distance from the cassette which would result in a bulky mechanism which would clearly be unacceptable for many applications of portable devices commonly used nowadays.

Magnetic tape transports which use a conventional capstan and pinch roller drive for transportation of the tape can use one of two common methods to generate contact pressure between the tape and a magnetic head to ensure proper tape-to-head contact for scanning of the tape. The first method is employed on high performance tape transports, and involves maintaining a specific tape tension across the heads so that the tape is wrapped sufficiently tightly across all magnetic heads. This tape tension may be generated by a suitable amount of reverse torque or frictional drag on the supply reel hub on single capstan drive transports, thus creating back tension. On more sophisticated transports, dual capstan drive is used to generate tape tension between a supply side capstan and a take-up side capstan. The dual capstan drive introduces a drag on the tape by feeding the tape through the supply capstan and corresponding pinch roller assembly slightly slower than through the take-up capstan and corresponding pinch roller assembly.

However, on many tape transports such as those designed for the Compact Cassette and Digital Compact Cassette, the use of a back tension control mechanism or dual capstan drive method increases the cost of the transport itself somewhat and is therefore omitted on lower performance transports. To compensate for such mechanical deficiencies, the second method attains acceptable tape-to-head contact in such cassette apparatus by using a pressure pad assembly provided in the center head well of the cassette body. The pad assembly usually consists of a piece of low-shedding felt cut to specific dimensions, mounted on a resilient metallic spring plate which can engage the tape while the tape is passed across the magnetic head when inserted into the head well of the cassette. While the presence of the pressure pad assembly ensures that the cassette will function properly in a range of tape transports having vastly different qualities, on transports which have proper tape tension control as described above, the pressure pad assembly is unnecessary and in fact becomes a source of mechanical problems for accurate tape transport. Because the pressure pad assembly must be a loosely anchored structure, it can be a potential cause of tape skewing and misalignment. In addition, physical contact between the pad material and the moving tape surface introduces what is known as "scrape flutter" into the tape itself, i.e. as the tape scrapes by the pad, frictional vibration causes the tape portion in the vicinity of the pad to resonate or flutter, thus muddling the sound quality in an analog cassette apparatus. In a digital cassette apparatus, severe scrape flutter can cause read/write errors of digital data.

To eliminate adverse effects of the pressure pad on high performance equipment, an additional device known as a pressure pad lifter is used to lift the pad away from the tape when inserted magnetic head(s) engage the center head well of the cassette. Pad lifters are used only on apparatus which have some form of tape tension control to maintain tape-to-head contact in the absence of the pressure pad in the tape path. Although a number of variations of pad lifters have been used in the prior art, all forms of the pad lifter known to the applicant cooperate with the inserted magnetic head(s) and are usually mounted on the head(s) or closely adjacent the head. The pressure pad is lifted away from the tape, without interference with the tape, by engaging margin portions of the pressure pad on opposite sides of the pad material which extend beyond the width of the tape. Pad lifters have appeared in the forms of a shield, nodules and a forked guide. The pad lifter in prior art defeats the pressure pad when the inserted magnetic head(s) engage the tape.

SUMMARY OF THE INVENTION

The invention reduces the difficulties and disadvantages of the conventional Compact Cassette by providing a means to extract a length of tape from the cassette for driving and processing of the tape clear of the cassette, so that tape and head alignment problems related to inaccuracies of the cassette body are essentially eliminated. Furthermore, the invention provides several embodiments which have particular advantages for specific applications. For example, the most complex embodiment provides a relatively long length of extracted tape which provides sufficient space to locate several magnetic heads, and to use a double capstan drive for improved tape tension control, and to provide ideal means for driving the tape in both directions for recording and playback. Another embodiment is particularly for use with a small magnetic head, and as such provides a relatively compact unit, particularly adapted for mobile "playback-only" units such as personal headphone systems, or automobile units. While the invention is designed primarily to reduce the difficulties associated with the analog Compact Cassette, it can easily be adapted to be utilized for processing the Digital Compact Cassette (DCC). All DCC equipment for processing DCC tapes also has analog Compact Cassette playback capability. Therefore, analog performance of DCC compatible equipment can be improved by use of the invention. Furthermore, the DCC has fewer wells in the cassette shell compared to the Compact Cassette. Therefore, locating tape processing components of the transport mechanism externally to the cassette shell facilitates implementation of analog recording capabilities, if so desired, in a DCC compatible tape transport, which would otherwise be very difficult due to lack of space in the DCC wells to accommodate additional magnetic heads.

The embodiments described above are specifically adapted to extract tape from outer wells of the cassette, namely the supply or reverse well, or the take-up or forward well. This avoids possible interference with the pressure pad located in the center well of all Compact Cassettes. Alternative embodiments of the invention are provided with a pad lifter to displace the pressure pad in the center well, so as to permit access to the center well to extract tape therefrom. With these embodiments, forward and reverse capstans and associated pinch roller assemblies can be provided in both outer wells of the cassette which are now accessible, thus realizing a two capstan tape transport capable of single or double capstan drive configuration with uni-directional or bi-directional capability, and eliminating some of the complexities of the previously described embodiments.

In all embodiments of the invention, tape guide means are inserted into the well of the cassette from which the tape is extracted to prevent undesirable contact between the edges of the cassette well and portions of the extracted tape. Furthermore, in all embodiments, a tape guide is provided immediately adjacent each side of each magnetic head, the tape guides being fixed relative to the respective head to assist in accurate feeding of the tape across the head, thus minimizing tape-to-head alignment errors. In addition, in all embodiments of the invention, all tape guides are parallel to axes of the cassette reels when the guides are in contact with the tape, and means are provided to ensure there is no movement of the tape parallel to the axes of the cassette reels. Thus, opposite edges of the extracted portion of the tape are always disposed within respective parallel planes containing edges of the tape carried on the reels, and thus the extracted portion of tape is not skewed as it passes out of the cassette well and returns to the well, thereby minimizing tape stresses.

A tape processing apparatus according to the invention is for processing a data bearing tape cassette and comprises a cassette body holding means for holding the cassette, a tape shifter, a tape holder, tape shifter rotating means and tape holder rotating means. The tape shifter has inner and outer portions, the inner portion having a shifter hinge means to permit rotation of the inner portion about a shifter hinge axis disposed parallel to axes of rotation of cassette reels of the cassette. The tape holder is mounted on the outer portion of the tape shifter and is rotatable with respect to the tape shifter about a holder axis disposed normally to the shifter hinge axis. The tape shifter rotating means is for rotating the inner portion of the tape shifter about the shifter hinge axis to move the tape holder towards or away from a well of the cassette. The tape holder rotating means is for rotating the tape holder about the holder axis after entering the well of the cassette, to position the holder adjacent an inside face of a portion of the tape to permit subsequent extraction of the tape portion.

The apparatus also includes exit and entry tape guide means locatable into the well of the cassette to hold exit and entry portions of the tape extracted from the cassette spaced from the cassette body during extraction and processing of the tape.

The tape holder has an outer portion which is rotatable between extended and retracted positions, and a holder stop means limits movement of the outer portion of the tape holder in the extended position. Thus, in the extended position thereof, the outer portion of the tape holder is parallel to the shifter hinge axis, and in the retracted position thereof, the outer portion of the tape holder is generally normal to the shifter hinge axis. A holder biasing means cooperates with the tape holder and the tape shifter so as to bias the holder to the extended position. The holder stop means cooperates with the tape shifter so as to react against forces generated on the tape holder by the tape during lateral displacement of the tape by the tape shifter, and during processing of the tape, so as to augment force from the biasing means on the holder. The apparatus further includes cam means, which are used to control operation of several components, for example, the exit and entry tape guides, the tape holder, the tape shifter, and a pinch roller positionable to engage a respective capstan. All components have respective cam followers which cooperate, directly or indirectly, with the cam means for extension and retraction between operative and inoperative positions. In two embodiments of the apparatus, at least one magnetic head is fixed, and the tape is drawn by the tape shifter across the magnetic head. In another embodiment, the tape is drawn by the tape shifter, and concurrently, a magnetic head is moved into engagement with tape extracted from the cassette.

A method of processing a tape of a data bearing tape cassette having a cassette body and a pair of cassette reels carrying the tape includes the following steps:
rotating an inner portion of the tape shifter in a first direction about a shifter hinge axis disposed parallel to axis of rotation of the cassette reels so as to position a tape holder which is connected to an outer portion of the tape shifter adjacent a well of the cassette body;
passing the tape holder in a retracted position into the well between an edge of the tape and an oppositely facing portion of the well of the cassette body;
rotating the tape holder about a holder axis disposed normally to the shifter hinge axis so as to extend and position the tape holder adjacent an inside face of a portion of the tape;

rotating the inner portion of the tape shifter in a second direction opposite to the first direction so that the tape holder draws an extracted length of tape from the well of the cassette body for processing.

Prior to drawing the tape from the cassette well, exit and entry guide posts are positioned into the well adjacent outer portions of the well to prevent exit and entry portions of the tape from undesirable contact with portions of the cassette body defining the well. Preferably, after passing the tape holder in the retracted position thereof into the well, the exit and entry tape guide posts are passed laterally into the well on an opposite sides of the tape holder. In some embodiments, a portion of an extracted length of tape is drawn across a magnetic head for processing by the magnetic head, whereas in another embodiment, a magnetic head is moved between a retracted position clear of the cassette and the extracted portion of the tape, and an extended position in contact with the extracted portion of the tape, so as to permit the magnetic head to scan the tape.

Another embodiment of the invention comprises a tape holder, a tape shifter means and sequencing means. The tape holder is rotatable about a holder axis between retracted and extended positions of the tape holder, the holder axis being disposed normally to axes of rotation of cassette reels of the cassette. The tape shifter means is for mounting and shifting the tape holder between the retracted position of the tape shifter adjacent a length of tape within a well of a processing edge of the cassette, and an extended and final operative position of the tape shifter. The sequencing means is for controlling a sequence of operation of the tape shifter means and the tape holder for performing the sequence as follows:

moving the tape shifter means to shift the retracted tape holder generally perpendicularly to the processing edge inwardly into the well of the cassette body to position the tape holder adjacent an inside face of the tape within the well;

rotating the tape holder about the holder axis from the retracted to the extended position thereof adjacent to the inside face of the tape;

moving the tape shifter means to shift the tape holder generally perpendicularly to the processing edge of the cassette outwardly of the well to draw an extracted length of the tape from the well; and positioning the tape holder in the final operative position thereof in which most of the extracted length of tape extending from the well is inclined obliquely or non-perpendicularly to the processing edge of the cassette.

Another embodiment of the method of the apparatus is for processing a tape of a data-bearing tape cassette, having a cassette body and a pair of cassette reels carrying the tape, the method including the steps of:

positioning a tape holder in a retracted position thereof generally adjacent a well of a processing edge of the cassette body, the well having a length of tape extending thereacross;

initially moving the tape holder in the retracted position thereof generally perpendicularly to the processing edge into the well to position the tape holder adjacent an inside face of the length of tape extending across the well;

rotating the tape holder about a holder axis disposed normally to the axes of rotation of the cassette reels to locate the tape holder in an extended position thereof adjacent the inside face of the tape;

initially moving the tape holder generally perpendicularly to the processing edge of the cassette and outwardly of the well to draw an extracted length of tape from the cassette;

moving the tape holder to a final operative position in which most of the extracted length of tape is inclined obliquely or non-perpendicularly to the processing edge of the cassette.

Another embodiment of the invention is for withdrawing tape from a center well of the cassette in contrast to the previous embodiments which extract the tape from an outer well. The alternative structure is generally similar to the previously described embodiments, but in addition includes a pad lifter which is movable into the center well to displace the pressure pad from contact with an inside face of a portion of the tape in the well to provide a clearance space between the inside face of the tape and the pad lifter. In this embodiment, the tape holder rotating means rotates the tape holder about the holder axis after entering the well of the cassette and after the pressure pad is displaced by the pad lifter, so as to position the tape holder in the clearance space between the inside face of the tape and the pad lifter to permit subsequent extraction of the said tape portion. In one relatively simple arrangement, the pad lifter can be mounted on the tape shifter for concurrent movement therewith inwardly into and outwardly away from the cassette well. In an alternative arrangement, the pad lifter can be mounted on other structure for separate movement into the cassette well to displace the pressure pad prior to or concurrently with entry of the tape holder.

It can be seen that the method of the invention for this alternative is further characterized by displacing the pressure pad into the cassette well so as to provide a clearance space between an inside face of the tape in the pressure pad. This then permits rotating the tape holder about the holder axis to position the tape holder in the clearance space between the pad lifter and the inside face of the tape, followed by extracting the tape from the cassette well. The pressure pad can be displaced essentially concurrently with, or before, entry of the tape holder into the cassette well.

A detailed disclosure following, related to drawings, describes several embodiments of the invention which are capable of expression in structure and method other than those particularly described and illustrated.

BRIEF DESCRIPTION OF THE DRAWINGS

FIG. 1 is a conceptual diagram showing components associated with shifting, guiding, feeding and scanning an extracted portion of tape extending from a conventional audio tape cassette, the apparatus being shown in a STOP/PAUSE mode, FIG. 1a is a fragmented, simplified diagram of an enlarged portion of FIG. 1, showing a cassette well partially in section with tape guide posts inserted thereinto, and showing path of the tape prior to extraction and after extraction when entering and leaving the cassette, FIG. 2 is generally similar to FIG. 1 showing some additional components, with other components omitted for clarity, the apparatus being shown in the STOP/PAUSE mode, FIG. 3 shows the apparatus in Mode A, in a retracted or pre-loading mode to permit insertion of the cassette, FIG. 4 shows the apparatus in Mode C with a portion of tape engaged by a tape holder, prior to extraction of the tape from the cassette, FIG. 5 shows the apparatus in Mode E with a portion of tape partially extracted from the cassette by the tape holder, FIG. 6 shows the apparatus in Mode H with the portion of tape fully extracted from the cassette and engaging external components of the apparatus, FIG. 7 shows the apparatus in Mode J with the tape fully extracted from the cassette in a play/record mode.

FIG. 19 is a conceptual diagram of the second embodiment showing components associated with shifting, guiding, feeding and scanning an extracted portion of tape extending from a conventional audio tape cassette, the apparatus being shown in a stop mode;

FIG. 20 is generally similar to FIG. 18 showing some additional components, with other components omitted for clarity, the apparatus being shown in the stop mode;

FIG. 21 shows the apparatus in Mode A in a retracted or pre-loading mode to permit insertion or removal of the cassette;

FIG. 22 shows the apparatus in Mode C with a portion of tape engaged by a tape holder, prior to extraction of the tape from the cassette;

FIG. 23 shows the apparatus in Mode E, with a portion of the tape fully extracted from the cassette and engaging external components of the apparatus, shown in a play/record mode;

FIG. 24 is a top plan view of a primary cam disk according to the invention, showing grooves and lobes on an upper surface thereof, with operational mode positions also being shown, a groove on the lower surface being omitted for clarity;

FIG. 25 is a simplified fragmented view as seen from line 25—25 on FIG. 22;

FIG. 26 is a simplified fragmented view of the tape lifter shown extended for use in fast forward or rewind mode;

FIG. 27 is a simplified fragmented view as seen generally from line 27—27 of FIG. 26;

FIG. 28 is a conceptual diagram of the third embodiment showing components associated with shifting, guiding, feeding and scanning an extracted portion of tape extending from the conventional audio tape cassette, the apparatus having an arcuate magnetic head movement and being shown in a Stop/Pause mode;

FIG. 29 is generally similar to FIG. 28 showing some additional components, with other components omitted for clarity, the apparatus being shown in the stop mode;

FIG. 30 shows the apparatus in Mode A in a retracted or pre-loading mode to permit insertion or removal of the cassette;

FIG. 31 shows the apparatus in Mode B, in which a retracted tape holder is inserted into the cassette;

FIG. 32 shows the apparatus in Mode C, wherein the tape holder has been extended to engage a portion of the tape prior to extraction of the tape from the cassette;

FIG. 33 shows the apparatus in Mode D with a portion of the tape partially extracted from the cassette, the cassette being shown in a stop/pause/fast wind mode;

FIG. 34 shows the apparatus in Mode E, with a portion of the tape fully extracted from the cassette and engaging external components of the apparatus, shown in a play/record mode or an alternative stop/pause mode;

FIG. 35 is a top plan view of a primary cam disk according to the invention, showing grooves and lobes on an upper surface thereof, with operational mode positions also being shown, a groove on the lower surface being omitted for clarity;

FIG. 36 is a simplified fragmented view as seen generally from line 36—36 of FIG. 31, showing cam means, a tape holder and the tape shifter;

FIG. 37 is a simplified fragmented view as seen from line 37—37 of FIG. 32, the view being in a generally similar plane to that as shown in FIG. 36;

FIG. 38 is a simplified fragmented section on line 38—38 of FIG. 32, showing cooperation with a cassette well;

FIG. 39 is a simplified fragmented section generally on line 39—39 of FIG. 31, showing cooperation between a tape holder and respective lobe in a retracted position;

FIG. 40 is a simplified fragmented section generally on line 40—40 of FIG. 32, being viewed in a generally similar direction to that of FIG. 39;

FIG. 41 is a simplified fragmented top plan of magnetic head guide means and modes of movement;

FIG. 42 is a simplified view of a modification of the third embodiment with a linear magnetic head movement;

FIG. 43 is a simplified view of a modification of a tape shifter arm of the first embodiment;

FIG. 44 is a simplified fragmented top plan view of the first embodiment of the apparatus shown for use with a Philips Digital Compact Cassette (DCC).

FIG. 45 is a conceptual diagram of the fourth embodiment showing components associated with shifting, guiding, feeding and scanning an extracted portion of tape extending from the center well of a conventional audio Compact Cassette, the apparatus having many similarities with the second embodiment of FIGS. 19 through 27, and being shown in a stop/pause mode;

FIG. 46 is a simplified fragmented top plan of structure associated with a center well of the Compact Cassette, showing a tape holder and a pad lifter according to the invention entering the center well;

FIG. 47 is a simplified fragmented top plan view generally similar to FIG. 46, showing the pressure pad lifter displacing a pressure pad of the center well, with the tape holder being shown in full outline in an extended position;

FIG. 48 is a simplified fragmented partial section as would be seen generally from line 48—48 of FIG. 47;

FIG. 49 is a simplified fragmented partial section as would be seen generally on line 49—49 of FIG. 47;

FIG. 50 is a conceptual diagram of the fifth embodiment showing components associated with shifting, guiding, feeding and scanning an extracted portion of the tape extending from a center well of a Digital Compact Cassette (DCC), the apparatus having many similarities with the third embodiment of FIGS. 28 through 41 above, the apparatus being shown in a stop/pause mode;

FIG. 51 is a simplified fragmented top plan view generally similar to FIG. 50, with the apparatus being shown with a tape holder and a pad lifter inserted into the center well of the DCC displacing a pressure pad and an azimuth locking pin assembly of the center well, with the tape holder shown in the extended position;

FIG. 52 is a simplified fragmented top plan view of the sixth embodiment of the invention shown cooperating with a center well of a Digital Compact Cassette (DCC), the apparatus being shown in a configuration generally similar to that of FIG. 51 above with the pressure pad and the azimuth locking pin assembly displaced by a pad lifter, the apparatus being characterized by a linear moving tape holder and magnetic head assembly, and the pad lifter cooperating with exit and entry guides;

FIG. 53 is a simplified, fragmented top plan view generally similar to FIG. 52, with the tape holder being shown in a final operative position, with a portion of tape extracted from the center well, the apparatus being shown in a play/record mode;

FIG. 54 is a simplified, fragmented section as would be seen generally from line 54—54 of FIG. 52.

DETAILED DESCRIPTION

First Embodiment—FIGS. 1 through 18

Figure 1:
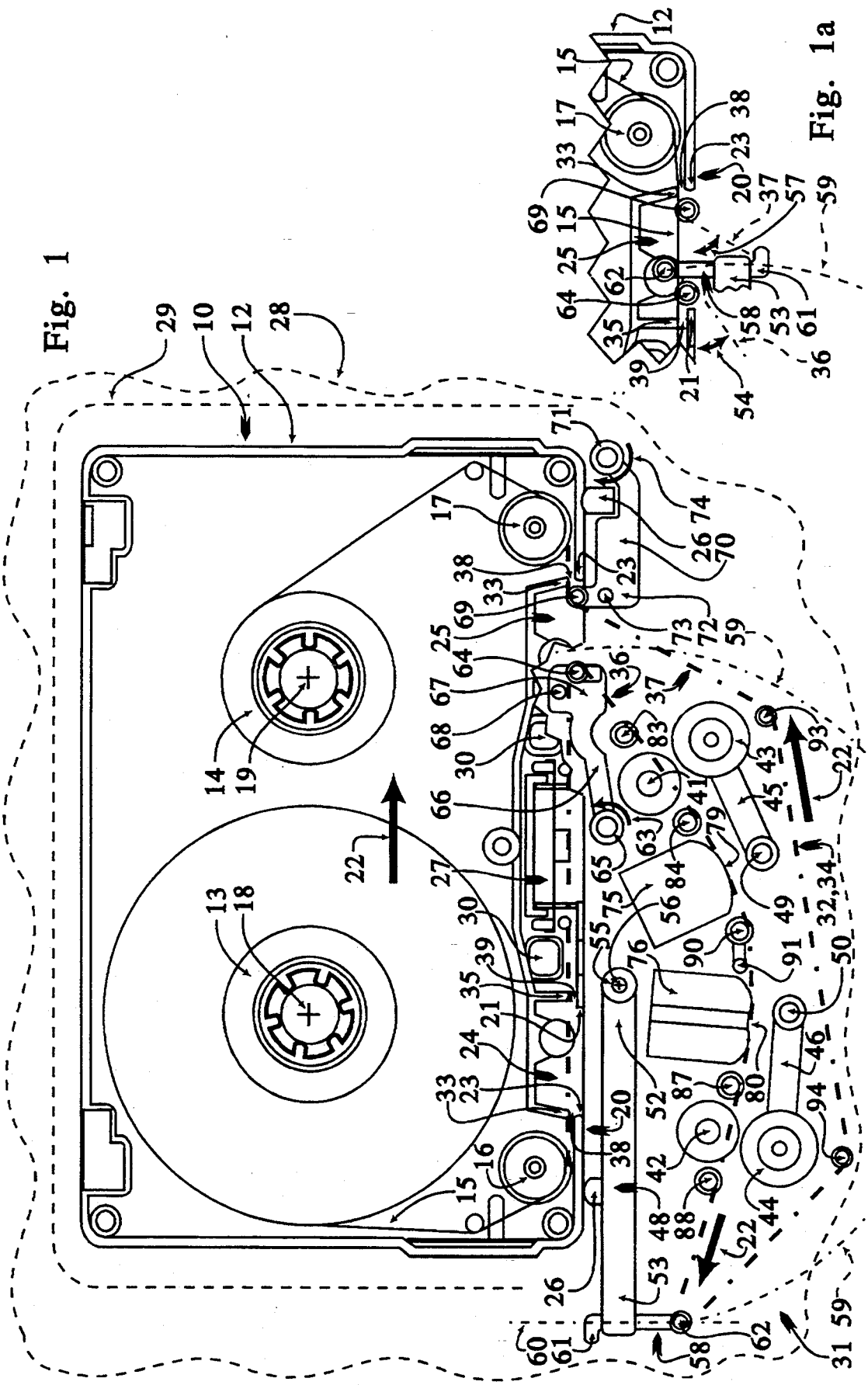
FIGS. 1 through 7 are simplified diagrams of a first embodiment of the invention having a dual capstan drive apparatus showing some relevant portions of the apparatus for a specific mode or function, while other portions are omitted or shown in broken lines for clarity.

FIGS. 1 and 1a

Referring mainly to FIG. 1, a conventional Philips Compact Cassette 10 as used in conventional audio cassette machines has a cassette body 12 enclosing a supply reel 13 and take-up reel 14 carrying a magnetic data bearing tape 15. The cassette reels are journalled for rotation about respective reel axes 18 and 19, which axes are permitted to float laterally to accommodate manufacturing tolerances in the tape drive apparatus as is well known. The cassette body also has a supply guide roller 16 and a take-up guide roller 17 located adjacent the reels 13 and 14 and front corners of the body and adapted to align the tape 15 so as to extend between the rollers and generally parallel to a processing or front edge portion 20 of the cassette body. For convenience, the tape is assumed to be fed in direction of feed arrow 22 between the supply and take-up reels 13 and 14 in the normal play/record mode.

The processing edge portion 20 of the cassette body also has a first outer or supply well 24, which is located closest to the supply reel 13, and a second outer or take-up well 25, which is located closest to the take-up reel 14. The wells 24 and 25 are similar but mirror images of each other and are defined in part by laterally spaced portions of parallel, generally flat, broad faces of the cassette, and short transversely extending inner and corner webs 21 and 23 which extend between the generally flat faces of the cassette, and form portions of the processing edge portion 20 of the cassette. As seen in FIG. 1a, the wells are further defined by corner and inner bridges 33 and 35 which extend transversely between the broad faces of the cassette body and have outwardly facing edges spaced from inwardly facing portions of the respective adjacent webs by a small gap to accept an intermediate portion of the tape to permit an undisturbed run of the tape extending between the rollers 16 and 17 to pass therethrough. The gaps between the corner bridges 33 and the respective corner webs 23 are termed control gaps 38, and the gaps between the inner bridges 35 and the respective inner webs 21 are termed clearance gaps 39. The remaining webs of the processing edge portion 20 have similar transverse bridges associated therewith and spaced therefrom, but these are undesignated. In the control gaps 38, the corner bridges 33 are in light contact with the intermediate portion of the tape extending between the rollers 16 and 17, as best seen for one bridge in FIG. 1a, and provide an accurate location or datum plane for the tape as it is processed. The remaining undesignated webs and bridges are located to be clear of the tape by relatively close tolerances.

In prior art apparatus, the wells are adapted to receive at least one capstan and pinch roller of a drive mechanism of the apparatus, depending on the orientation of the cassette within the apparatus, and the modes. In a conventional single capstan drive apparatus, usually the take-up well receives a capstan and pinch roller assembly to draw the tape as is well known. A center well 27 receives a magnetic head, usually containing record and playback functions. The center well also has a resiliently mounted pressure pad which is used to locate the tape against a magnetic head in prior art apparatus. Location of the pad within the center well is not closely controlled and it occupies some considerable space, and thus for the first three main embodiments to be described herein, the center well is not used for tape extraction using an apparatus of the present invention. Other combinations for the use of the center well and supply wells have been used. In the present invention, no modification is necessary to the existing Compact Cassette, and furthermore, the invention is also applicable to the Philips Digital Compact Cassette as will be described.

In the following descriptions, the terms "above" and "below" refer to relative positions of components as seen on the sheets of the drawings, and are not necessarily representative of true dispositions of the components in the actual apparatus. While the present apparatus could be used in a "top-loading" tape deck apparatus, where the cassette lies generally horizontally, modern preferences are for a "front-loading" apparatus, wherein the cassette is disposed vertically. Particularly in front-loading apparatus, it is preferable to reduce space required for the tape transport apparatus within the plane of the cassette, so as to occupy less "vertical space". Many of the components are conventional, e.g. reel motors, brakes, sensors, bearings, etc. and are secured or journalled on a transport chassis, which is not shown in many figures for clarity. Also, the apparatus is controllable through an essentially conventional control panel having conventional control functions as required. As many of the components are well known, they are neither illustrated or described.

A record/playback tape transport apparatus 28 according to the invention, an adjacent portion which is shown in broken outline, has a cassette compartment 29 provided with cassette body holding means generally similar to those used in conventional cassette decks. The holding means locate the cassette with respect to important structure of the apparatus, and commonly include at least one reference pin to be received in a reference hole 30 of the cassette body 12, and two control or datum surfaces 26 to locate an edge of the cassette. However, in contrast to prior art cassette compartments, the present cassette compartment 29 is not required to locate the cassette body as accurately as prior art cassettes, as the location of the body does not readily affect the accuracy of tape transport as will be described. Thus, the invention will tolerate somewhat higher levels of mispositioning and manufacturing errors of the cassette body when compared with the prior art.

The apparatus 28 has a first embodiment 31 of a tape transport and scanning apparatus, hereinafter processing apparatus, which is in accordance with the present invention. When operative, most of the apparatus is located externally of the cassette, which contrasts with prior art apparatus and provides the previously described higher tolerance to mispositioning and manufacturing errors of the cassette body. The supply and center wells 24 and 27 respectively are not used in this embodiment, and all access is through the take-up well 25, but the supply well could be used with a mirror image reversal of the structure. An extracted portion of tape 32 extends from the take-up well 25 and is guided through a tape path 34 to return to the well 25 and be wound on the take-up reel as before. The tape path has exit and entry tape portions 36 and 37, the portion 36 being generally arcuate, and the portion 37 being angular. Components shaping the tape path are carried directly, or indirectly, on a transport chassis to be described.

The first embodiment 31 of the apparatus includes first and second capstans 41 and 42 and associated first and second pinch rollers 43 and 44 journalled on pinch roller mounting arms 45 and 46 respectively. The first embodiment apparatus 31 also includes an essentially rigid tape shifter arm or tape shifter 48 having inner and outer portions 52 and 53 respectively. The inner portion 52 has a shifter hinge means 55 to permit rotation of the tape shifter about a shifter hinge axis 56 disposed parallel to axes of rotation 18 and 19 of the cassette reels 13 and 14.

A tape holder 58 is mounted on the outer portion 53 of the tape shifter and is rotatable with respect to the tape shifter about a holder axis 60 disposed normally to the shifter hinge axis 56. The tape holder 58 has inner and outer portions 61 and 62 respectively, the extracted portion 32 of the tape 15 passing around the outer portion 62, as will be described, defining an outer extreme limit of the tape path 34 at an intersection of the portions 36 and 37. As will be described, the inner portion 52 of the hinge 55 is caused to rotate through 180 degrees, which causes the outer portion 60 of the tape holder to sweep through a semi-circular travel arc 59, a portion of which is shown in broken outline in FIG. 1. FIG. 1a also shows a portion of the travel arc and portions of the holder 58 in an extended position prior to extracting the tape, adjacent a portion of undisturbed tape 15 extending across the well 25. Portions of the exit and entry tape portions 36 and 37 which are immediately adjacent the cassette are inclined at acute angles 54 and 57 respectively to the processing edge typically between 30 degrees and 60 degrees. As seen in FIG. 1, most of the tape portions 36 and 37 are inclined obliquely to the processing edge 20, i.e. non-perpendicularly, resulting in a more compact unit than if the portions were inclined generally perpendicularly to the edge.

The first embodiment 31 further includes an exit or first well guide post 64 located adjacent one edge of the take-up or second outer well, and an entry or second well guide post 69 located adjacent an opposite side of the take-up well. The guide posts 64 and 69 are mounted on an exit guide post support 66 and an entry guide post support 70 respectively, and are movable between retracted positions (not shown), and extended positions disposed within the well. The guide posts 64 and 69 serve to protect the tape 15 from contact with portions of the cassette body adjacent the well as will be described. Final locations of the guide posts 64 and 69 within the well 25 are accurately controlled against respective stops in the chassis to ensure that adjacent portions of tape extending from the rollers 16 and 17 are not forced against the respective web 23, or associated corner bridge 33, or the respective web 35 or associated inner bridge 21 and in fact pass smoothly around the guide posts 64 and 69 so as to cause negligible contact between the tape and cassette shell guide structures as the tape passes from the well (see FIG. 1a). This is in contrast with the prior art device known to the inventor which permits the tape to contact the body during extraction of tape from a Compact Cassette. The exit guide post support 66 has an inner end 65 journalled for rotation and an outer end 67 carrying the exit guide post 64 extending upwardly therefrom. The support 66 has an exit guide cam follower 68 extending downwardly therefrom and cooperating with a cam as will be described. The inner end 65 of the support 66 is provided with a torsion spring, not shown, which biases the exit guide support 66 in direction of an arrow 63. The entry guide post support 70 has an inner end 71 journalled for rotation, and an outer end 72 carrying the entry guide post 69 extending upwardly therefrom. The support 70 has an entry guide cam follower 73 extending downwardly therefrom to cooperate with a cam as will be described. The inner end 72 of the support 70 is similarly biased by a torsion spring which biases the support 133 to rotate in direction of the arrow 74.

The apparatus 31 also includes first and second magnetic heads 75 and 76 having first and second tape contact surfaces 79 and 80 respectively. Outer and inner first tape guides 83 and 84 are located on opposite sides of the first capstan 41, and similar inner and outer second tape guides 87 and 88 are located on opposite sides of the second capstan 42. A central tape guide 90 and an associated tape lifter 91 are located between the first and second magnetic heads. The lifter 91 is shown in a retracted position permitting the tape to contact the guide 90 and the tape contact surfaces 79 and 80 as shown for scanning by the heads 75 and 76. The head 75 and 76 arm the guides 83, 84, 87, 88 and 90 are mounted on a transport chassis as will be described.

It can be seen that the capstans 41 and 42, the tape contact faces 79 and 80, the tape guides 83, 84, 87 and 88 and the central tape guide 90 are in operative alignment with each other and disposed on a general arc which resembles the tape wrap arc found in conventional open reel tape transport mechanisms. The shifter hinge axis 56 is disposed on a concave side of the arc which is facing towards the edge portion 20 of the cassette, and the magnetic heads, and correspondingly a convex side of the arc faces the two pinch rollers 45 and 46. Thus, the exit portion 36 follows an arcuate path across the magnetic heads which provides good contact characteristics between a tape and a magnetic head or set of heads as is well known. Because the capstans 41 and 42, the heads 75 and 76, the guides and associated components are located outside the cassette body, there is ample room to position the components for optimal relative location without the constraints normally associated with the Compact Cassette. Furthermore, the use of fixed magnetic heads and guides improves overall tape-to-head alignment accuracy, in particular the azimuth alignment, so as to attain alignment accuracy essentially equivalent to open reel machines.

The first embodiment 31 further includes first and second re-entry loop guide posts 93 and 94 which are positionable on an inside loop side of the entry portion 37 and on sides of the first and second pinch rollers remote from the capstans. The re-entry guide post serve to restrain the entry portion 37 of the extracted tape path 34 from interfering with the pinch rollers and other structures in the run of tape extending from the outer portion 62 of the tape portion to the entry or second guide post 69.

FIG. 2

Figure 2:
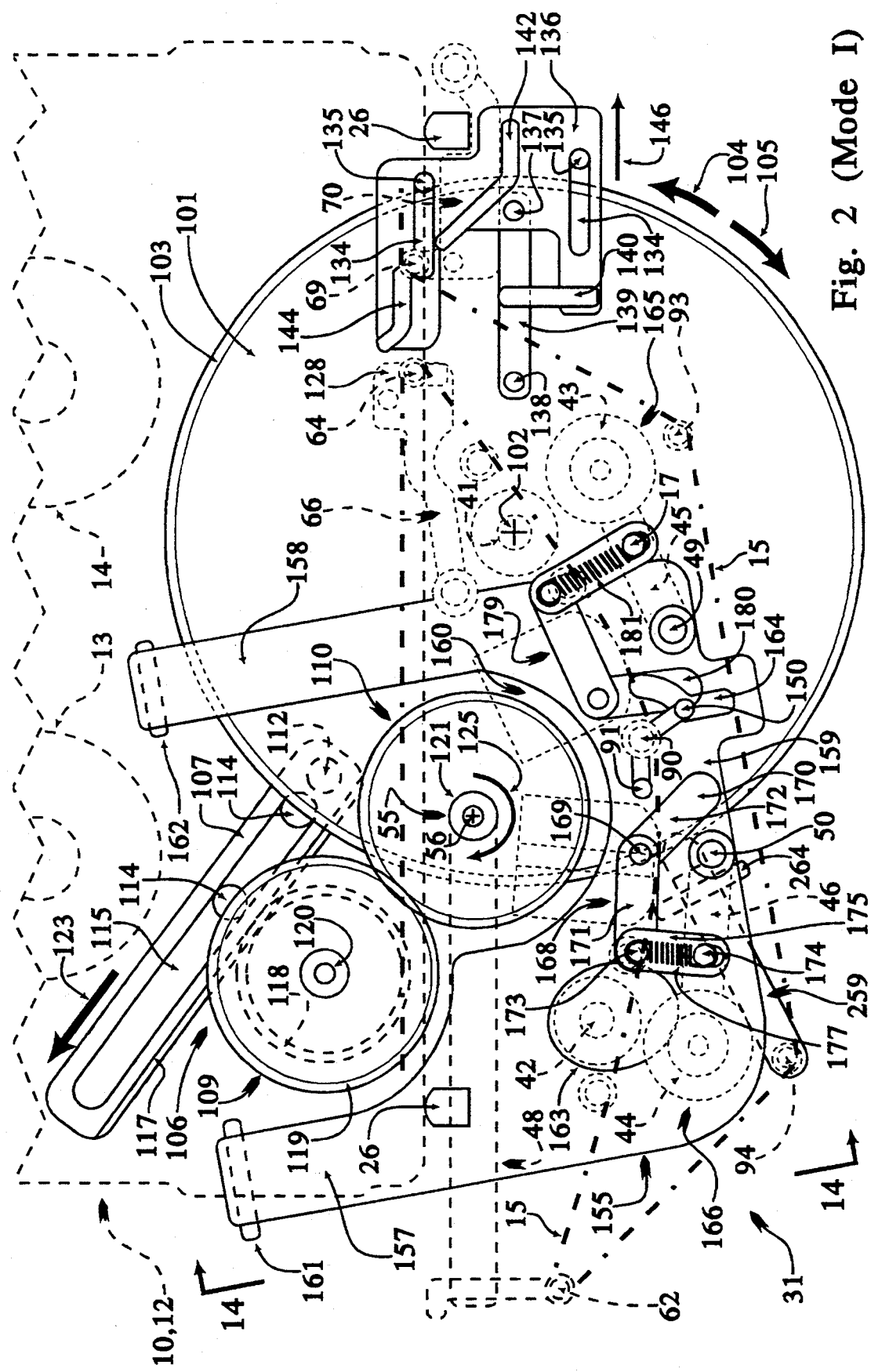

FIG. 2 shows structure in addition to that already shown in FIG. 1, most of the latter structure being shown in broken outline. The additional structure of FIG. 2 is used to impart movement to components associated with shifting, feeding, guiding and scanning the tape through the tape path.

The sequencing and actuation of essentially all components are primarily controlled by a primary cam disk 101 mounted for rotation about a primary cam axis 102, which axis is concentric with an axis of the first or supply capstan 41 to simplify journalling and to produce a more compact unit. The cam has a periphery 103 provided with teeth which mesh with a worm gear or other drive means (not shown) to impart rotation to the cam wheel as is well known in the trade. Additional spaces are provided on the periphery to locate control elements for functions such as reel brake and back tension mechanism operation as is well known. Cam wheel position is conventionally detected by a feedback system consisting of rotary potentiometer linked to the cam disk, the potentiometer intercepting a servo circuit controlling a loading motor, or by use of an optical sensor which monitors the cam wheel or other equivalent means as is well known. The cam disk 101 rotates in a forward or loading direction as shown by an arrow 104, or a reverse or unloading direction as shown per arrow 105.

As will be described with reference to FIGS. 8 and 8a, the cam disk 101 has top and bottom surfaces provided with cam features, namely cam grooves and cam lobes, to impart motion to respective cam followers cooperating therewith, so as to actuate the various components as will be described with reference to FIGS. 9 through 16. In general, the cam followers actuate components which are spring-biased towards a stop, the stop serving to locate each component accurately in a desired final operative position, and in this way the cam follower is released by the cam to permit the component to contact the stop due to the spring bias. The springs can be torsion coil springs, linear coil springs, etc. and some of the spring biasing components are not shown for clarity.

The tape shifter arm 48 is rotated about the shifter hinge axis 56 by a tape shifter rotating means 106 comprising the primary cam disk 101, an elongated shifter rack 107, and first and second shifter gear means 109 and 110. The rack 107 has a shifter rack cam follower 112 which cooperates with the cam disk 101 as will be described, and the rack is constrained for axial movement by a pair of shouldered rack pins 114 provided in an elongated rack opening 115. This is also shown in and described with reference to FIG. 15. The rack has rack teeth 117 which are meshed with a first pinion 118 of the first shifter gear means 109. The gear means 109 has a second pinion 119 which is connected to the first pinion 118 by a vertical pinion spindle 120 (see FIG. 15) which is journalled to permit mutual rotation of the pinions 118 and 119. The pinion 119 meshes with teeth of the second shifter gear means 110 which is resiliently connected to a spindle 121 which is a portion of the shifter hinge 55 and is thus concentric with the shifter hinge axis 56. It can be seen that axial movement of the shifter rack 107 per arrow 123 is translated to rotational movement of the shifter arm 48 per arrow 125 about the shifter axis 56.

A sliding cam plate 136 is fitted beneath the entry guide post support 70 and is connected by a connector 137 to a follower arm 139 positioned beneath the plate 136. The arm 139 has a cam follower 138 at an outer end cooperating with a groove in the cam disk, as will be described with reference to FIG. 10. The cam plate 136 has an upper surface having a tape holder lobe 140, an entry guide lobe 141 and an exit guide lobe 144. The cam plate 136 also has guide slots 134 which receive shouldered pins 135, secured in the transport chassis, to guide the plate for movement in direction of an arrow 146 in response to a spring bias force and rotation of the cam disk in the forward or loading direction, per arrow 104.

The tape lifter 91 extends from the central tape guide 90 on a radial lifter arm so as to be radially spaced from the tape guide, and is journalled for rotation about an axis concentric with the central tape guide 90. A tape lifter cam follower 150 extends from the tape guide 90 on another radial arm which is connected to the lifter to rotate therewith. The follower 150 extends downwardly to cooperate with the cam disk 101, and thus the cam follower 150 rotates in response to the cam and produces a corresponding movement of the tape lifter 91.

The embodiment 31 also includes a pinch roller support platform 155 which is generally U-shaped and has first and second arms 157 and 158 extending generally parallel to each other from an intermediate portion 159. The first and second arms have outer ends provided with aligned journals 161 and 162 which journal the support means to the chassis, not shown, to permit rotation of the support platform about the journals 161 and 162 as will be described with reference to FIGS. 13 and 14. The support platform is positioned below the cassette and thus is provided with a clearance recess 160 for the shifter gear means 109 and 110 respectively. The support platform also has a capstan clearance opening 163 and a tape lifter cam follower clearance opening 164 to accept the second capstan 42 and tape lifter cam follower 150 structure passing therethrough to accommodate movement of the support platform. The intermediate portion 159 carries first and second pinch roller assemblies 165 and 166 which include the first and second pinch roller arms 45 and 46, broken outline, which serve to actuate and journal the first and second pinch rollers 43 and 44 respectively, also shown in broken outline. The first and second pinch roller assemblies are mounted for movement with the support platform 155 between retracted and extended positions as will be described.

Figure 17:
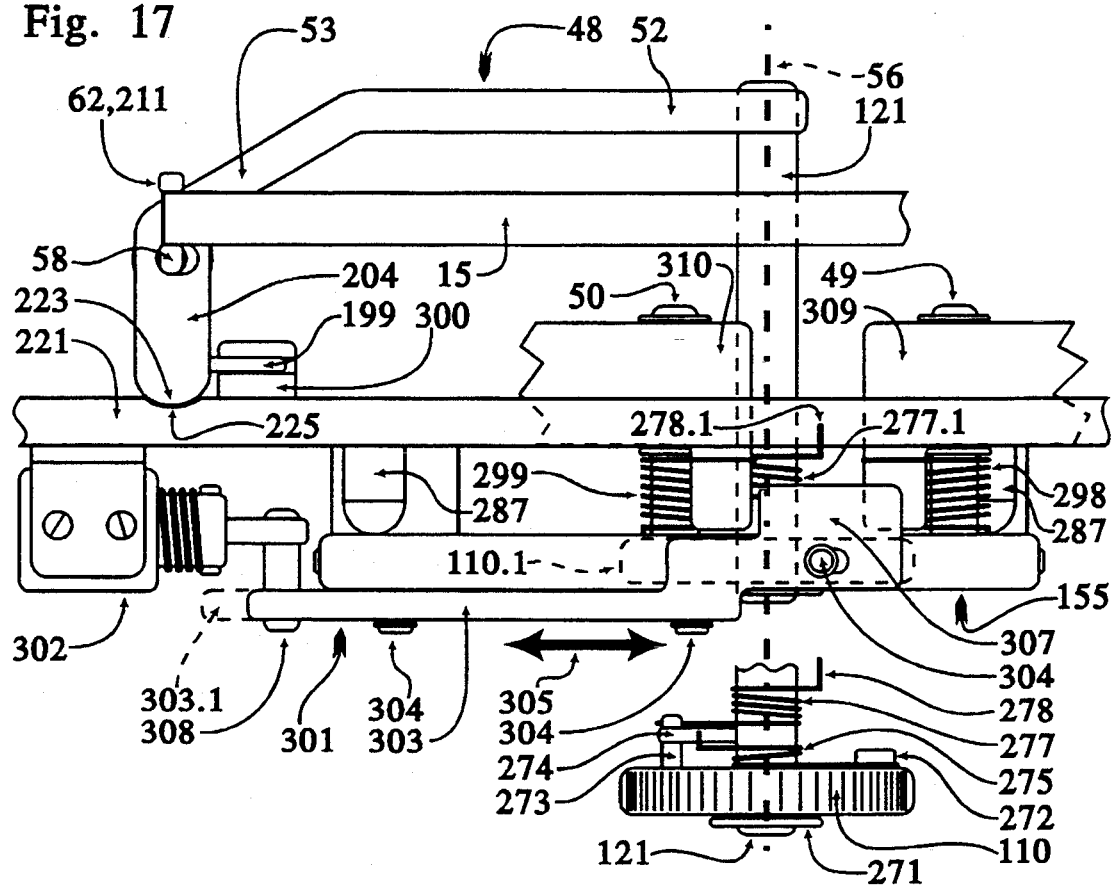
FIG. 17 is a simplified fragmented view generally on line 17—17 of FIG. 7, showing a tape shifter in the final extended position, and a fragmented inner portion of the tape shifter removed for clarity to show resilient connections thereof, the apparatus also including an optional pinch roller disabling mechanism for use in an alternative bi-directional single capstan drive embodiment, shown in a forward drive mode.

The pinch roller assemblies are mirror images of each other, and closely resemble prior art structure and thus only the second pinch roller assembly 166 will be described briefly. The assembly 166 includes a pinch roller bell crank 168 which has an upper and lower vertically spaced arms 171 and 172 extending rigidly from a vertical spindle 169 which is journalled for rotation with respect to the support platform 155. The lower arm 172 has a cam follower 170 at one end thereof, and the upper arm 171 is pinned with a link pin 173 to one end of a lost motion link 175. An opposite end of the lost motion link 175 is hinged to the pinch roller arm 46 with a link pin 174. The lost motion link 175 has an oval opening to receive the link pin 174 to permit lateral motion as well as hinging motion about the pin. A tension coil spring 177 extends between pins 173 and 174 of the lost motion link and accommodates the lost motion between the link 175 and the roller arm 46 to apply a pinch force to the capstan 42. A pinch roller release torsion spring 299, as shown in FIG. 17, cooperates with the roller arm 46 to apply a force tending to move the pinch roller arm from the capstan, i.e. in opposition to force from the spring 177. When the bell crank 168 is rotated due to the cam disk 101, the force from the spring 177 overcomes force from the release spring 299, shown in FIG. 17, and the pinch roller 44 is swung into engagement with the capstan 42. In an opposite mode, the bellcrank rotates in an opposite direction, the force from the spring 177 is reduced and overcome by the release spring 299, shown in FIG. 17, and the pinch roller is moved out of engagement with the capstan. This structure is generally similar to well-known pinch roller assemblies as used on magnetic tape transports which employ a capstan and pinch roller drive system for the tape and no further description is necessary. The pinch roller assembly 165 has a similar bellcrank 179 having a cam follower 180 and tension spring 181 and equivalent structure cooperating with the roller arm 45.

FIGS. 3–6

The following is a brief description relating to the operation of the apparatus, showing initial and final locations of major components at various modes of the operation. The operation of the apparatus is divided into twelve distinct modes, designated A through L, which in general, start from a pre-loading condition, Mode A, representing insertion of the cassette into the apparatus, and following rotation of the cam disk 101 in accordance with the arrow 104 designated as the loading rotation direction for the cam disk. However, Modes K and L are not in accordance with strict unidirectional rotation of the cam disk as will be described. For simplicity, in the following figures in general, only the grooves and lobes associated with actuation of components of a particular mode are illustrated on the cam disk, and these will be described in greater detail with reference to the full description of the operation of the apparatus which follows the detailed description of the various components of the apparatus.

Figure 3:
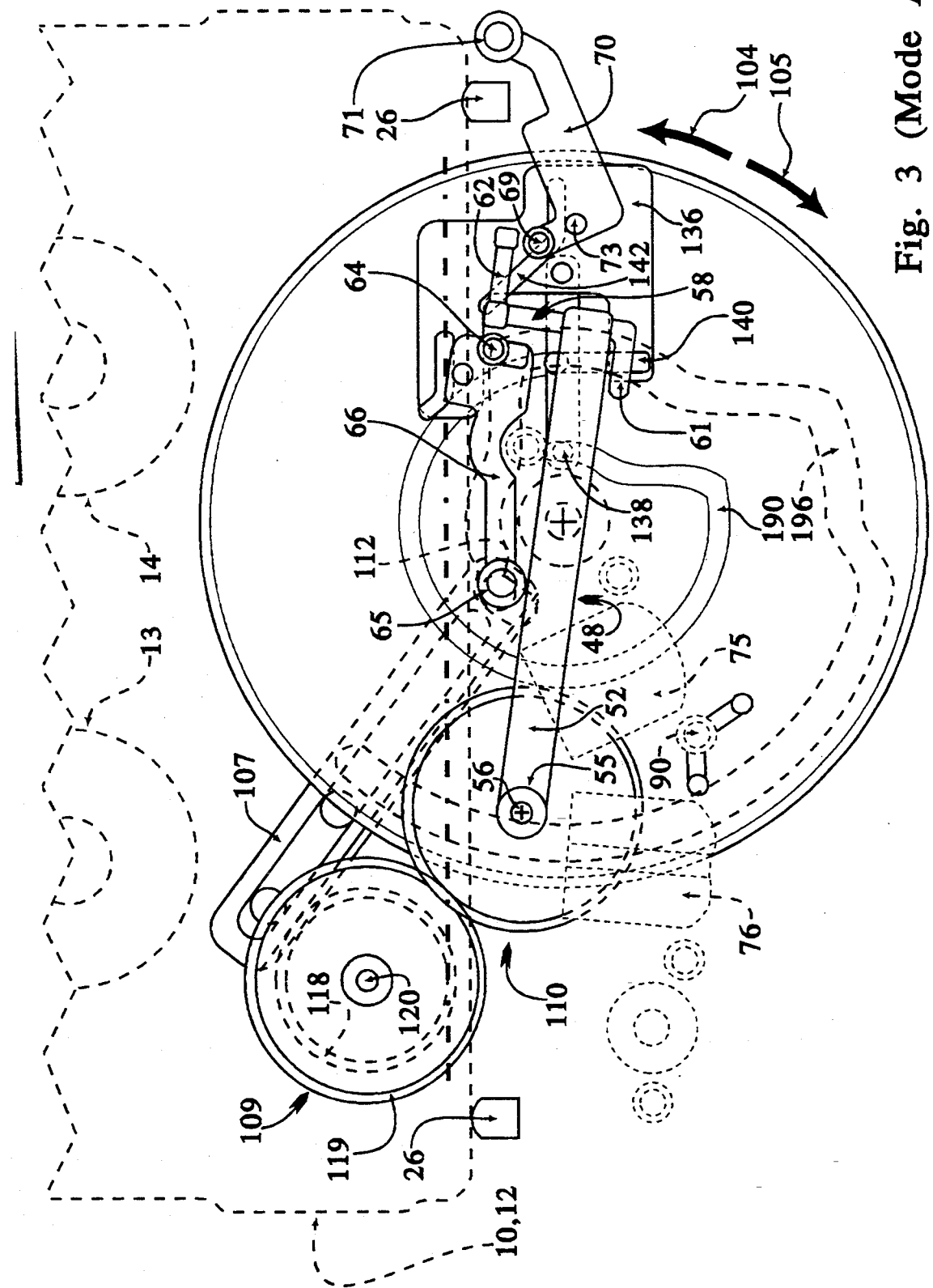

FIG. 3 shows Mode A (pre-loading) in which the cassette 10 is located in the compartment 29, the tape shifter arm 48 is fully retracted in a retracted position, and the exit and entry guides 64 and 69 respectively are also retracted. The first and second re-entry loop guides and the pinch roller platform, not shown, are lowered so as to present no obstruction to the threading of the tape portion about to be extracted.

Figure 4:
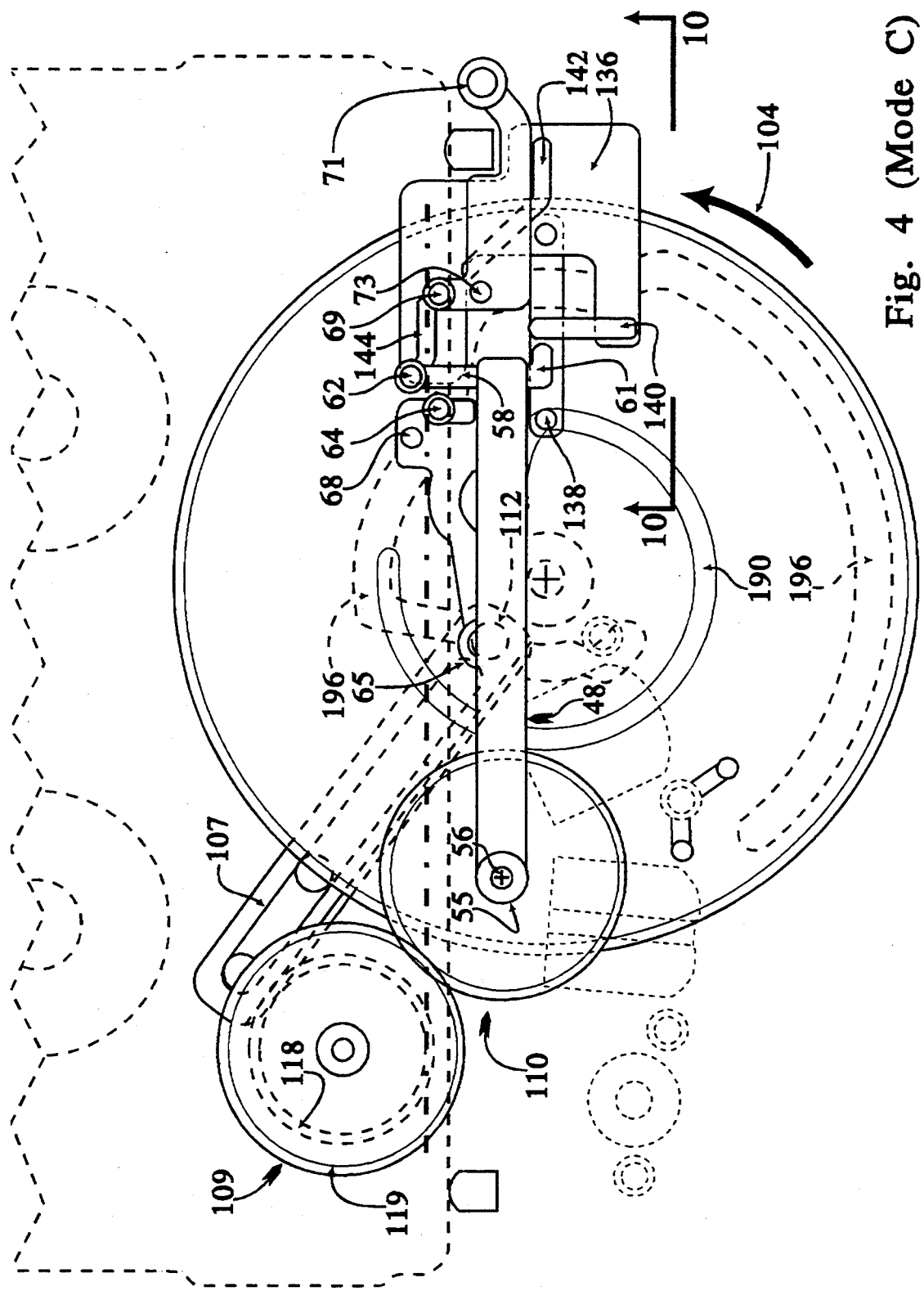

FIG. 4 shows Mode C (tape holder extended behind tape). The apparatus has passed through Mode B, in which the arm 48 was retracted to an inserted position with the tape holder 58 inserted into the well 25 in a retracted, horizontal position. FIG. 4 shows Mode C, after the tape holder 58 has been rotated through 90 degrees so as to be located vertically adjacent an inside face of the tape. At the same time, the exit and entry tape guides 64 and 69 have been inserted into the well.

Figure 5:
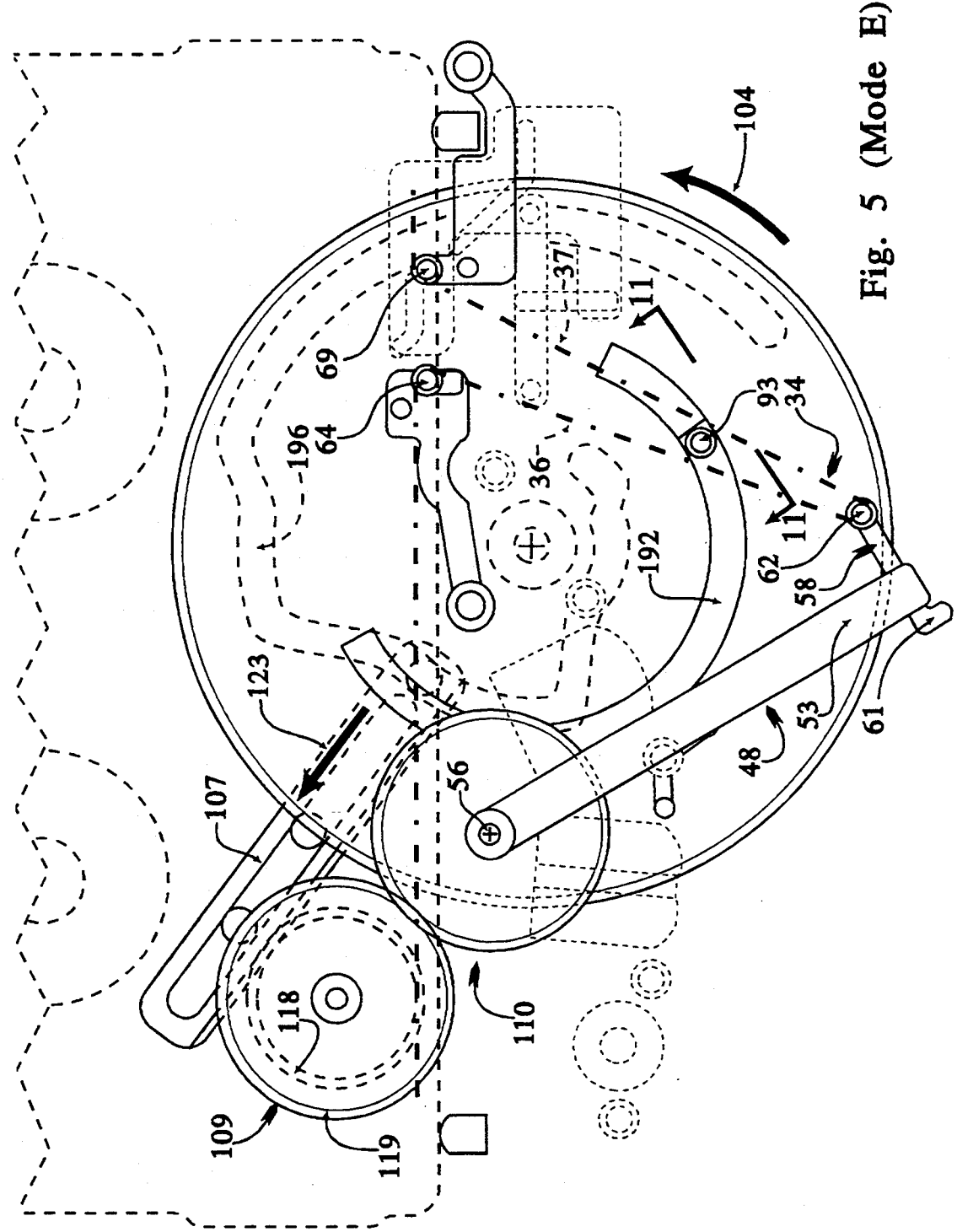

FIG. 5 shows Mode E (first re-entry loop guide extended). The apparatus has passed through Mode D, in which the tape shifter arm 48 was rotated clockwise from the inserted position to draw or extract the length of tape from the cassette well. As the tape shifter arm draws the length of tape initially from the cassette well, path of the outer portion 62 of the tape holder is generally perpendicular to the processing edge portion 20 of the cassette, thus reducing chances of interference with the closely spaced exit and entry guide post 64 and 69. FIG. 5 shows Mode E, where the tape shifter arm is rotated through approximately 60 degrees, and the first re-entry loop guide 93 has been raised to extend upwardly and enter a V-shaped loop of tape pulled from the cassette well.

Figure 6:
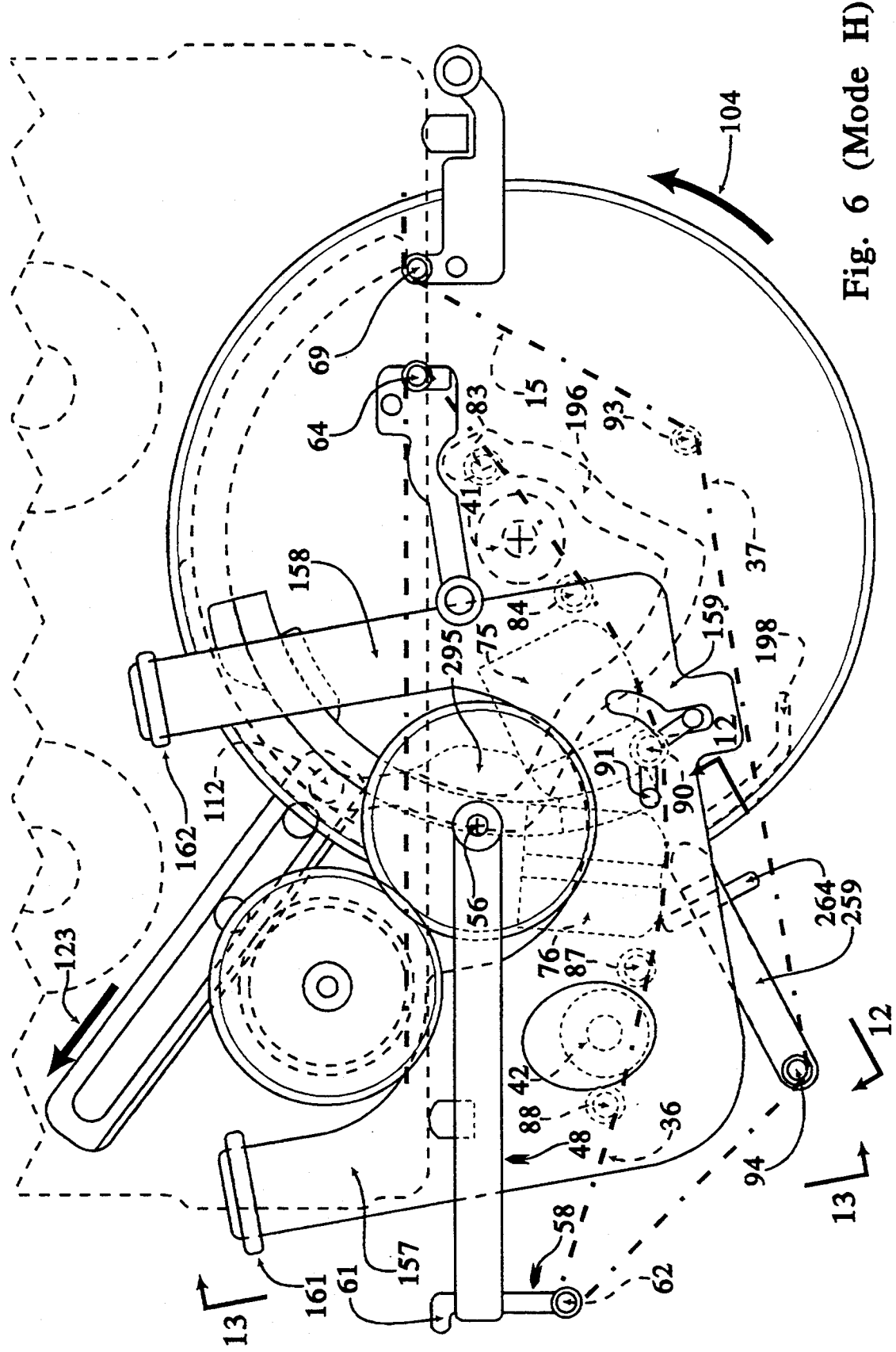

FIG. 6 shows Mode H (second re-entry loop guide extended). The invention has passed through Modes F and G during which the tape shifter arm continued to rotate and to pull more tape from the well. When the tape shifter arm was at approximately 145 degrees from its initial position at Mode C, (not shown in Mode G), the second re-entry loop guide post 94 is elevated and enters the V-shaped tape loop pulled from the cassette well. In FIG. 6, the loading arm is shown in a final operative position at 180 degrees from the inserted position in which the completed tape wrap passes around the magnetic heads 75 and 76. In this position, it is seen that the exit portion of the tape path 36 passes from the cassette and in turn past the guides 64 and 83, the first capstan and pinch roller 41 and 43, the guide 84, the first magnetic head 75, the central tape guide 90, the second magnetic head 76, the guide 87, the second capstan and pinch roller 42 and 44 to the holder 58. The entry portion of the tape path 37 extends from the tape holder 58, the second and first re-entry loop guides 94 and 93 and back to the entry guide post 69.

Figure 7:
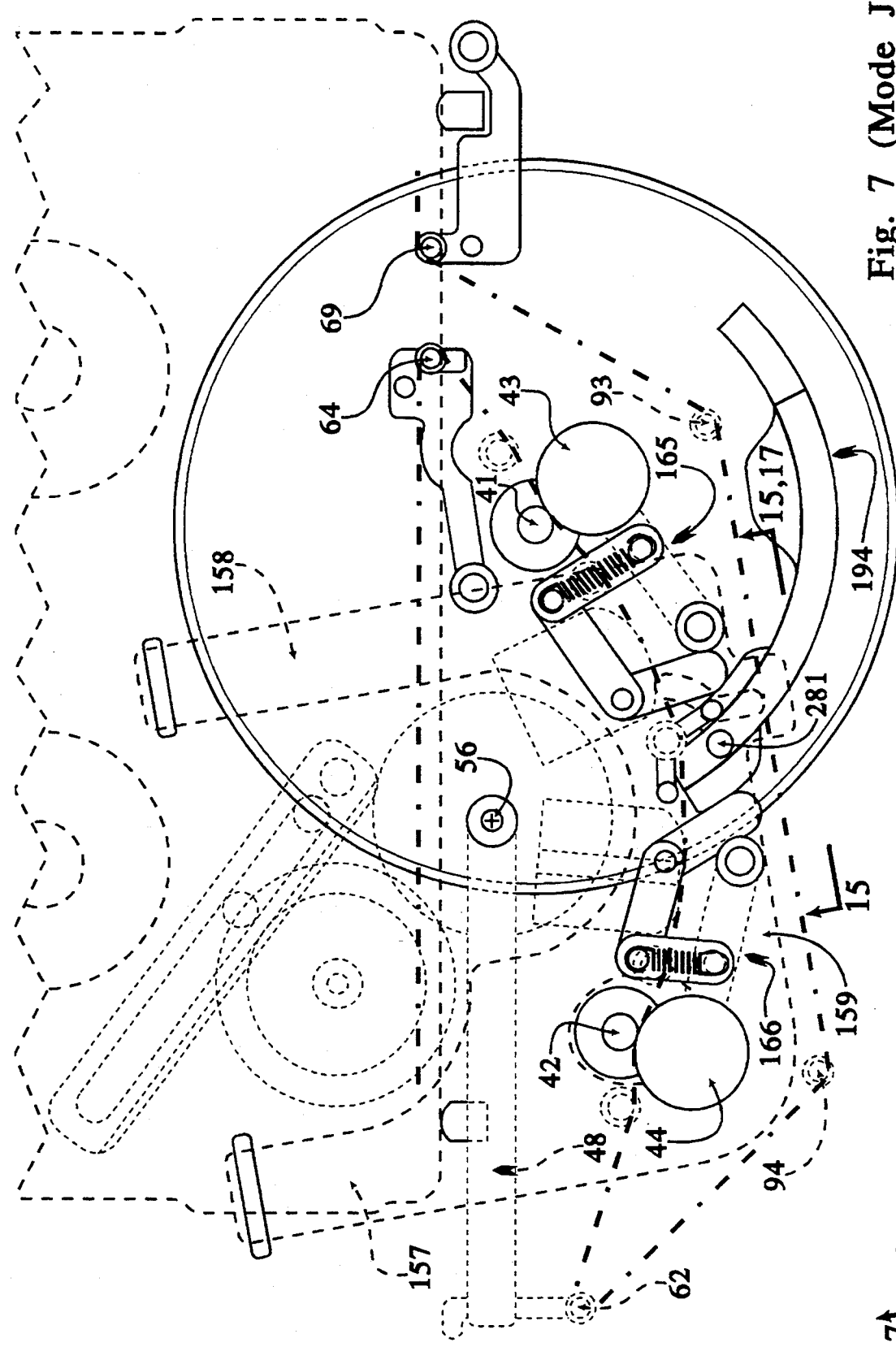

FIG. 7 shows the Mode J (play/record). The invention has passed through Mode I, a stop/pause mode, which is identical to that shown in FIGS. 1 and 2 previously described. In Mode J, the pinch rollers 43 and 44 have been brought into engagement with respective capstans 41 and 42, representing a dual capstan drive configuration. Alternative drive configurations and modes of operation will also be described later.

In summary, the Modes A through L are below:

| Mode | Description |
| --- | --- |
| A | Pre-loading - Tape shifter arm and exit/re-entry guide posts are retracted to permit insertion or removal of cassette. Re-entry loop guides and pinch rollers are retracted. |
| B | Tape shifter is rotated to position tape holder in second outer well below tape edge. |
| C | Tape holder is rotated through 90 degrees and exit/re- |

-continued

| Mode | Description |
| --- | --- |
| | entry guide posts inserted into well. |
| D | Tape shifter arm rotates to draw tape from well and then pauses. |
| E | First re-entry loop guide post is extended into V-shaped tape loop. |
| F | Tape shifter arm rotates further and pauses. |
| G | Second re-entry loop guide post is extended into V-shaped tape loop. |
| H | Tape shifter arm rotates further and stops in final position and the tape wrap engages the magnetic head assembly. |
| I | Pinch roller platform is raised to extended position and system attains stop/pause mode ready for other operations. |
| J | Pinch rollers engage respective capstans to transport tape for play/record. |
| K | Pinch rollers are disengaged from capstans, and tape lifter is disengaged for search functions (forward/reverse). |
| L | Pinch rollers are disengaged from capstans and tape lifter is engaged or extended to lift tape off magnetic heads for fast forward/rewind. |

Figure 8:
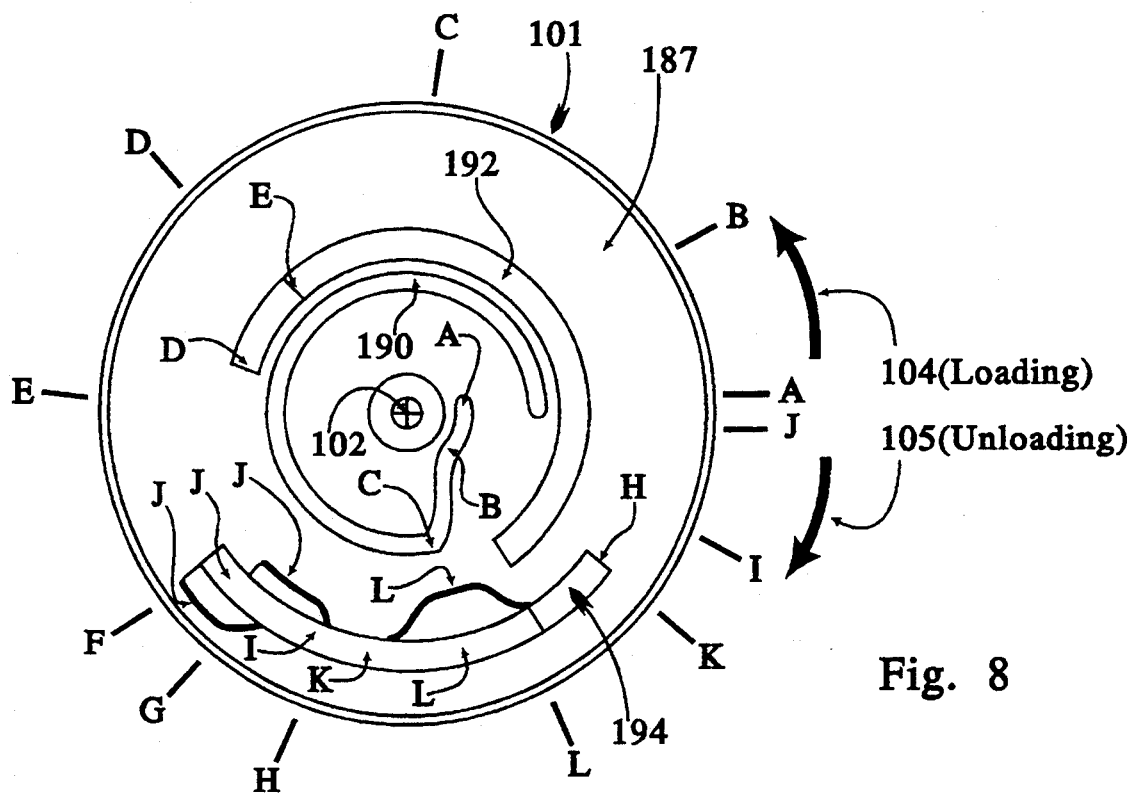
FIG. 8 is a top plan view of a primary cam disk according to the invention, showing grooves and lobes on an upper surface thereof with operational mode positions also being shown, grooves and lobes on the lower surface being omitted for clarity.
Figure 8A:
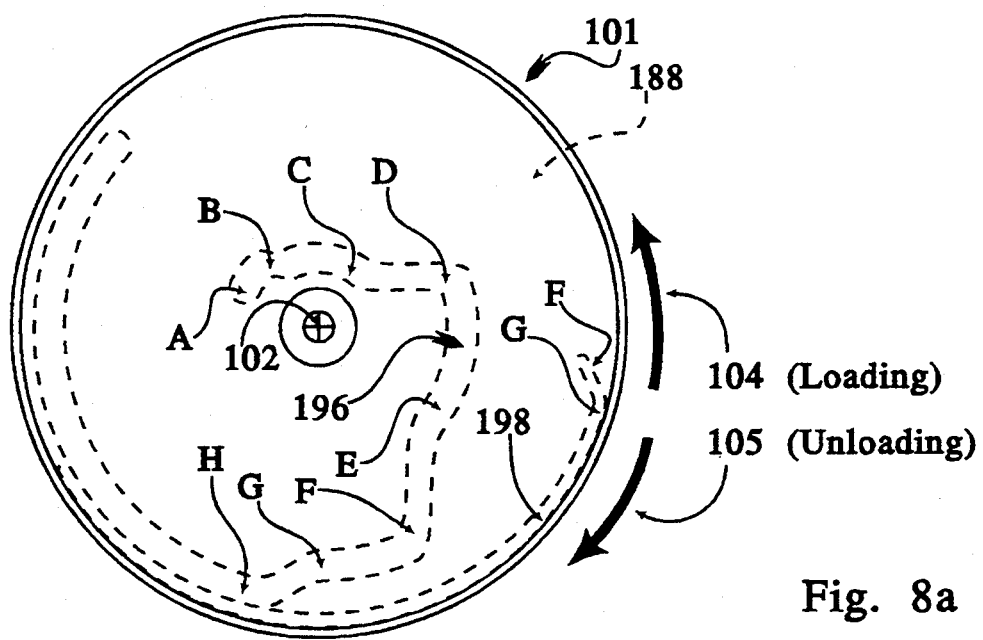
FIG. 8a is a top plan view of the cam disk in the same angular orientation as FIG. 8 showing grooves and lobes on a lower surface in broken outline with operational modes positions also being shown, the grooves and lobes on the upper surface being omitted for clarity.

FIGS. 8 and 8a

As previously stated, the primary cam disk 101 has upper and lower surfaces 187 and 188 which are provided with cam features, i.e. cam grooves and cam lobes to actuate various components of the apparatus. The periphery of the cam disk has mode locations A–L shown thereon, which indicate sequence of rotation of the lobe from the starting or pre-loading position at Mode A, and relative angular spacing between modes. Modes A and J mark beginning and end respectively of cam wheel rotational range indicating that Modes K (search) and L (fast forward/rewind) are located between Modes H and I. Letter designations identified on the lobes and grooves are used to indicate the approximate locations of the cam follower at the end of the indicated modes. For simplicity, where particular sections of lobes and grooves have a constant height or radius, indicating no more activity of a given cam follower, only the first mode number is designated where the particular constant height/radius portion commences. In general, cam grooves are continuously occupied by a respective cam follower, and a biasing force on the cam follower forces the cam follower against a particular wall of the groove. In contrast, cam lobes are contacted only intermittently by the respective cam follower, which is biased in a particular direction against the cam lobe.

In FIG. 8, the upper surface 187 has a well guide cam groove 190 to actuate the tape holder, and the exit and entry guide posts which cooperate with the well of the cassette body. The groove 190 is followed by the cam follower 138 of the cam plate 136 (FIG. 2) which is active in Modes A, B and C at positions shown on the groove. The remaining portion of the groove is concentric with the axis 102 and thus there is no further action of the cam plate for cam rotation beyond Mode C. The cam surface also has a first re-entry loop guide lobe 192 for the first re-entry loop guide post 93. The first re-entry loop guide post 93 is raised and held in position between Modes D and E, after which it remains in a raised position. The upper surface also has a pinch roller lobe 194 which controls operation of the pinch roller assemblies and other structures. The support platform and the pinch roller assemblies are raised from a lowered position starting at Mode H, and maintained in a raised position for Modes L, K, I and J. The pinch roller lobe 194 is a complex lobe which has horizontal surfaces for some cam followers, and generally vertical surfaces for other followers. Further detail is to be described with reference to FIGS. 13–16.

Referring to FIG. 8a, the lower surface 188 has tape shifter groove 196 which is active for Modes A through H, after which the cam follower is stationary. The lower surface 188 also has a second re-entry loop guide lobe 198 which is actuated starting at Modes F through G, after which the cam follower is stationary as the loop guide post 94 is held in a raised position.

FIG. 9

Figure 9:
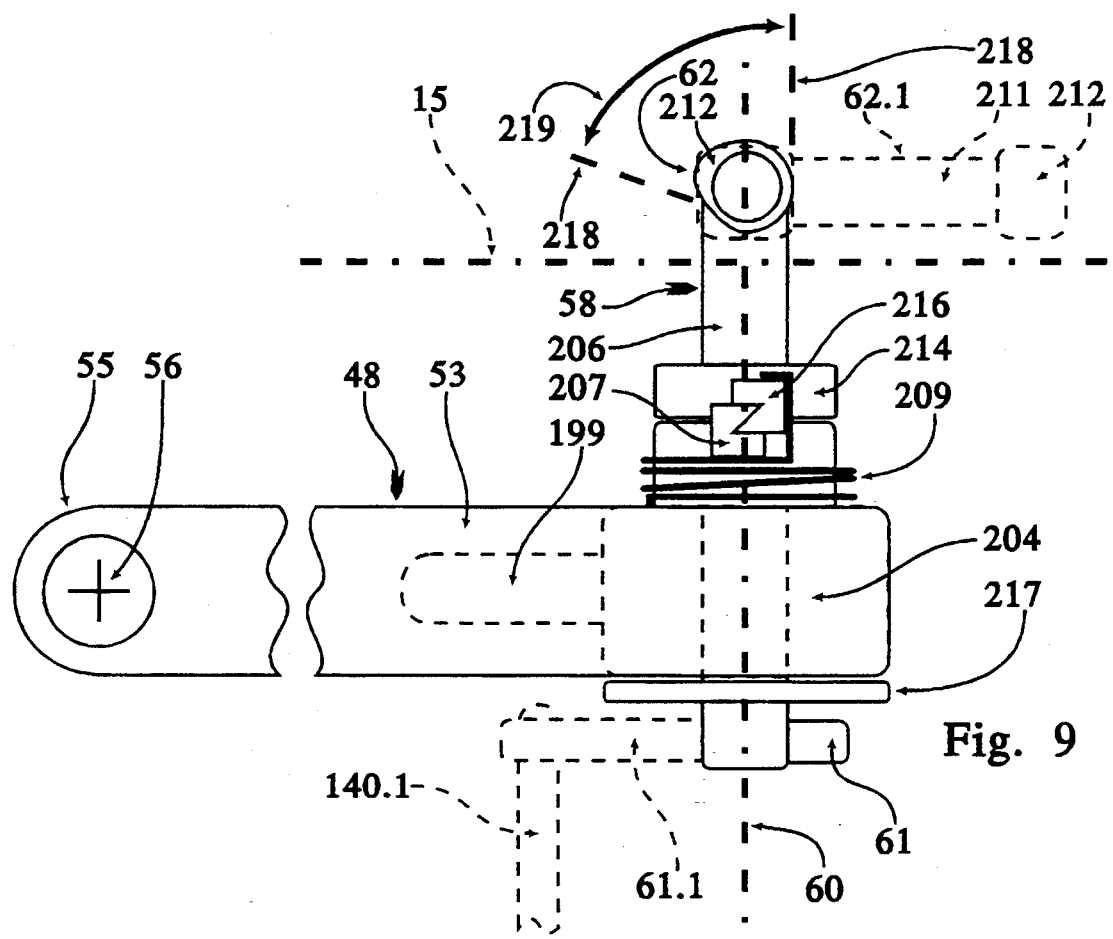
FIG. 9 is a top plan view similar to FIG. 4, showing a tape holder in retracted and extended configurations.

The outer portion 53 of the tape shifter 48 has a sleeve bearing 204 which receives a central shaft 206 of the tape holder 58. The sleeve bearing carries a locking tooth 207, and a torsion coil holder spring 209 passes therearound and has one end anchored by the arm 48. The shaft 206 has a shoulder portion 214 having a locking tooth 216 which is complementary to the locking tooth 207 secured to the sleeve bearing 204. The coil spring 209 has an opposite end engaging the locking tooth 216 to apply a torque to the shaft 206, so as to force the locking teeth into mutual engagement as shown in FIG. 9. Thus, when the inner portion 61 is released, the holder spring 209 rotates the tape holder 58 until the locking teeth engage each other, so that the outer portion 62 is held accurately in a full outline position extending normally to the arm 48. Thus, the holder spring 209 cooperates with the tape holder 58 and the tape shifter 48 so as to urge the tape holder to the extended position for engagement with the tape. It can be seen that the inner portion 61 of the tape holder 58 serves as a tape holder cam follower which cooperates with the tape holder cam lobe 140 (shown in broken line at 140.1 in FIG. 9), thus serving as a cam means for rotating the tape holder in response to relative movement between the cam means and the cam follower. A retaining ring 217 is disposed between the inner portion 61 and the bearing 204 for assembly purposes.

The outer portion 62 of the tape holder has a tape guide post 211 with an end stop 212, and is shown in broken outline in a first or retracted position immediately after passing under the tape 15, shown diagrammatically, as in Mode B, the post 211 being disposed normally to the axes 18 and 19 of the reels. The inner portion 61 at an opposite end of the shaft is similarly shown in the first or retracted position 61.1, and both inner and outer portions are held in these positions by the tape holder lobe 140 which is carried on the sliding cam plate 136 as seen in FIG. 2. Approximate location of the lobe 140 is shown in FIG. 9 at 140.1 and also in FIG. 3. After the cam plate 136 is shifted to Mode C, FIG. 4, the force from the spring 209 rotates the holder 58 and the post 211 through 90 degrees to assume a second or extended position as shown in full outline in FIG. 9 adjacent an inner face of the tape 15, the post being parallel to the axes of the cassette reels. The end stop 212 has an asymmetrical, generally pear-shaped lead-in profile, shown in full outline, to assist in passing behind the tape 15 to attain the tape engaging Mode C.

Figure 10:
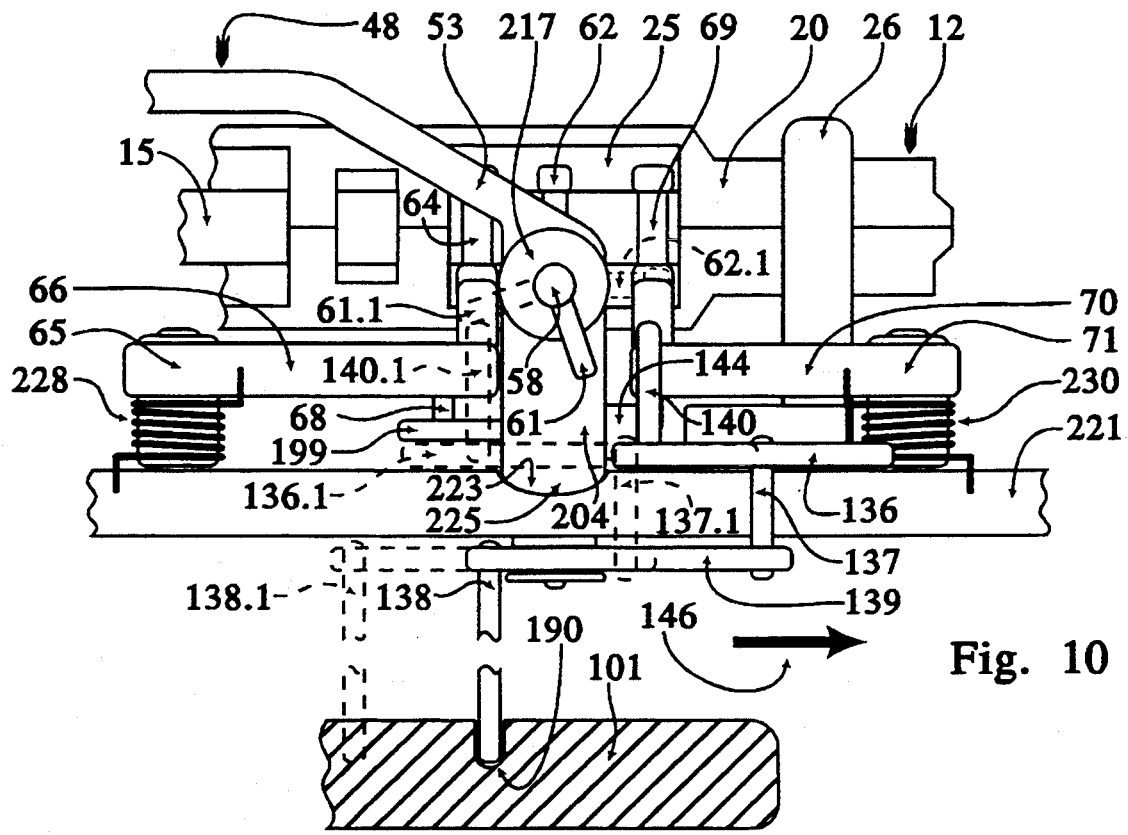
FIG. 10 is a simplified fragmented view on line 10—10 of FIG. 4, showing some components adjacent and associated with the holder of FIG. 9.
Figure 11:
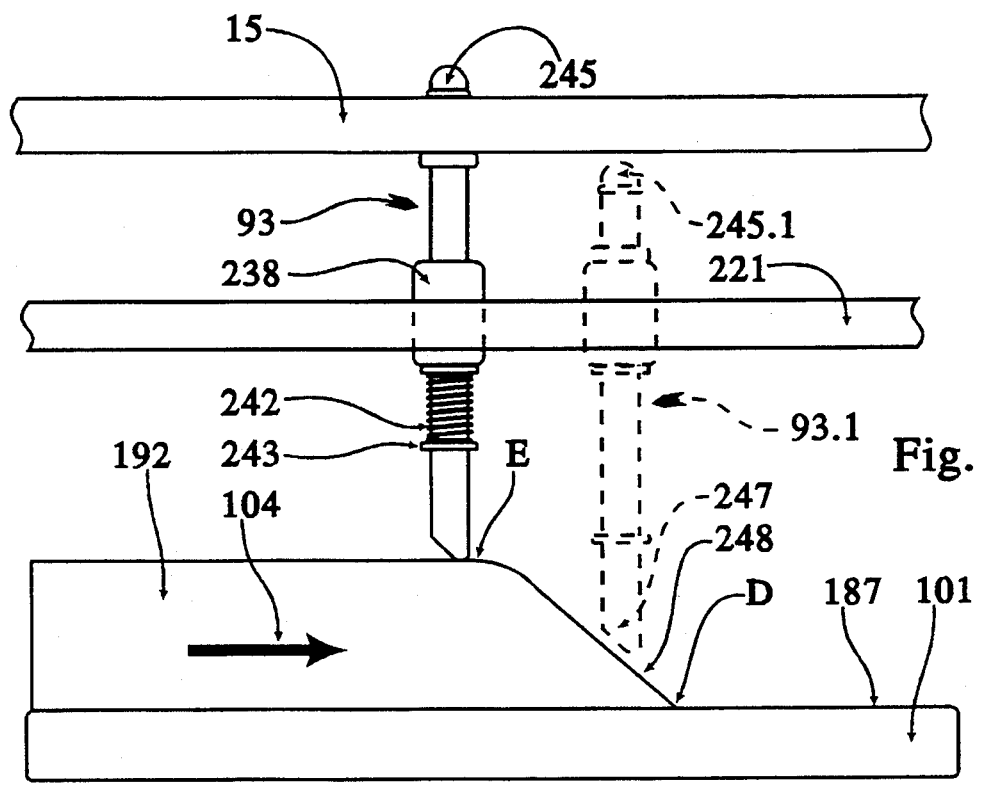
FIG. 11 is a simplified fragmented section on line 11—11 of FIG. 5, showing a first re-entry loop guide in retracted and extended configurations.

The inner portion 61 of the tape holder thus serves as a cam follower which engages the tape holder lobe 140 as will be described with reference to FIG. 10. An anchor pin 199 extends from the bearing 204 on the tape shifter to engage an anchor to locate the outer portion 53 in the fully extended position of Modes H–L, to be shown in FIG. 17.

Forces from the tape 15 acting on the guide post 211 for all positions of the shifter 48 are contained within envelope boundaries 218 spaced angularly apart at an angle 219. These forces tend to force the teeth 207 and 216 into engagement with each other, thus augmenting engaging force generated by the coil spring 209. As noted in the brief description relating to FIGS. 3 through 7, the tape shifter arm rotates the hinge axis 56 through 180 degrees, while concurrently drawing the tape from the well. During this arm rotation, force from the tape acting on the post 211 is in a generally similar direction, and in all positions of the arm tends to force the teeth 207 and 216 into mutual engagement. This provides a relatively stiff support for the tape when extracted from the cassette.

In summary, it can be seen that the tape holder has the outer portion 62 which is rotatable between extended and retracted positions, and that the teeth 207 and 216 serve as holder stop means for limiting movement of the outer portion of the tape holder in the extended position. The holder stop means thus cooperates with the tape shifter so as to react against forces generated on the holder by the tape during lateral displacement of the tape by the tape shifter, and during processing of the tape. It can be seen that in the extended position, the outer portion of the tape holder is parallel to the shifter hinge axis 56, and in the retracted position, the outer portion of the tape holder is generally normal to the shifter hinge axis.

FIG. 10

As previously stated, many of the components of the first embodiment 31 are carried on a transport chassis, herein designated 221, a portion of which is shown adjacent the exit and entry guide posts. An upper surface of the chassis carries a guide groove 223 which receives a complementary lower end 225 of the bearing 204 located at the outer portion 53 of the tape shifter. Cooperation between the end 225 and the guide groove 223 facilitates location of the outer portion 53 of the tape shifter arm 48, thus reducing chances of misalignment of the tape holder as it enters or leaves the well of the cassette. It can be seen that the shifter arm 48 is positioned to pass above the chassis 221 and the components of the apparatus mounted on the chassis.

The inner and outer portions 61 and 62 of the tape holder 58 are shown in full outline in the raised or extended positions, corresponding to Mode C, and in broken outline at 61.1 and 62.1 corresponding to Mode B, which correspond to the similar positions shown in FIG. 9. The slide cam plate 136 and corresponding cam plate cam follower 138 are shown in full outline in positions corresponding to Mode C, and in broken outline at 136.1 and 138.1 in positions corresponding to Mode B. When the tape holder lobe 140 on the cam plate is in the position of Mode B at 140.1, the inner portion 61 contacts the lobe 140 and is held against the spring force from the spring 209 (FIG. 9). As the cam plate shifts per arrow 146 in accordance with the cam movement, the inner end 61 rotates through 90 degrees, causing a corresponding rotation of the outer end 62 to assume the full outline position as shown. Thus, it can be seen that the sliding cam plate 136 in combination with the primary cam disk 101 holds the inner end 61 in the retracted position as shown in broken outline and, upon rotation of the cam disk 101, permits the inner end to rotate through 90 degrees in response to movement of the cam plate. Thus, it can be seen that there is a chain of events for actuation of the tape holder extending from the primary cam disk 101, through the cam follower 138 to the plate 136, which, through the cam lobe 140 releases the tape holder 58 in response to movement of the primary cam disk.

The exit guide cam follower 68 at the outer end of the exit guide post support 66 is similarly held by the exit guide lobe 144 carried on the cam plate 136. The inner end 65 of the support 66 has a coil spring 228 biasing the support 66 to the full outline position as shown, in accordance with arrow 63 in FIG. 1. Thus, when the cam plate 136 moves per arrow 146, the exit guide posts 64 assumes the position as shown in FIG. 1. Similarly, the inner end 71 of the entry guide post 70 has a similar torsion coil spring 230 which biases the support in accordance with the arrow 74 of FIG. 1, to position the entry guide post 69 in the position as shown.

FIG. 11

The first re-entry loop guide post 93 is shown in full outline in a raised position in accordance with Mode E, and in broken outline in a lowered position at 93.1 shortly after passing through Mode D. The guide 93 is supported in a guide bearing 238 mounted on the chassis 221 to support the guide for vertical movement through the guide bearing sleeve. A compression coil spring 242 encircles the guide post 93 and extends between the bearing 238 and a spring stop 243 carried on the guide post, thus biasing the guide 93 downwardly. The guide post has an upper end 245, best seen in broken outline at 245.1, having spaced shoulders to receive and locate the magnetic tape 15 therebetween. The guide has a lower end 247 which engages the upper surface 187 of the cam disk 101 or the lobe 192 on the cam.

When the guide is retracted as shown in broken outline, the end 247 is closely adjacent or engages the cam surface 187. However, as the cam rotates per the arrow 104 through Mode D, a ramp 248 of the lobe 192 engages the end 247 and moves it upwardly so as to extend the re-entry loop guide post into a raised or operative position as shown in full outline to engage the tape 15.

FIG. 12

The second re-entry loop guide post 94 is shown in a raised position in full outline and is mounted for axial sliding through a guide bearing 251 mounted on the chassis 221. The guide post 94 has an upper end 255 adapted to engage the tape 15 when in a raised position, and has a lower end 257 adapted to cooperate with a rocker 259. A coil spring 260 extends between the bearing 251 and a spring stop 262 so as to bias the guide 94 to a lowered position, the lower end being shown in broken outline in a lower position at 257.1.

The rocker 259 is journalled for rotation about a rocker journal 264 between a raised position, shown in full outline, and a lower position shown in broken outline at 259.1. The second re-entry loop guide lobe 198 extends downwardly from the lower surface 188 of the cam disk 101 and has a partially spiral step member 266 extending around a periphery thereof. Vertical spacing between the step member and the lower surface 188 varies, which imparts generally vertical motion to an inner end 268 of the rocker, which in turn imparts an opposite motion to an outer end 269 of the rocker, which translates to axial vertical motion for the guide 94. Clearly, the end 257 is held in contact with the outer end 269 due to force from the spring 260 so as to impart accurate motion to the end 255 to control location of the tape. Referring also to FIG. 8a, the rocker is shifted from the broken outline position, representing modes prior to Mode F, to the full outline position, representing Mode G which is sustained for normal operation of the apparatus.

FIGS. 13 through 16

Figure 13:
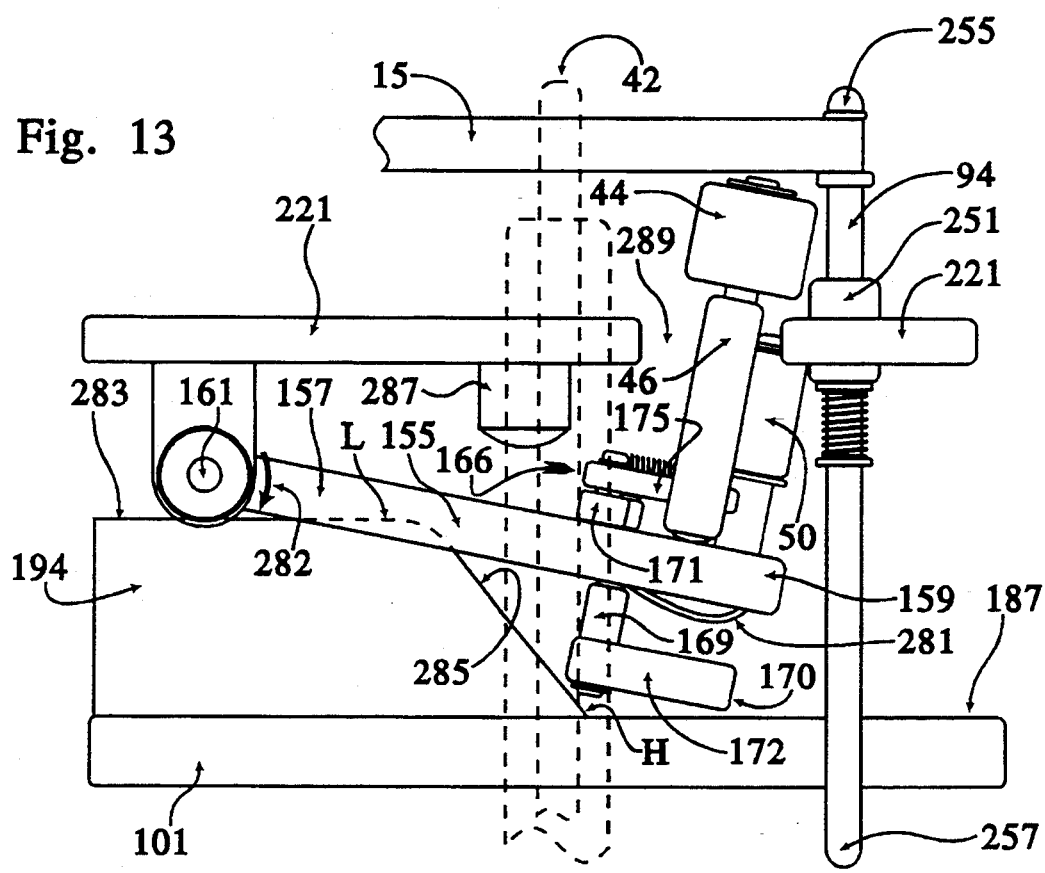
FIG. 13 is a simplified fragmented section on line 13—13 of FIG. 6 showing a pinch roller mounting structure in a retracted position.

In FIG. 13, the pinch roller support platform 155 is shown in a lowered or retracted position immediately prior to Mode H, where the pinch roller 44 is clear of the magnetic tape 15, shown extending around the second reentry loop guide post 94. A pair of platform retraction springs, not shown, preferably cooperates with the respective bearings 161 and 162 of the platform to bias the platform 155 to the retracted position as shown by arrow 282. This ensures that the platform assumes the retracted position unless directly moved into an extended position, even if installed in a front loading machine with the platform disposed generally vertically. The intermediate portion 159 of the platform has a downwardly extending leaf spring 281 which is adapted to contact and ride upon an upper surface 283 of the pinch roller lobe 194, against force from the retraction springs and weight of the platform and pinch roller assemblies. The lobe 194 has a ramp 285 which extends upwardly from the upper surface 187 of the cam, representing Mode H, and merges smoothly into the upper surface 283 of the lobe at Mode L. One platform stop 287 of a pair is shown extending downwardly from the chassis 221 and has a lower end accurately positioned to locate the platform horizontally, as shown in FIG. 14 in an extended position.

The second roller arm hinge 50 is secured to the intermediate portion 159 of the platform and thus carries the second pinch roller arm 46 and pinch roller 44 as a unit. The second pinch roller assembly 166 is similarly mounted on the platform 155 so that the upper link 171 and the lost motion link 175 are positioned generally above the platform 155, and the lower link 172 having the cam follower 170 is positioned below the platform. The second capstan 42 is shown in broken outline and is carried on the chassis 221, and thus is independent of movement of the platform 155. The chassis 221 has a chassis clearance opening 289 to receive the pinch roller assembly extending therethrough in both the retracted position as shown in FIG. 13, and the extended position as shown in FIG. 14.

Figure 14:
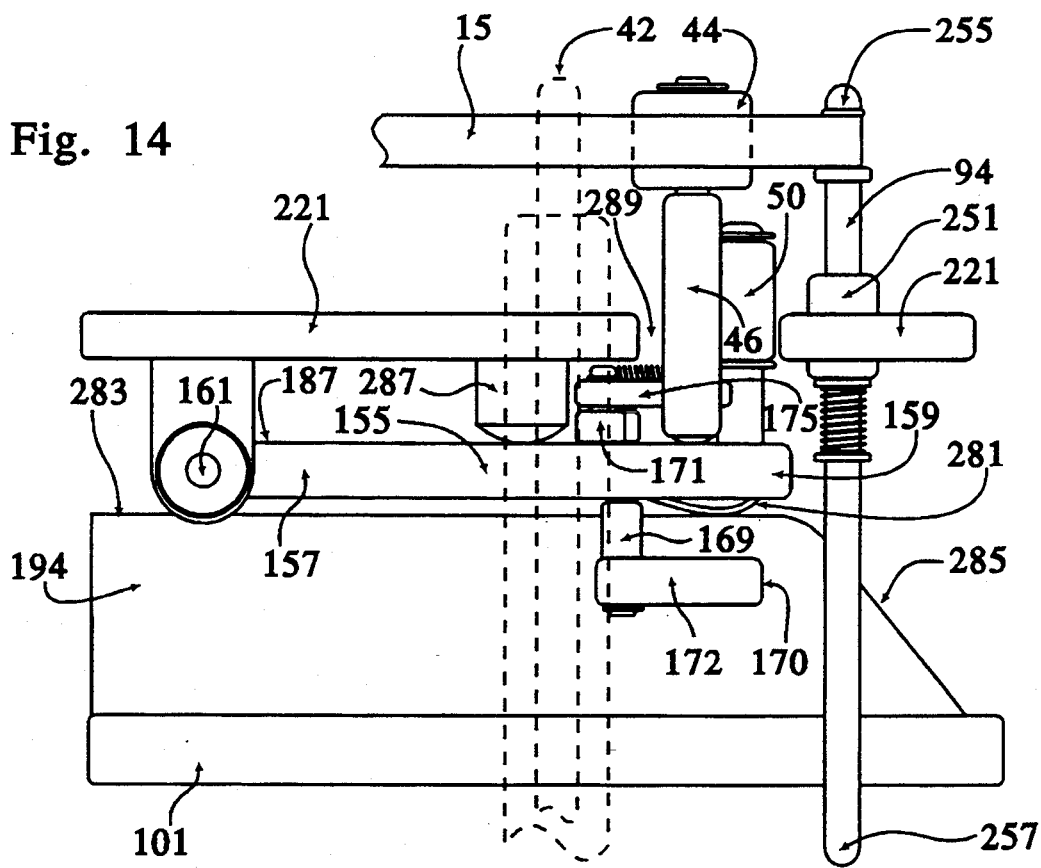
FIG. 14 is a simplified fragmented section on line 14—14 of FIG. 2 showing the pinch roller mounting structure in an extended position, in Stop/Pause mode.

Referring to FIG. 14, the platform 155 is shown generally horizontal and in the extended position, wherein the spring 281 forces the upper surface 187 of the platform against lower ends of the platform stops 287 (one only being shown), thus maintaining an accurate location of the platform. Thus the pinch rollers 43 and 44 are mounted on the pinch roller support 155 for movement between retracted and extended positions thereof, the pinch roller support cooperating with the cam means, e.g. the disk 101, to position the pinch roller support in the extended position, and to retract the pinch roller support from the extended position. In this position, the pinch roller 44 can be brought into operative engagement with the second capstan 42 so as to transport the tape as is well known.

Figure 15:
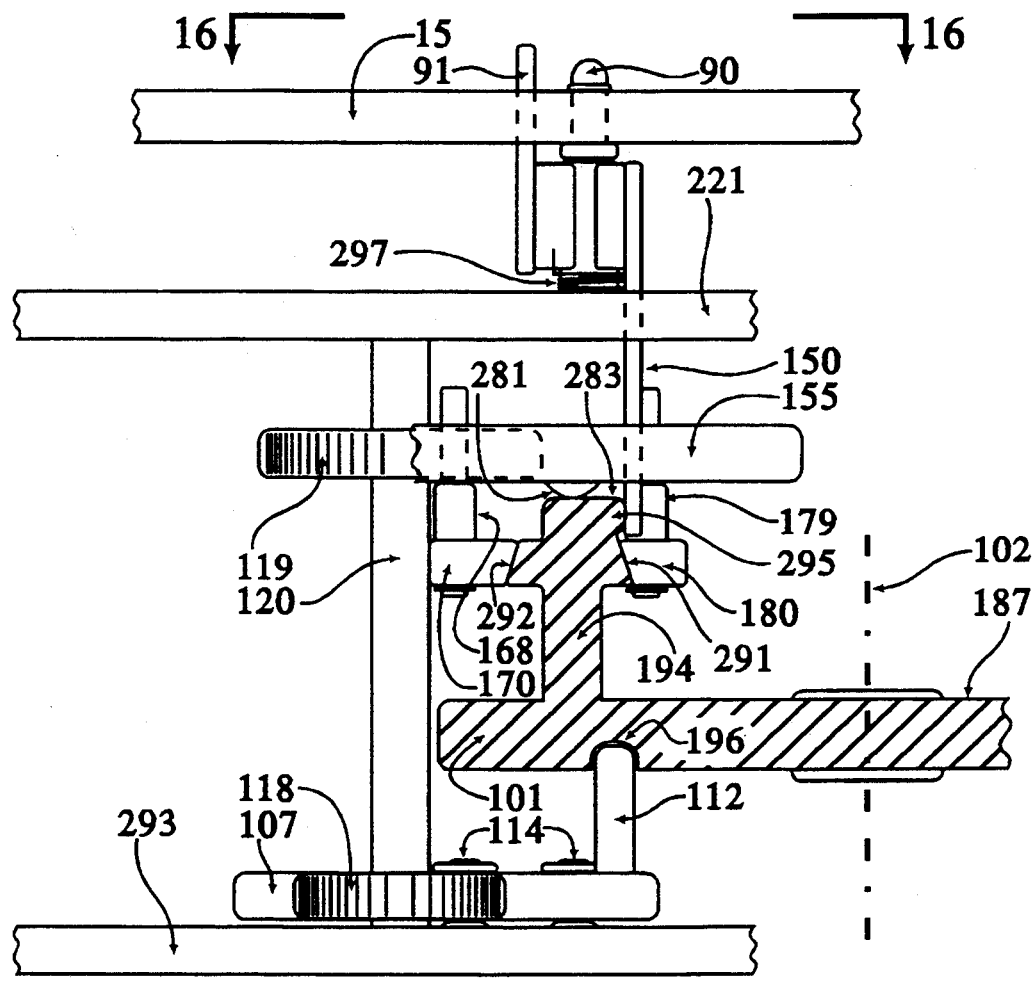
FIG. 15 is a simplified fragmented section on line 15—15 of FIG. 7 showing a structure associated with the cam disk and pinch roller assembly, some portions being omitted for clarity.

Referring to FIG. 15, the pinch roller lobe 194 has several cam surfaces and performs several functions as follows. As previously described, the upper surface 283 and the ramp 285 of the lobe 194 serve to raise the support platform 155 to the extended position and hold the platform under the influence of the spring 281. In addition, the pinch roller lobe 194 has horizontally spaced apart first and second roller cam surfaces 291 and 292 which are inclined to the vertical at generally similar shallow angles. The first and second cam followers 180 and 170 have similarly inclined, complementary engaging surfaces which are forced into contact with the cam surfaces 291 and 292 in Mode J, the play-/record mode. The cam followers 180 and 170 engage the surfaces 291 and 292 respectively and rotate the respective bellcranks to force the pinch rollers against the respective capstans in the play/record Mode J. The surfaces 291 and 292 are disposed on opposite sides of the pinch roller cam lobe 194 and are generally aligned horizontally and thus, when the surfaces are engaged by the cam followers 180 and 170, forces from the cam followers are applied in aligned, generally opposite directions so that forces on the lobe 194 are generally balanced, which reduces any tendency of forces from the pinch rollers to distort the cam lobe 194.

It is noted that the pinch roller support 155 is resiliently held by the spring 281 against the support stop 287 in the extended position. The inclined surfaces 291 and 292 generate small upwards components of force on the respective cam followers, which counteracts reactive forces on the platform generated by the pinch rollers, thus reducing any tendency for the platform 155 to be forced downwardly by overcoming the force from the spring 281 which might otherwise occur. Thus, in summary, each pinch roller has a pinch roller cam follower engagable with the cam means when the pinch roller support is in the extended position. Each pinch roller is moveable by the cam means and the respective cam follower from a disengaged position clear of the tape to an engaged position in which the tape is pinched between the pinch roller and the respective capstan. The pinch roller cam follower has a contact face engageable with the roller cam surface and inclined at an angle so as to be complementary to the roller cam surface. In this way, force between each roller cam surface and the respective roller cam follower generate a reaction force to act against the support stop 287 so as to augment holding of the pinch roller support in the extended position.

As described previously with reference to FIG. 2, the first and second pinions 118 and 119 are mounted for mutual concurrent rotation on the pinion spindle 120. The spindle 120 has upper and lower ends journalled for rotation in the transport chassis 221 and a sub-chassis 293 respectively, the sub-chassis being positioned below the chassis 221. The shouldered rack pins 114 which constrain the rack 107 for axial motion are also mounted on the sub-chassis 293 to maintain engagement between the first pinion 118 and the shifter rack 107. The shifter rack cam follower 112 is shown engaging the groove 196 in a lower surface of the cam disk 101.

It can be seen that the tape shifter arm 48 has a tape shifter cam follower, namely the shifter rack cam follower 112 which cooperates with the cam means i.e. the disk 101, through the rack 107, and also with the first and second pinions 118 and 119. The pinion 119 meshes with the second gear shifter means 110, as shown in FIG. 2, which rotates the tape shifter in response to relative movement between the cam means and the tape shifter cam follower.

Figure 16:
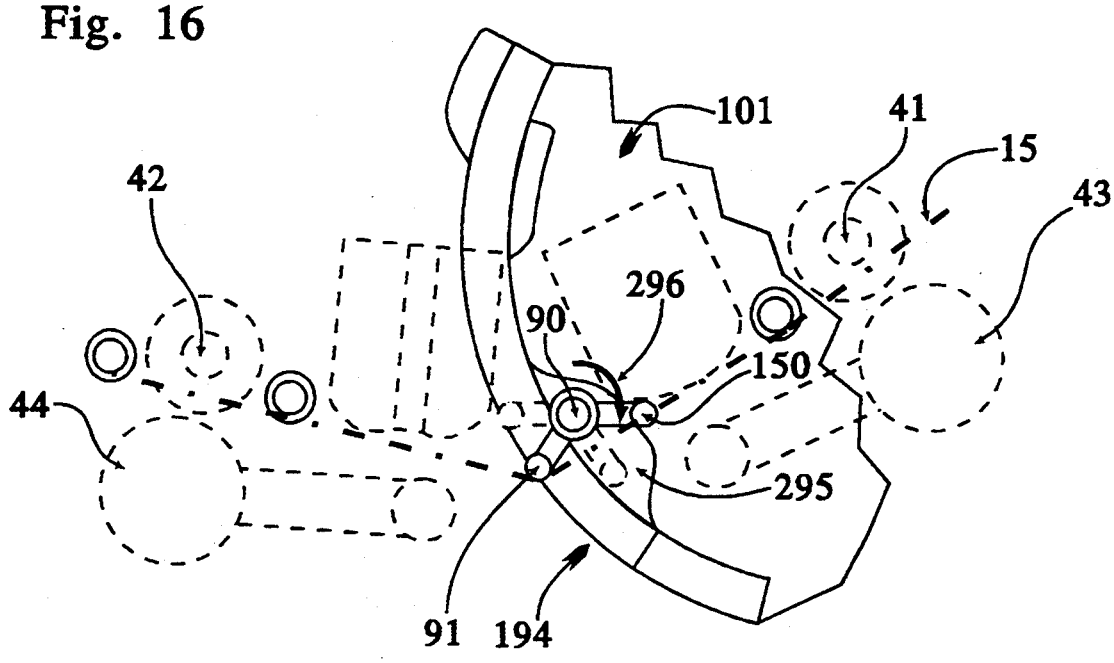
FIG. 16 is a simplified top plan view of a tape lifter being generally similar to a portion of FIG. 7, but shown in a fast wind mode, with some details omitted for clarity.

Referring to FIGS. 15 and 16, the lobe 194 has a tape lifter cam surface 295 which is engaged by a lower end of the tape lifter cam follower 150 which extends through clearance openings (not shown) in the chassis 221 and the support platform 155. The tape lifter includes a torsion spring 297 which applies a torque to the tape lifter 91 per arrow 296 so as to bias the tape lifter to a normal retracted position, but in the fast wind Mode L, the tape lifter cam follower 150 is forced into engagement with the lobe 295 as shown in FIG. 16 which rotates the tape lifter to disengage the tape from the magnetic heads. Thus, in normal operation of the apparatus, the length of extracted tape is passed against a fixed tape guide adjacent the magnetic head. To activate the tape lifter, the tape lifter is rotated about the fixed tape guide to contact the tape, so that further rotation lifts the tape off the tape guide and also off the magnetic heads.

Thus, the tape lifter 91 extends from the tape guide post 90 so as to be spaced radially from the tape guide axis concentric with the tape guide post. The tape lifter is mounted for rotation about the tape guide axis between retracted and extended positions thereof so that in the retracted position the lifter is clear of the tape, and in the extended position the lifter is in contact with the tape so as to lift the tape clear of the magnetic head. The tape guide post is located adjacent the magnetic head and the tape lifter has a tape lifter cam follower cooperating with the cam means for rotating the tape lifter in response to relative movement between the cam means and the tape lifter cam follower.

Figure 18:
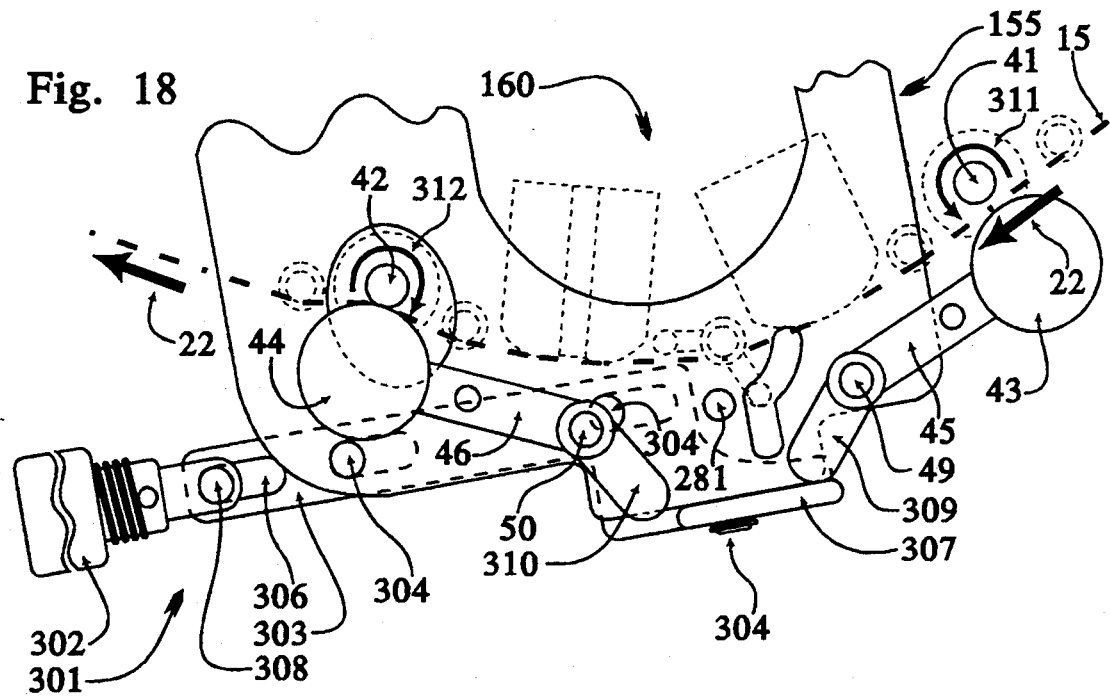
FIG. 18 is a simplified fragmented top plan view of a portion of the apparatus of FIG. 17 showing the pinch roller disabling mechanism in the forward drive mode.

FIGS. 17 and 18

In FIG. 17, for clarity the second shifter gear means 110 is shown "exploded" and displaced with an adjacent lower portion of the spindle 121 along the shifter hinge axis 56. The normal position of the gear means 110 is shown in broken outline at 110.1 within the clearance recess 160 (see FIG. 2) of the pinch roller support platform 155. The second shifter gear means 110 is journalled for limited rotation with respect to the spindle 121 and is retained on the spindle by a retaining ring 271. An upper surface of the gear means 110 has a spring stop 272 and pin/spring stop 273 extending upwardly therefrom. A tape shifter arm pin 274 extends radially outwardly from the spindle 121 to engage the pin/spring stop 273. An anchor torsion spring 275 encircles the spindle 121 and has one end biased against the spring stop 272, and an opposite end biased against the tape shifter arm pin 274, so as to apply a resilient torque between the gear means 110 and the spindle 121. A return torsion spring 277 has one end biased against the pin/spring stop 273, and an opposite end 278 formed to be received in a complementary opening in the chassis 221, as shown in 278.1. The return spring 277 applies a torque between the spindle 121 and the chassis 221 tending to bias the shifter arm 48 towards the well 25 as shown in FIGS. 3 and 4. The anchor spring 275 provides a resilience between the gear means 110 and the spindle 121 which permits a limited "over-travel" of the gear means 110 in response to movement of the shifter rack 107, which is transferred through the first pinion 118 and the second pinion 119 which drives the gear means 110. Accommodation for "over-travel" ensures that the outer portion 53 of the tape shifter is biased securely against the stop at the end of its travel, ensuring accurate location of the tape holder.

As originally described with reference to FIG. 10, the transport chassis has a guide groove 223 in the upper surface to receive the lower end 225 of bearing 204, as the tape holder is passed into the cassette well during Mode B. The groove 223 extends in a semi-circle from the cassette well to a position approximately 180 degrees apart, which is attained by the bearing 204 when the shifter arm 48 is in the fully extended position as in Modes H-L. In FIG. 17, the bearing 204 is located in this extended position by the anchor pin 199 engaging a complementary groove in an anchor block 300 extending from the transport chassis 221 as shown. Thus, the outer portion 53 of the tape shifter is located securely by the end 225 engaging the groove 223, and the anchor pin 199 engaging the anchor block 300. Furthermore, as previously described, particularly in this position, reaction to force from the tape 15 acting on the tape guide post 211 forces the locking teeth 207 and 216 into engagement with each other, augmenting force from the spring 209 (FIG. 9).

As previously described with reference to FIG. 7, Mode J discloses a play/record mode in which the capstan 42 and the pinch roller 44 draw the tape past the magnetic heads, and the capstan 41 rotates in the same direction as the capstan 42 and in conjunction with the pinch roller 43 also engages the tape but applies a light drag to the tape, to ensure uniform tape tension across the heads. This resembles a well-known dual capstan drive configuration for high performance tape machines.

If required, the first embodiment can include an alternative bi-directional capability (e.g. driving the tape in two directions) which facilitates interchanging direction of tape transport for playback and recording modes of magnetic tracks in opposite directions, without removing the cassette from the machine and subsequently reversing and reinserting the cassette into the machine. If bi-directional, dual capstan drive is required, direction of both capstans can be reversed as is well known.

If bi-directional drive is required using a single capstan drive, in this option the capstans rotate in opposite directions and the tape transport direction is determined by which capstan and pinch roller are engaged. The cam wheel remains in the same position as it would for a normal dual capstan play/record Mode J, and one of the pinch rollers is selectively disengaged from the respective capstan, depending on the direction of play. This alternative is attained by use of an optional disabling means 301 which is shown also in FIG. 17 and comprises a solenoid 302 having an actuator body connected to the chassis 221, and a disabling cam plate 303 slidably connected to the support platform 155 by a plurality of shouldered pins 304 fitted in oval openings within the plate to permit linear movement of the plate in accordance with an arrow 305. The plate 303 has an inner end having a slot 306, and an outer end having a disabling cam lobe 307 extending upwardly therefrom. The plate 303 is spring-loaded towards the forward mode position (right hand position as shown in FIGS. 17 and 18) but has a toggle latch mechanism to hold the cam plate in the reverse mode position (left hand position, not shown), as will be described. The solenoid has a plunger having a laterally extending connecting pin 308 which is received as a loose fit in the slot 306 of the plate. The plunger and pin 308 are normally spring biased outwardly, but can be retracted when the solenoid is energized. The pin 308 automatically engages the slot 306 when the platform 155 is raised from the retracted or lowered position, and disengages from the slot when the platform is lowered to the lowered or retracted position. This releasable connection simplifies incorporating the disabling means into an existing structure.

The disabling means 301 further comprises first and second disabling arms 309 and 310 which extend on opposite sides of the roller arm hinges 49 and 50 respectively, and are connected to the first and second pinch roller arms 45 and 46 respectively to rotate therewith. The disabling arms 309 and 310 are positioned closely adjacent the disabling cam lobe 307 so as to be selectively displaced by the cam lobe 307, depending on position thereof.

As shown in FIG. 18, the cam plate 303 is in the right hand position and the lobe 307 contacts the arm 309 to disengage the pinch roller 43 from the capstan 41. Thus the tape is engaged only by the second capstan 42 and second pinch roller 44 which feed the tape in forward direction of the arrow 22. During the stop/pause mode (Mode I), the disabling arms 309 and 310 are retracted from the disabling cam lobe 307, which is thus relieved of load. Actuation of the solenoid 302 results in the connecting pin 308 drawing the disabling cam plate 303 leftwards to latch the plate in the left hand position, not shown. When entering the Play/Record mode (Mode J), the disabling lobe 307 now contacts the second disabling arm 310 which lifts the second pinch roller 44 off the second capstan 42, and permits the first roller 43 and capstan 41 to engage the tape and feed the tape in a reverse direction.

Thus, it can be seen that the pinch roller disabling means comprises the cam actuator 302, which is responsive to control signals to be described, and has an actuator body fixed with respect to the chassis of the apparatus. The cam actuator also has a first releasable connector portion, that is, the connecting pin 308, which is movable with respect to the actuator body in response to the control signals. The disabling means also comprises a disabling cam means, namely the cam plate 303, mounted on the support platform 155 for movement therewith, and for independent movement between first and second positions of the disabling cam means. The disabling cam means has a second releasable connector portion, namely the slot 306, which is complementary to and engagable with the first releasable connector portion, i.e. the pin 308, when the support platform is in the extended position, and is disengagable from the first releasable connector portion when the support platform is in the retracted position.

Operation of First Embodiment

When the first embodiment 31 is de-activated, components of the apparatus assume the pre-loading Mode A, as shown in FIG. 3. The cassette 10 can be positioned in the compartment 29, with the processing edge portion 20 being located adjacent the two control surfaces 26. The tape shifter arm 48 is in the retracted position clear of the cassette, and the outer portion 62 of the tape holder 58 is retracted to be in a lowered position, and force from the spring 209 (FIG. 9) acting on the holder is resisted by the inner end 61 contacting the lobe 140. The re-entry loop guide posts 93 and 94 and the pinch roller platform 155 are also retracted or lowered, and automatic tape slack take-up is performed by actuating the reel motors.

In Mode B, not shown, the cam disk 101 is rotated so that the shifter rack cam follower 112 is moved by the tape shifter groove 196 (FIG. 8a) which rotates the arm 48 anti-clockwise and moves the outer portion 53 inwardly towards the cassette to attain the inserted position. The inner portion 61 of the tape holder slides along the lobe 140 to maintain the outer portion 62 retracted so that the outer portion 62 can pass freely between a lower edge of the tape 15 and a lower wall of the cassette well, see FIG. 10. To ensure accurate location of the outer portion 62, the lower end 225 of the bearing is guided by the groove 223 as shown in FIG. 10 until the stop is encountered.

Referring to Mode C in FIG. 4, further rotation of the cam disk 101 causes the well guide cam groove 190 to force the cam plate cam follower 138 outwardly. This, in turn, shifts the cam plate 136 outwardly, which concurrently causes relative movement between the inner end 61 of the tape holder 58 and the tape holder lobe 140. When the inner portion 61 slips off the end of the lobe 140, spring force acting on the tape holder 58 rotates the tape holder through 90 degrees with respect to the tape shifter to raise the outer portion 62 through 90 degrees to the extended position, as shown in FIGS. 9 and 10, adjacent an inside face of the tape. It is important that the tape 15 is not slack to avoid interference with the outer end 62 during rotation of the tape holder about the tape holder axis. It can be seen that the lobe 140, the inner end of the tape holder, and springs associated with the tape holder serve as tape holder rotating means for rotating the tape holder about the holder axis after entering the well of the cassette so as to position the holder adjacent an inside face of the portion of the tape, so as to permit subsequent extraction of the said tape portion. Essentially concurrently, the outwards movement of the cam plate 136 causes the exit guide cam follower 68 to slip off the exit guide lobe 144, and the entry guide cam follower 73 to slip off the entry guide lobe 142. This permits both the exit guide post 64 and the entry guide post 69 to enter the well of the cassette, by rotation of the corresponding supports. Thus the exit and entry tape guides cooperate with the cam means, that is the cam plate 136, which in turn cooperates with the cam disk 101, so as to be extendable into the well of the cassette, and to be retractable away from the cassette upon reversal of the movement to permit insertion and removal of the cassette.

Referring to FIG. 1a, the outer portion 62 of the tape holder is shown adjacent an inner face of an undisturbed portion of the tape 15 extending through the well 25, and in light contact with the guide posts 64 and 69. It is noted that there is adequate clearance between adjacent portions of the tape holder 58, and the post 64 and 69, to permit slight lateral movement of the tape holder 58 as the tape shifter rotates about the tape shifter hinge for entering and leaving the well. The location of the tape shifter hinge is such that, as the tape holder is drawn out of the cassette well, initial movement of the tape holder immediately adjacent to the cassette is generally perpendicular to the processing edge 20 of the cassette. This requires that the tape shifter hinge axis 56 be located relatively closely adjacent the processing edge so that curvature of the arc of travel 59, which results in some lateral movement of the holder 58, does not result in interference between the holder 58 and the guides 64 and 69. Adequate clearance is available provided the radius of the arm is sufficiently long and the tape holder is sufficiently short to provide clearance between the posts 64 and 69 for the initial movement of the tape holder.

In Mode D, not shown, the reel brakes are released and preferably back tension is applied to both reel hubs. Continued rotation of the cam disk produces outward movement of the shifter rack cam follower 112, which in turn rotates the shifter arm 48 clockwise so as to draw a V-shaped length of tape out of the well, the tape being drawn across the exit and entry guide posts 64 and 69 to prevent the exit and entry portions of the tape from contacting sides of the well during extraction and processing of the tape. After about 60 degrees of rotation of the arm, the arm pauses.

FIG. 5 shows Mode E, in which the first re-entry loop guide post 93 is moved upwardly in between the exit and entry portions 36 and 37 of the tape path 34. This upward movement is due to rotation of the first re-entry loop guide lobe 192 under the lower end of the guide 93, see FIG. 11.

In Mode F, not shown, the loading arm continues further rotation clockwise due to rotation of the cam disk 101, and at about 145 degrees from the starting position, it pauses for a second time.

Figure 12:
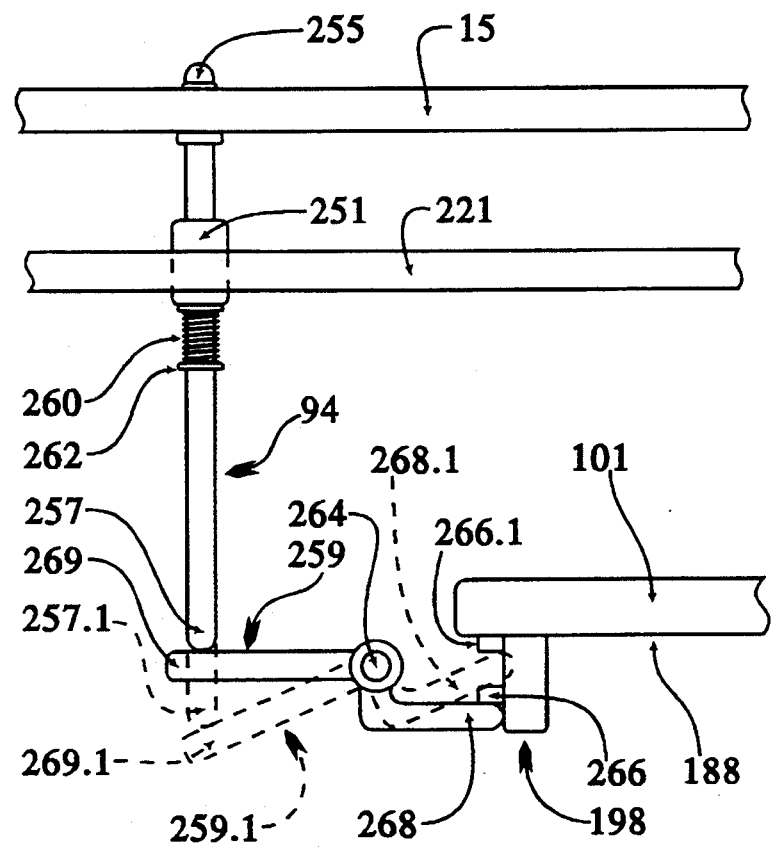
FIG. 12 is a simplified fragmented section on line 12—12 of FIG. 6 showing a second re-entry loop guide in retracted and extended positions.

In Mode G, not shown, during the second pause following Mode F, the second re-entry loop guide lobe 198, see FIG. 12, rotates and moves downwardly so as to move the inner end 268 of the rocker 259 downwardly, causing a corresponding upward movement of the outer end 269 which forces the second re-entry loop guide post 94 upwardly to assume the raised position shown in FIG. 12.

In FIG. 6, in Mode H, the arm 48 has rotated approximately 180 degrees from the initial position to assume its final position as shown. In this position, the exit portion 36 of the tape path has been wrapped around the two magnetic heads and associated guides. As seen in FIG. 17, the bearing 204 is stabilized by the lower end 225 engaging the groove 223, and the anchor pin 199 engaging the anchor block 300. It can be seen that the shifter rack 107 and the shifter gear means 109 and 110 and associated structures serve as tape shifter rotating means for rotating the inner portion 52 of the tape shifter about the shifter hinge axis 56 to move the tape holder 58 towards the well of the cassette.

The tape holder is thus operable to draw a length of extracted tape from the well of the cassette body so that one of the tape portions is drawn in a tape path swept by the tape shifter through the travel arc 59 of FIG. 1, to extend across and to contact the tape contact surface of the magnetic head. At least one, but preferably two, re-entry loop tape guides are positionable adjacent a remaining tape portion and are mounted to maintain spacing between the exit and entry portions of the tape. This is to restrain the remaining tape portion against lateral movement with respect to the magnetic head to prevent interference with the said one tape portion, the magnetic head, the capstan and the pinch roller. Thus, the re-entry loop guides 93 and 94 permit one or more pinch rollers to be positioned between the exit and entry portions of extracted tape without interference therewith. Clearly, the tape contact surfaces 79 and 80 of the magnetic heads are on sides of the heads remote from the cassette and in contact with a concave side of an arc of the extracted tape portion passing across the magnetic heads, to provide a convenient and adequate arcuate tape wrap of the heads. Furthermore, the re-entry loop tape guides are retractable out of the tape path of the extracted tape to permit shifting of the tape by the tape shifter to extend across and contact the tape contact surface without interference. It is noted that when the tape holder is located in the final operative position as shown in Mode H, most of the extracted length of tape is inclined obliquely or non-perpendicularly to the processing edge of the cassette and, as best seen in FIG. 1a, portions of the exit and entry tape portions 36 and 37 are inclined at the specific acute angles 54 and 57.

In Mode I, not shown, the pinch roller platform is moved from a retracted or lowered position in Mode H, see FIG. 13, to the extended or raised position in Mode I, similar to Mode L as shown in FIG. 14. The pinch roller lobe 194 moves and contacts the platform 155, overcoming force from the platform spring (not shown) which biases the platform to the lowered position as shown in FIG. 13. In the raised position of the platform, the pinch roller 43 (not shown) and the roller 44 are moved to be adjacent their respective capstans, but are spaced therefrom in this mode.

At this point, the cam disk continues to rotate in the loading direction, and thus passes the Mode L, for fast forward/rewind and Mode K, the search mode, and eventually stops at Mode I, the stop/pause mode which is shown diagrammatically in FIGS. 1 and 2. When passing the fast forward/rewind mode on the cam wheel, a small amount of tape slack is created as the tape lifter momentarily engages and disengages the tape loop wrapped around the head assembly. Reel brakes then engage the reel hubs and automatic slack take-up is activated to eliminate tape slack after reaching the stop/pause Mode I. The tape extraction and engaging or threading process is now complete and ready for other operations.

To initiate play/record in Mode J, as seen in FIG. 7, the reel brakes are released and the reel motor is activated in the forward direction. The cam disk 101 rotates further so that the first and second roller cam surfaces 291 and 292 engage the first and second cam followers 180 and 170 as seen in FIG. 15, which moves the pinch rollers 43 and 44 inwardly to engage the respective capstans 41 and 42 so as to feed the tape in a dual capstan configuration.

To engage the Mode K, the search mode, not shown, the rotation of the cam disk from stop/pause mode is reversed, with the pinch rollers already disengaged from the capstans. The tape lifter remains disengaged. The reel brakes are disengaged and the reel motor is activated to fast wind the tape in either direction, while the tape is held in contact with the heads for search or cueing functions.

To engage the fast forward/rewind Mode L, the pinch rollers are disengaged from the capstans, and the tape lifter cam surface 295 contacts the tape lifter cam follower 150 and rotates the tape lifter 91 to an extended or engaged position as shown in FIG. 16, thus lifting or moving the tape clear of the magnetic heads. The reel brakes are disengaged and the reel motor is activated to fast wind the tape in either direction as required.

Referring to FIGS. 17 and 18, the alternative disabling/reversible mode using single capstan drive is only applicable if the optional disabling means 301 is installed. If the means 301 is installed, the operator must first press a direction reversal control on the control panel of the apparatus, which automatically engages the stop/pause mode (Mode I), unless this mode was already engaged before the reversal control was pressed. In the stop/pause mode, both pinch rollers are released by movement of the pinch roller lobe 194 (FIG. 8) which then releases the cam plate of load imposed by the currently disabled pinch roller disabling arm so as to facilitate movement of the cam plate. The solenoid 302 is then automatically momentarily actuated to toggle the cam plate in position to disengage the appropriate pinch roller from the respective capstan, so that the remaining pinch roller is engaged by actuation of the cam lobe 194 to permit driving the tape in the appropriate direction. The apparatus then automatically enters play/record mode and the tape is thus transported in the newly selected direction. To obtain a reverse mode from the forward mode as shown (or at least the opposite direction mode), the direction mode reversal is again operated by the user and the apparatus automatically enters Stop/Pause mode, followed by switching of the cam plate into the reverse mode position by momentary activation of the solenoid 302, during which the pin 308 pulls the cam plate towards the left hand position 303.1. The solenoid is then shut off but the toggle latch mechanism on the cam plate holds the plate in the reverse mode position (left hand position). This is followed by the automatic entry of play/record mode to transport the tape in the newly selected direction. To switch back to forward mode, the solenoid is activated again when Stop/Pause mode is automatically entered, which in turn causes the pin 308 to pull the cam plate towards the left hand position, releasing the latch on the cam plate and allowing it to spring back to forward mode (right hand position).

Since the cam plate 303 essentially determines the current direction of the transport for play/record modes, the toggle latch mechanism allows the transport to retain the last direction mode selected even after the power to the apparatus is shut off. This permits the continuation of operation of the apparatus in the same direction mode when power is restored, and is of particular importance if the apparatus has timer start capability, since the transport can then start in the direction for play/record that was selected before the external power was shut off for the apparatus to stand by for external timer activation. In summary, it can be seen that the first and second pinch rollers are moved under respective engaging forces towards the first and second capstans respectively to engage the portion of tape between the respective capstans and pinch rollers. The disabling means 301 selectively disables the first and second pinch rollers and has first and second positions which function as follows. In the first position thereof, the first pinch roller is enabled and can pinch the tape between the first capstan and the first pinch roller, and the second roller is disabled. Alternatively, in the second position thereof, the first roller is disabled and the second roller is enabled and can pinch the tape between the second capstan and the second pinch roller. A pinch roller is disabled from a respective capstan by applying to structure associated with the pinch roller a disabling force in opposition to the engaging force to draw the pinch roller off the capstan.

The above description relates to a bi-directional transport with a single capstan drive in which bi-directional capability is realized by using two capstans rotating in opposite directions with only one pinch roller engaged at any given time. This is appropriate for equipment with low to mid-range performance. In high performance equipment using a bi-directional transport, dual capstan drive with bi-directional capability can be realized by using two capstans rotating in the same direction with both pinch rollers engaged at all times. Thus, changing of tape travel direction involves reversing the direction of both capstans, as opposed to disabling one of the capstans as described above. Thus, the same transport as a uni-directional version previously described can be used, and the optional pinch roller disabling structure can be omitted with reversible capstan drives being substituted. In this alternative, when reversing direction, it is not necessary for the transport mechanism to pass through the stop/pause mode when reversing direction—instead, the capstan and reel motors are reversed in direction.

From the above, it can be seen that the primary cam disk 101 serves as a sequencing means for controlling sequence of operation of the tape shifter means and the tape holder for performing the extraction sequence for the tape holder. In addition, the primary cam disk controls secondary cams, for example, the sliding cam plate 136, which in turn, controls actuation of the exit and entry guide posts 64 and 69, as well as actuation of the tape holder. It can be seen that the sequence of operations is critical and timing is controlled relatively simply from the cam means, and accuracy of location of the items is maintained by respective stop means, most of which are located on the transport chassis. The sequence of events controlled by the sequencing means includes the following:

1) Positioning a tape holder in a retracted position thereof, generally adjacent a well of a processing edge of the cassette body, the well having a length of tape extending thereacross.
2) Initially moving the tape shifter means to shift the retracted tape holder generally perpendicularly to the processing edge inwardly into the well of the cassette body to position the tape holder adjacent an inside face of the tape within the well.
3) Rotating the tape holder about the holder axis from the retracted to the extended position thereof, adjacent to the inside face of the tape.
4) Moving the tape shifter means to shift the tape holder initially generally perpendicularly to the processing edge of the cassette outwardly of the well to draw an extracted length of tape from the well.
5) Positioning the tape holder in a final operative position thereof, in which most of the extracted length of tape extending from the well is inclined obliquely or non-perpendicularly to the processing edge of the cassette.

Clearly, to reverse the above procedure, direction of rotation of the primary cam disk 101 is reversed so as to rotate the shifter arm anticlockwise to return the extracted portion of the tape back into the cassette, with appropriate rotation of the reels to retract the extracted portion of the tape concurrently with reverse rotation of the shifter arm. Clearly, as the shifter arm approaches the well to return the tape to the cassette, the tape holder is accurately controlled by the lower end 225 of the bearing 204 engaging the complementary guide groove 223 and other means to ensure that the tape is placed within the cassette without damage to the tape. The tape holder moves further into the cassette well to a distance slightly greater than that required for returning the tape, so as to completely disengage from the tape. This is followed by rotation of the outer portion 62 of the tape holder through 90 degrees so as to rotate from the extended to the retracted position so as to be clear of the tape. When in the retracted position, the tape holder can be withdrawn from the cassette, concurrently with retraction of the exit and entry guide posts, so as to permit removal of the cassette from the cassette compartment.

ALTERNATIVES

Second Embodiment—FIGS. 19 through 27

The first embodiment of FIGS. 1 through 18 discloses a relatively complex apparatus having a dual capstan drive with sufficient space for several magnetic heads. A second embodiment 313 of the apparatus is a single capstan drive with a smaller space for the magnetic heads, with an overall reduction in size and complexity which will be described briefly as follows. Many of the features of the dual capstan drive apparatus of FIGS. 1 through 18 are to be found in the second embodiment.

FIG. 19

A second embodiment 313 of the apparatus is shown with an extracted portion of tape 314 extending from the supply well 24 of the cassette 10, the tape portion 314 having an exit portion 315 and an entry portion 316 as shown. Spaced control surfaces 318 contact the processing edge portion 20 of the cassette, which is located in a cassette compartment as in the first embodiment. A capstan 320 extends through a clearance opening in the take-up well 25, and a pinch roller 321 partially enters the well 25 to cooperate with the capstan to drive the tape as in a conventional Compact Cassette tape drive. The pinch roller is mounted on a pinch roller mounting arm 322 for rotation about a roller arm hinge 323 which is actuated in a manner to be described. The capstan and pinch roller as above described can be identical to the prior art but other aspects of the tape drive are different from the prior art.

An essentially rigid tape shifter arm 326 has an inner portion 329 journalled for rotation by a shifter hinge 331 about a shifter hinge axis 332. The shifter arm 326 is cranked as shown, and has an outer portion 334 carrying a sleeve bearing 335 which mounts a tape holder 336 for rotation with respect to the shifter arm about a tape holder axis 338. The tape holder 336 has an outer portion 340 which has a guide post which is partially wrapped by the extracted tape portion 314 and defines transition between the exit and entry tape portions 315 and 316. The tape holder 336 has an inner portion 342 which serves as a cam follower in a manner generally similar to the tape holder of the first embodiment as will be described. The tape holder 336 cooperates with the sleeve bearing 335 in a manner similar to the tape holder and sleeve bearing in the first embodiment, and the tape holder is spring biased to a raised or extended position in a similar manner, using locking teeth, not shown, which are essentially identical to those shown in FIG. 9 of the first embodiment. Other aspects of the tape holder are also generally similar to the first embodiment and are not described in detail.

The apparatus further includes a magnetic head 345 with a first tape guide 347 on an outer side, and a second tape guide 349 on an opposite inner side thereof the head and guides being mounted on a transport chassis as will be described. A tape lifter 351 is mounted for rotation with respect to the second tape guide 349 as will be described with reference to FIGS. 26 and 27. It can be seen that the entry portion of the tape 316 passes in a shallow arc extending between the outer portion 340 of the tape holder past the first tape guide 347, the magnetic head 345, the second tape guide 349 and the entry guide post 366. Similarly, to the first embodiment, the shifter hinge axis 332 is on a concave side of the arc of the extracted tape portion passing along the magnetic head, thus automatically providing proper tape wrap. Clearly, while the extracted portion of tape 314 is shown extending from the supply well 24, and the tape is driven through the capstan and pinch roller assembly associated with the take-up well 25, these positions could be reversed. However, this would require that the tape is "let out" by the capstan and pinch roller, which type of drive can be termed "push feed" and is generally considered to be a less desirable means of driving the tape than by drawing the tape by the capstan and pinch roller across the magnetic heads. In other words, this transport as shown is capable of driving the tape bi-directionally but less than ideally in one direction.

The apparatus also includes an exit guide post 354 which cooperates with the exit portion 315 of the tape, and is mounted on an exit guide post support 356. The support 356 has an inner end 359 journalled for rotation, and a exit guide cam follower 362. The exit guide post support 356 is biased by a torsion spring (not shown) for rotation in direction of an arrow 363 to move the guide post into the well 24. The apparatus also includes an entry guide post 366 cooperating with the entry portion 316 of the tape, and mounted on an entry guide post support 368. The entry guide post support has an inner end 370 journalled for rotation, and an entry guide post support cam follower 372 extending downwardly therefrom. The entry guide support is similarly biased to rotate in direction of an arrow 375 to move the post 366 into the well 24.

FIG. 20

Figure 19:
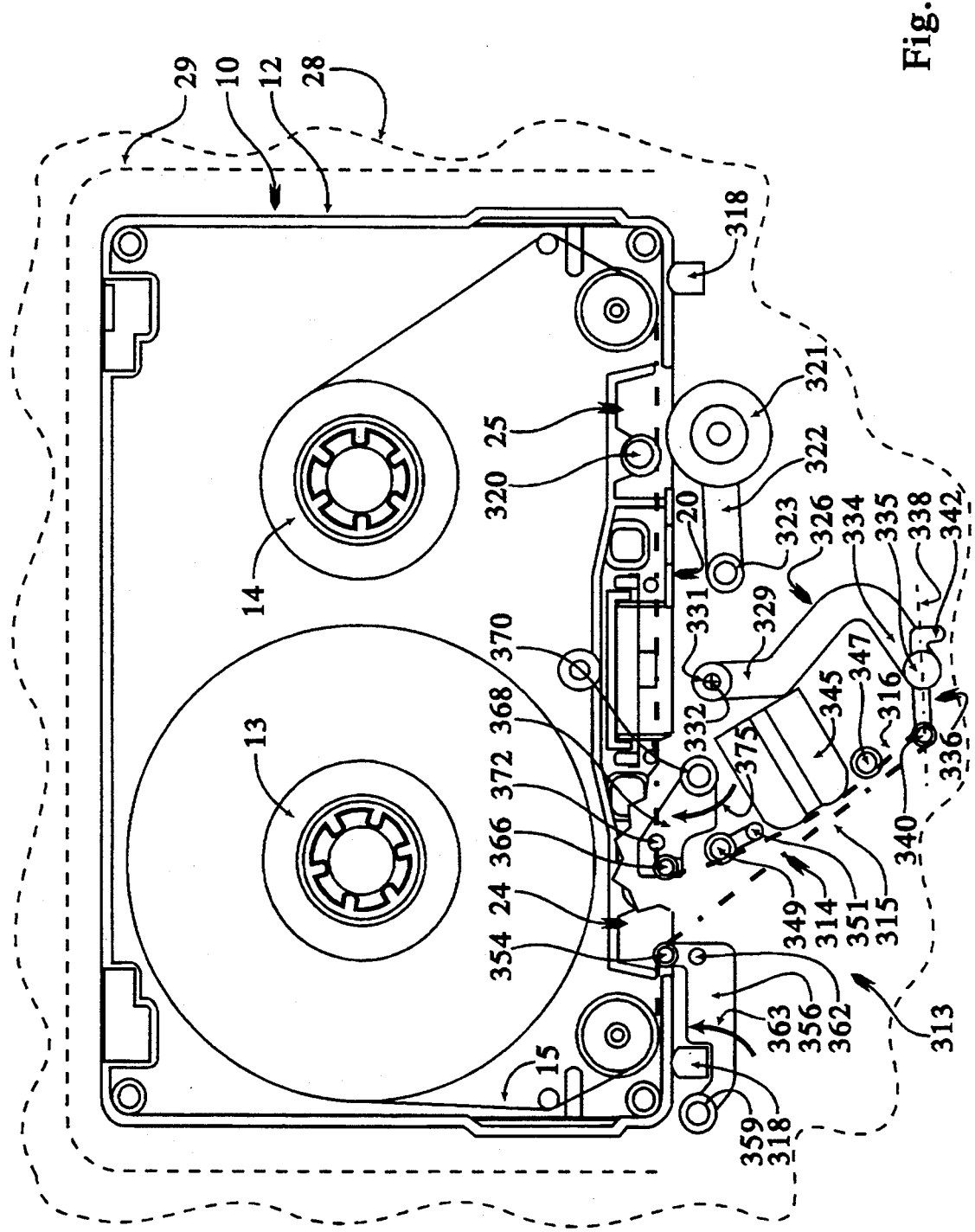
FIGS. 19 through 27 are simplified diagrams of a second embodiment of the invention having a single capstan drive apparatus showing some relevant portions of the apparatus for a specific mode or function, while other portions are omitted or shown in broken lines for clarity.
Figure 20:
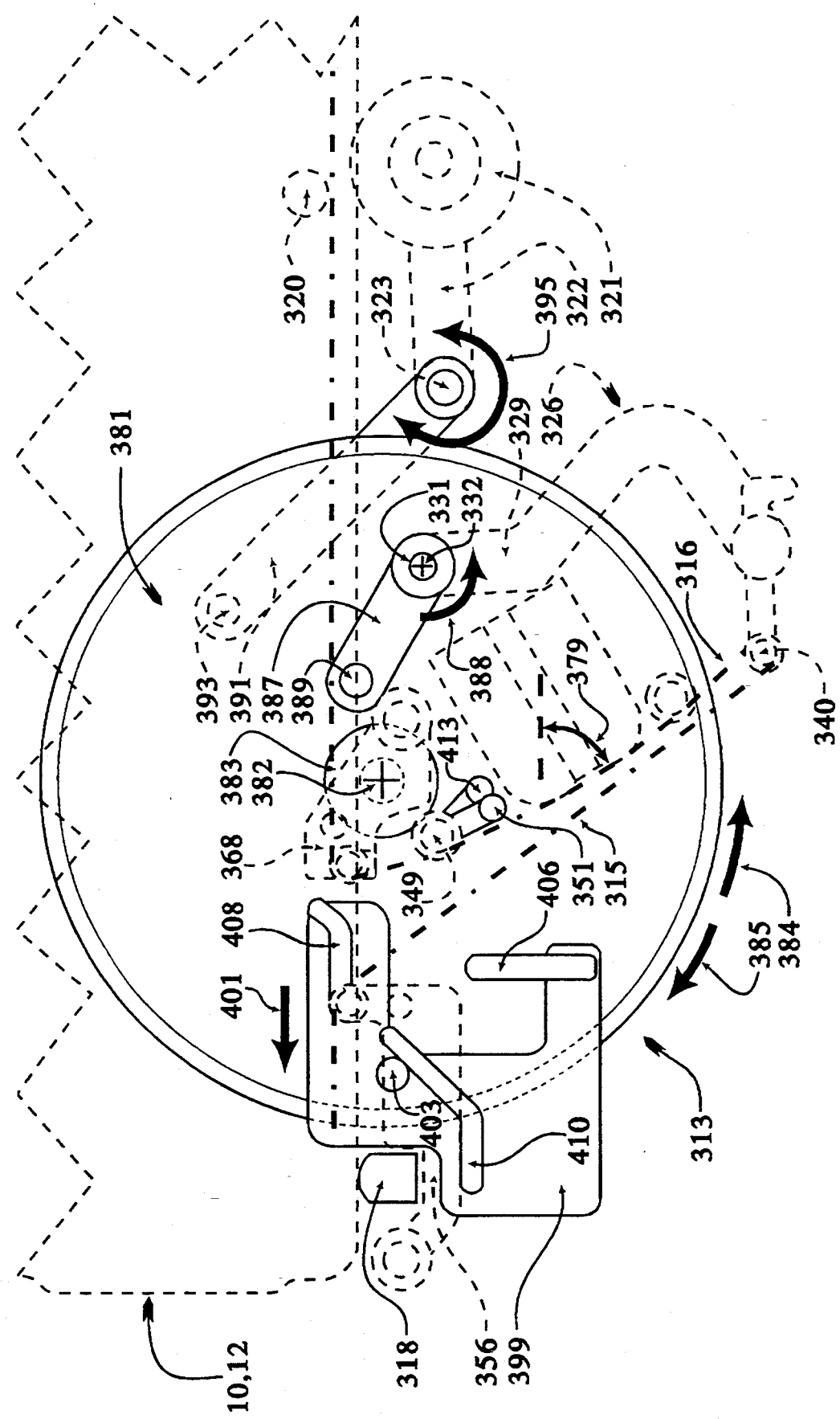

FIG. 20 shows structure in addition to that already shown in FIG. 19, most of the latter structure being shown in broken outline. The additional structure of FIG. 19 is used to impart movement of components associated with shifting, feeding, guiding and scanning the tape path.

Similarly to the first embodiment, the sequencing and actuation of essentially all components are primarily controlled by a primary cam disk 381 mounted for rotation about a primary cam axis 382 in a cam disk journal 383, so as to rotate in a forward or loading direction as shown by arrow 384, or in a reverse or unloading direction as shown by arrow 385. Driving and monitoring of position of the cam disk 381 is generally similar to that in the first embodiment and is in accordance with prior art practice. As will be described with reference to FIGS. 24 and 24(a), the cam disk 381 has top and bottom surfaces provided with cam features to impart motion to respective cam followers to actuate various components. As with the first embodiment, most of the components are spring biased towards a stop to locate each component accurately in a desired operative position, the cam releasing the cam follower to permit the component to contact the stop due to the spring bias.

When the tape shifter is fully extended, the entry portion 316 of the tape in contact with the magnetic head is inclined obliquely at an acute angle 379 to the processing edge portion of the cassette, typically between 30 and 60 degrees. Similarly to the first embodiment, the exit portion 315 is also inclined obliquely and by inclining the extracted portion of the tape obliquely to the cassette processing edge, less space is required for the second embodiment tape transport mechanism than if the extracted tape portion were perpendicular to the edge portion. The tape shifter hinge 331 comprises a vertical spindle journalled for rotation in a bearing in the chassis, the spindle rigidly connecting the tape shifter arm 326 to a tape shifter cam arm 387 to form a bellcrank. The arm 387 has an outer end with a tape shifter cam follower 389 which cooperates with the primary cam disk as will be described. Thus, movement of the cam follower 389 due to the cam disk rotates the arms 387 and 326 concurrently about the tape shifter hinge axis 332. A tape shifter torsion spring, not shown, applies a bias force to the arms 326 and 387 in direction of an arrow 388. Thus, it can be seen that the tape shifter 326 has the tape shifter cam follower 389 to cooperate with the cam disk 381 for rotating the tape shifter in response to relative movement between the cam means and the cam follower.

The pinch roller arm hinge 323 has a pinch roller control arm 391 which has a pinch roller cam follower 393 at an outer end thereof which cooperates with the cam disk 381 as will be described. A torsion spring, not shown, extends between the pinch roller arm 322 and the pinch roller cam arm 391 and applies a torque to the said arms in direction of an arrow 395 so as to swing the arms 322 and 391 towards each other until stops are engaged which limit further movement of the arms in the direction of the arrow 395. It can be seen that the pinch roller control arm has inner and outer ends, the outer end having the cam follower cooperating with the cam means to move the pinch roller control arm. The pinch roller hinge cooperates with inner ends of the pinch roller mounting arm and the pinch roller control arm for journalling the arm for mutual rotation about the pinch roller hinge. Resilient means cooperate with the pinch roller mounting arm and the pinch roller control arm to resiliently bias the arms towards each other and against stop means to hold the arms at an inclination to each other when free of external force, and to permit the arms to move relative to each other when subjected to an external force so as to apply a resilient pinch force against the capstan. Thus, FIG. 19 shows the arms at their steepest angular inclination towards each other which is attained when there is no external force on the arms, i.e. when the roller is disengaged from the capstan. It can be seen that the arms 322 and 391 are resiliently connected together for generally mutual rotation about the axis 323, the mutual rotation being limited only by contact of the pinch roller 321 with the capstan 320.

The apparatus also includes a sliding cam plate 399 which is fitted beneath the exit guide post support 356 and is mounted and spring biased for linear movement in a loading direction as shown by an arrow 401. The cam plate 399 has a lower surface having a cam plate cam follower 403 extending downwardly therefrom to cooperate with the primary cam disk 381 to produce the linear movement. The cam plate has an upper surface having a tape holder lobe 406, an entry guide lobe 408 and an exit guide lobe 410, all of which function in a manner generally similar to equivalent lobes of the first embodiment, and are described in greater detail with reference to FIG. 24.

The tape lifter 351 extends from the tape guide 349 on a radial lifter arm and is journalled for rotation relative to the guide 349. A tape lifter cam follower 413 extends from the tape lifter guide post on another radial arm which is similarly connected to the lifter to rotate therewith. The cam follower 413 extends downwardly to cooperate with the cam disk 381, and is described in greater detail with reference to FIGS. 26 and 27.

Figure 21:
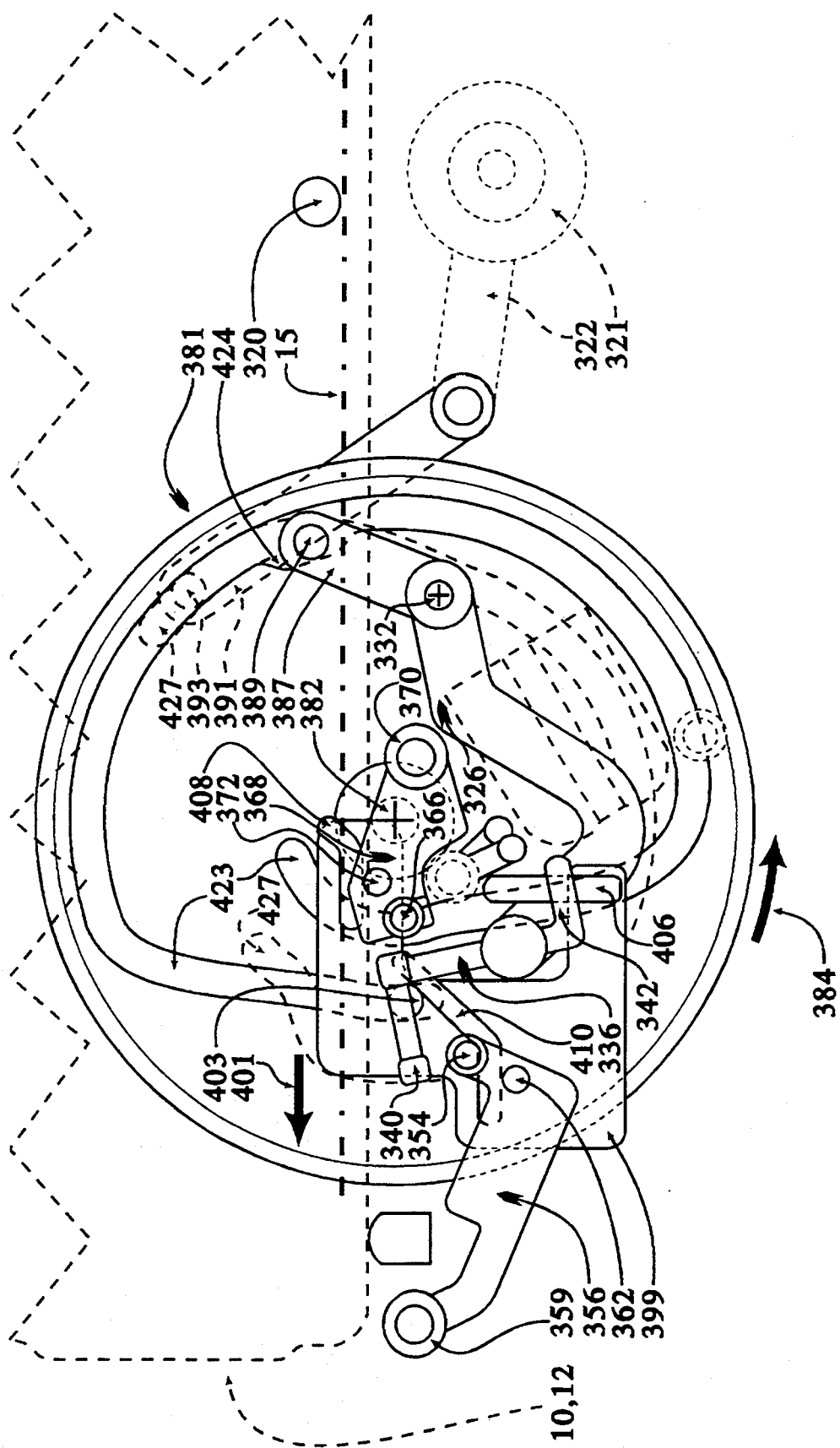
Figure 22:
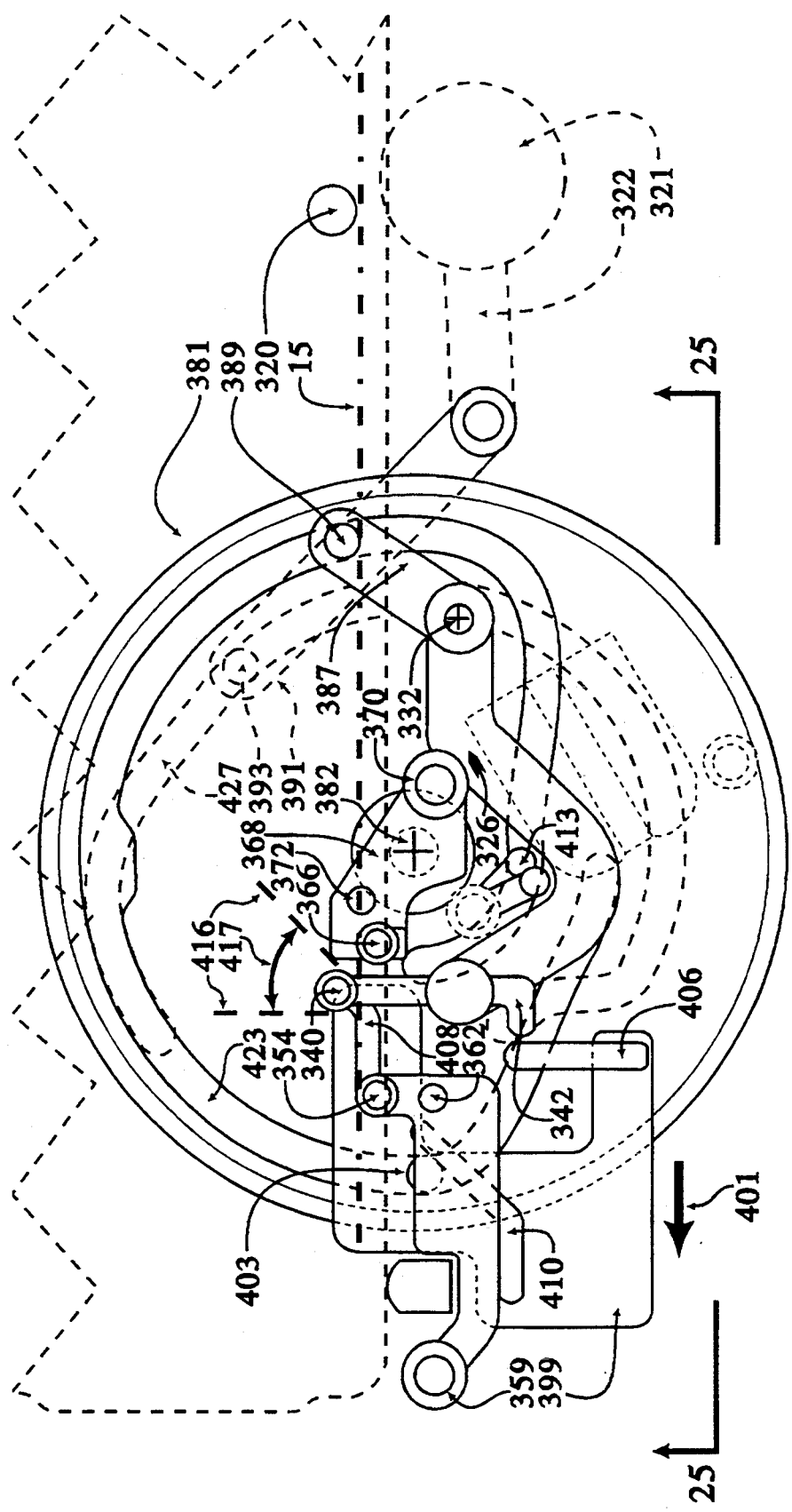
Figure 23:
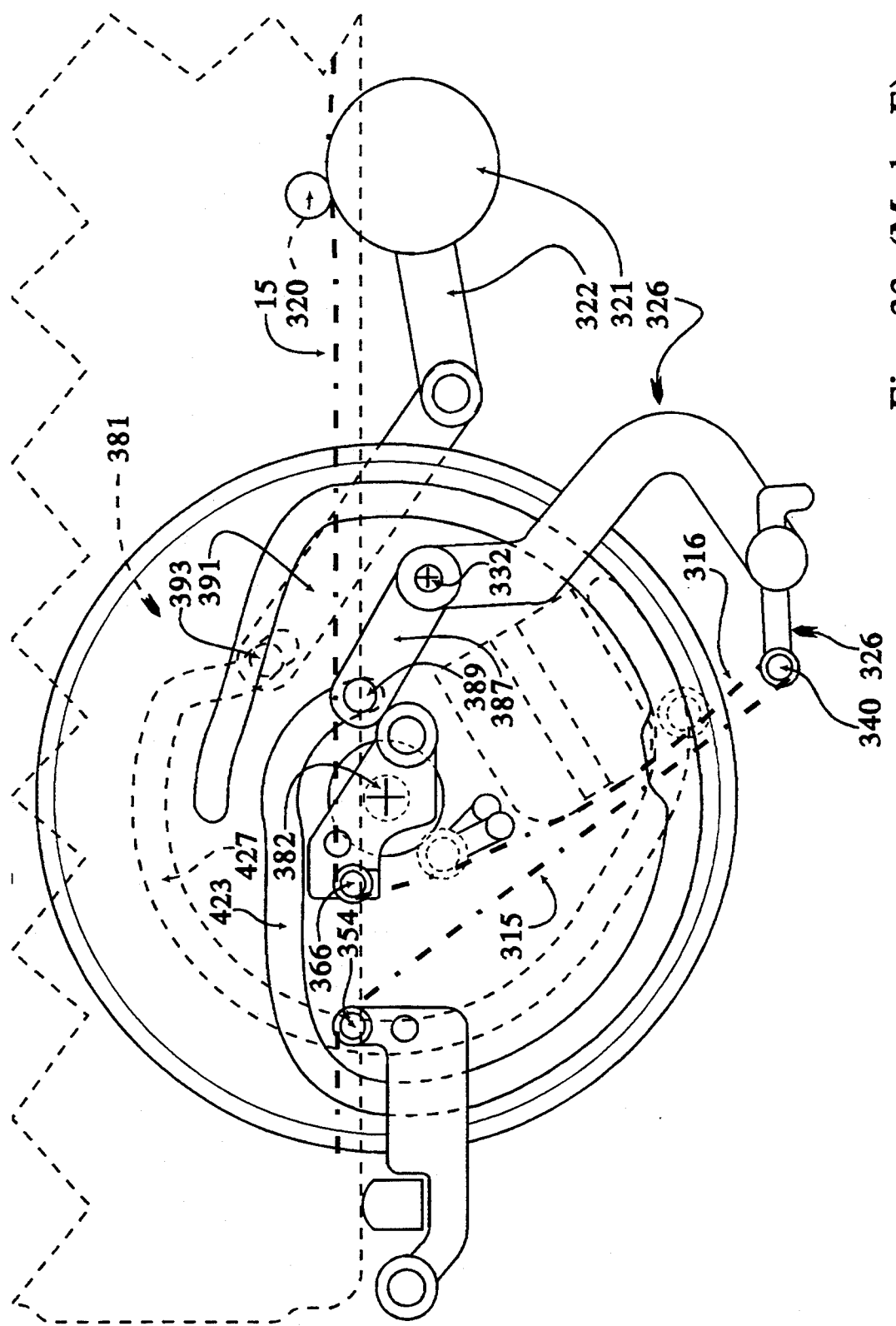

FIGS. 21 through 23

The following is a brief description relating to the operation of the apparatus, showing initial and final locations of major components at various modes of operation. The operation of the apparatus is divided into seven distinct modes, designated A through G, which in general, start from a pre-loading condition, Mode A, representing insertion of the cassette into the apparatus, and follow rotation of the cam disk 381 in accordance with the arrow 384, the loading rotation direction for the cam disk. However, Modes F and G are not in accordance with strict uni-directional rotation of the cam disk as will be described. For simplicity, in the following figures, in general only the grooves and lobes associated with actuation of the components of a particular mode are illustrated on the cam disk, and these will be described in greater detail with reference to the full description of the operation.

FIG. 21 shows Mode A (pre-loading), which is generally similar to Mode A of the first embodiment in which the cassette is located in the recess of the apparatus, the tape shifter arm 326 is fully retracted, and the exit and entry guides 354 and 366 are also retracted. The pinch roller and tape lifter are also retracted.

FIG. 22 shows Mode C, in which the tape holder extends behind the tape 15. The apparatus has passed through Mode B, in which the arm was inserted into the well 24 with the tape holder in a retracted, horizontal position. FIG. 22 shows Mode C after the tape holder has been rotated through 90 degrees so as to be located vertically adjacent an inside face of the tape. At the same time, the exit and entry tape guides 354 and 366 have been inserted into the well. For convenience of illustration, a range of tape forces acting on the outer portion 340 are shown in this figure, although there are negligible forces acting on the outer portion in this mode. Forces from the tape 15 acting on the outer portion 340 of the tape holder for all positions of the shifter 326 are contained within envelope boundaries 416 spaced angularly apart at an angle 417. Similarly to the first embodiment, the forces from the tape acting on the outer portion 340 are directed to force the locking teeth (not shown) into engagement with each other, thus augmenting engaging force generated by the spring.

FIG. 23 shows Mode E, the play/record mode. The apparatus has passed through Mode D in which the tape shifter arm is rotated anti-clockwise to draw the length of tape from the cassette well. In Mode E, the pinch roller is forced against the capstan to drive the tape in the normal manner.

In summary, the Modes A through G are as below:

| Mode | Description |
| --- | --- |
| A | Pre-loading - the tape shifter arm and exit/entry guide posts are retracted to permit insertion or removal of cassette. The pinch roller and tape lifter are retracted. |
| B | Tape shifter is rotated to position the tape holder in the first well below the tape edge. |
| C | Tape holder is rotated through 90 degrees and the exit and re-entry guide posts are inserted into the well. |
| D | Tape shifter arm rotates to draw the tape from the well and to reach extreme position of arm to complete tape extraction. The tape engages the magnetic head, and the apparatus is in stop/pause mode ready for other operations. |
| E | Pinch roller engages capstan to transport tape for play/record. |
| F | Pinch roller is disengaged from the capstan and the tape lifter is disengaged for search mode (forward/reverse). |
| G | Pinch roller is disengaged from capstan, and the tape lifter is engaged or extended to lift the tape off the magnetic head for fast forward/rewind mode. |

Figure 24:
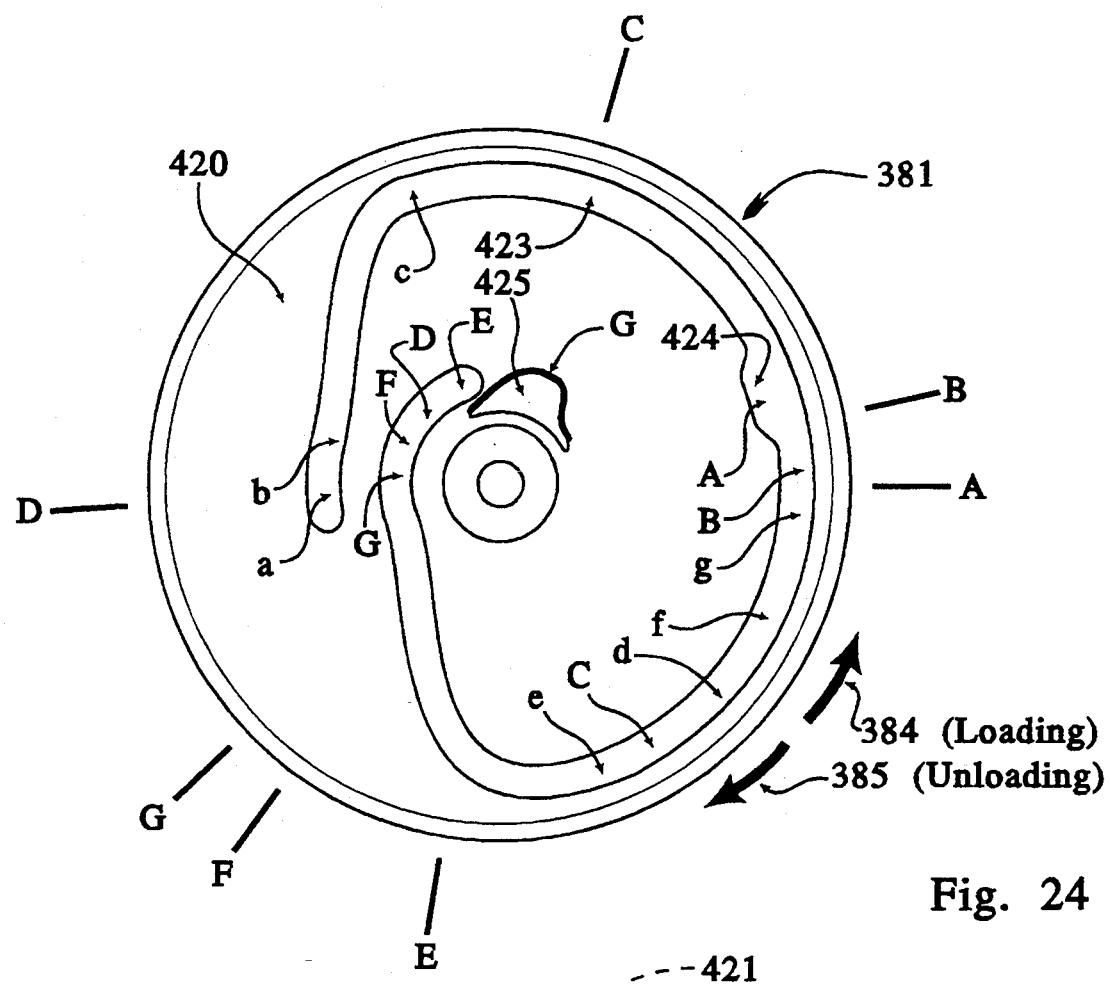
Figure 24A:
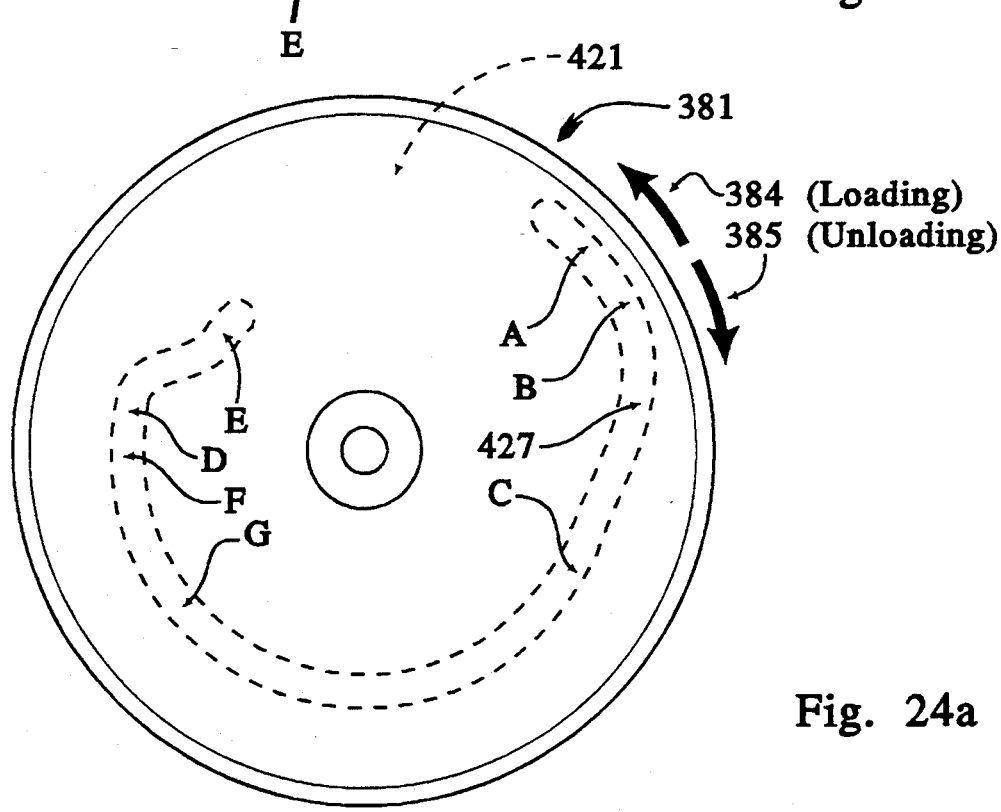
FIG. 24a is a top plan view of the cam disk in the same angular orientation as in FIG. 23, showing the groove on the lower surface in broken outline with operational mode positions also being shown, the grooves and lobes on the upper surface being omitted for clarity.

FIGS. 24 and 24a

In FIG. 24, the primary cam disk 381 has an upper surface 420 having a dual function groove 423 for controlling operation of the shifter arm 326 and operation of the sliding cam plate 399. The groove is continuously engaged by the cam followers of the shifter arm 326 and the plate 399 at approximately diametrically opposite positions of the cam disk. Positions of the cam follower 389 in the groove 423 for the specific mode of operation of the shifter arm are shown in capital letters designating the modes, whereas positions of the cam follower 403 in the groove for the specific modes are shown in lower case letters. The groove 423 has an inwardly expanded portion 424 which is wider than remaining portions of the groove to accommodate specific requirements of the cam followers as follows. The tape shifter cam follower 389 is biased by the tape shifter torsion spring 435 against an inner side wall of the groove 423, and so when entering the expanded portion 424 in Mode A, the follower 389 moves further inwardly towards the axis 382 which results in the tape shifter arm swinging further away from the cassette to provide additional clearance for insertion or removal of the cassette in the pre-loading Mode A. In contrast, the cam plate cam follower 403 is biased against an outer wall of the groove 423 and thus is unaffected by the expanded portion 424. After attaining Mode C, the cam follower 403 is maintained at a constant position throughout most of the cam rotation, and this requires the essentially constant radius of the outer wall of the groove. The upper surface 420 of the cam disk 381 also has a tape lifter lobe 425 for controlling operation of the tape lifter which occurs in Mode G.

In FIG. 24a, the lower surface 421 of the cam has a pinch roller groove 427 for controlling operation of the pinch roller, location of the cam follower 393 in the groove being shown for specific modes.

FIG. 25

Similarly to the first embodiment and as previously stated, a transport chassis 434 supports most of the components, but in contrast to the first embodiment where the tape shifter arm 48 passes above the chassis 221 and many of the components, in the second embodiment the tape shifter arm 326 passes beneath the chassis 434 and many of the components, as will be described.

The tape shifter hinge 331 is positioned below the chassis 434 and journals the shifter arm 326 and associated tape shifter cam arm 387. A shifter arm torsion spring 435 cooperates with the shifter arm 326 to bias the arm clockwise towards the fully extended position. The chassis 434 similarly mounts the cam journal 383 which extends downwardly from the chassis so that the cam disk 381 is located below the shifter arm 326. It is seen that the shifter arm 326 and the shifter hinge 331 are interposed between the chassis 434 and the cam disk 381. As previously stated, the tape shifter arm 326 is cranked, and the cranking provides clearance for the arm to swing inwardly to the well and to avoid interference with the cam follower 413 which, as seen in FIG.

22, would otherwise interfere with the arm in Modes A, B and C. The sleeve bearing 335 (not shown in FIG. 25, see FIG. 19) is carried on a sleeve bearing extension 436 which passes upwardly from the outer end 334 of the shifter arm 326. A retaining ring 437 is located between the inner portion 342 and the sleeve bearing 335 for assembly purposes, similarly to the ring 217 in FIGS. 9 and 10 of the first embodiment. The chassis 434 has a clearance slot 438 to provide access between the arm 326 and the bearing extension 436, which also assists in accurately locating the sleeve bearing 335, and thus is equivalent to the guide groove 223 of the first embodiment. A bearing extension shoulder 440 of the extension 436 is drawn against an upper surface 442 of the chassis by a leaf spring 444 mounted at the end extending adjacent the outer end 334 and engaging a lower surface 446 of the chassis. Thus, the bearing extension 436 is located laterally by sidewalls of the groove 438, and vertically by the spring 444 and drawing the shoulder 440 into contact with the chassis. As previously stated, the shifter arm torsion spring 435 biases the shifter arm 326 in direction of the arrow 388 (FIG. 20) and applies a force to the arm which holds the bearing extension 436 at an end of the groove 438 when the outer end of the arm is in a fully loaded position, as shown in FIGS. 20 and 23. Thus, the tape holder 336 is accurately and securely located in the fully loaded position for normal operation of the apparatus.

The tape holder 336 is journalled for rotation within the sleeve bearing 335 (see FIG. 19) and is biased to the extended position and held in the extended position by locking teeth, not shown, in a manner essentially identical to that shown in the first embodiment, particularly with reference to FIG. 9. While relative positions of some of the components have been changed from those shown in FIG. 9, overall function of each of the components and general structure are essentially identical. Consequently, only the main components associated with the tape guide provided at the outer portion 340 of the tape holder will be briefly described as follows.

Figure 25:
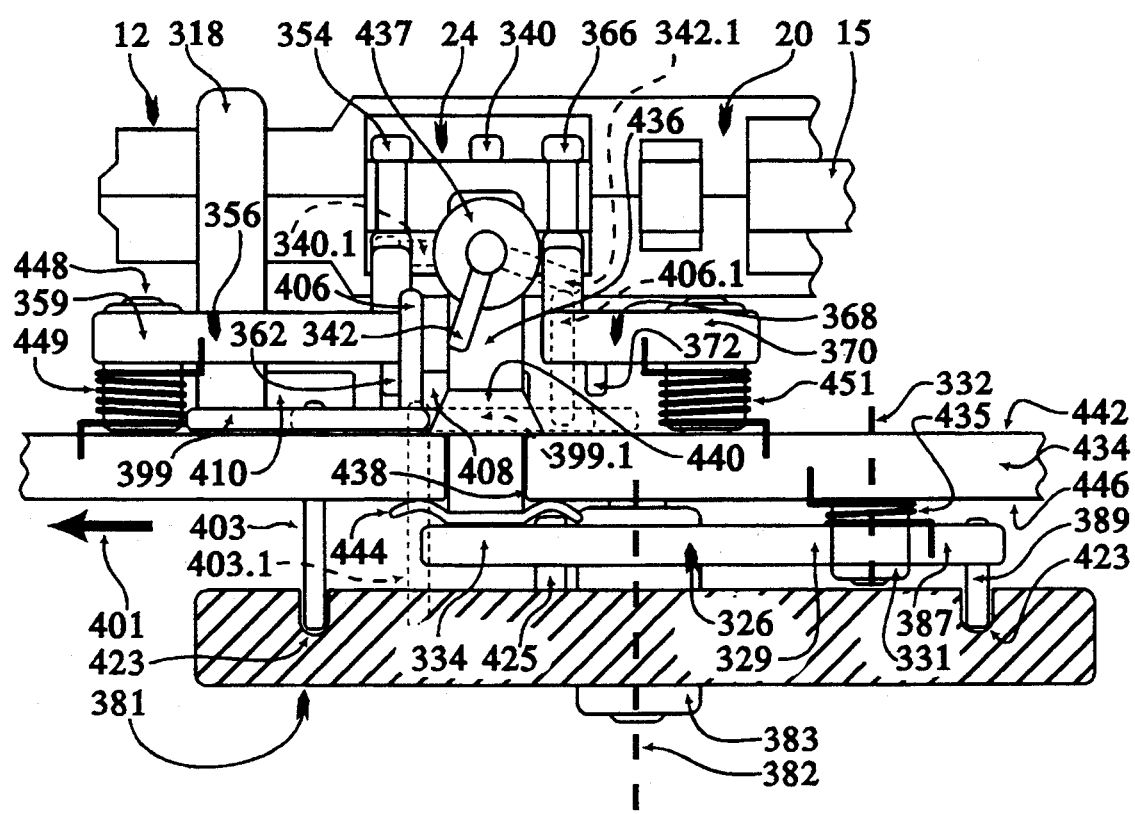

FIG. 25 represents the apparatus in Mode C, in which the outer portion 340 of the tape holder has swung from a first or retracted position 340.1 in broken outline, to the extended position shown in full outline. This is due to movement of the slide cam plate 399 in direction of the arrow 401 as follows. In Modes A and B, the cam plate 399 and the cam plate cam follower 403 are in initial broken outline positions at 399.1 and 403.1 respectively, and rotation of the cam disk shifts them to the respective full outline positions 399 and 403 as shown. This results in similar lateral shifting of the tape holder lobe 406 from an initial or first position shown in broken outline at 406.1 to a final or second position shown in full outline at 406. When in the initial position, the tape holder lobe 406.1 restrains the tape holder inner portion 342 in an initial position, shown in broken outline at 342.1, against force from the spring, which can rotate the tape holder to the extended position following movement of the lobe 406.

The inner end 359 of the exit guide support 356 is hinged on a spindle 448 and a torsion spring 449 enclosing the spindle biases the support 356 per the arrow 363 in FIG. 19, so as to bias the exit guide post 354 into the well 24. The exit guide lobe 410 resists such movement when the cam plate 399 is in the initial broken outline position 399.1, and permits such movement when the plate 399 shifts to assume the full outline position as shown. Similarly, the inner end 370 of the entry guide post support 368 has a similar torsion spring 451 biasing the entry guide post 366 into the well 24 which is resisted by the entry guide lobe 408 until attaining Mode C.

Figure 26:
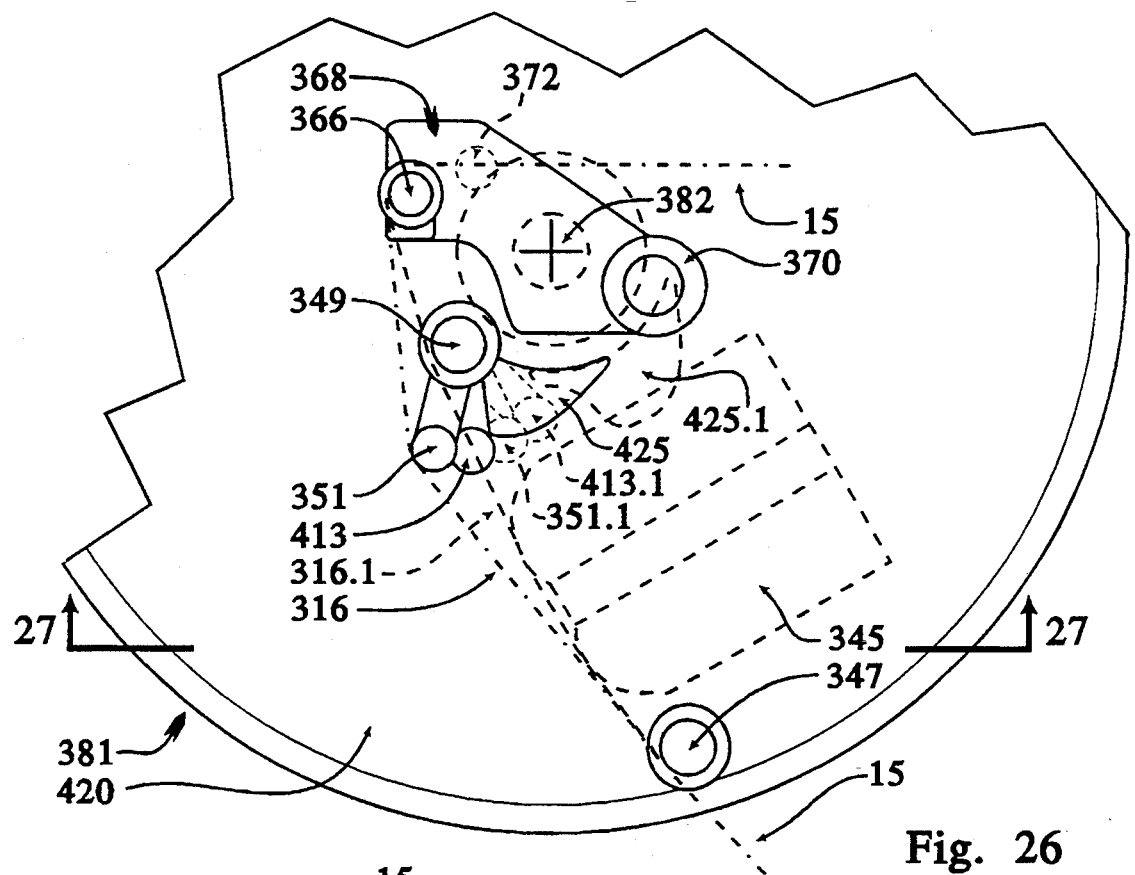
Figure 27:
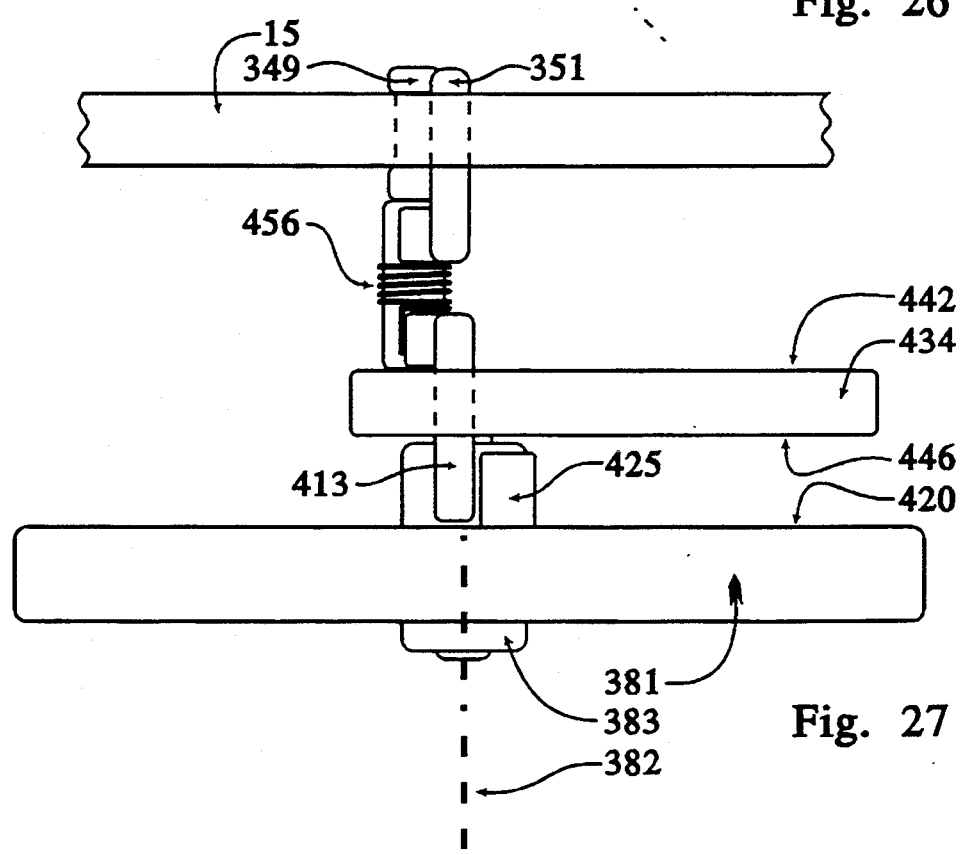

FIGS. 26 and 27

As previously stated, the tape lifter lobe 425 extends upwardly from the upper surface 420 of the cam 381 and is engaged by the tape lifter cam follower 413. When the tape lifter 351 is retracted as shown in broken outline 351.1, the entry portion 316 of the tape assumes the path 316.1 passing from the magnetic head 345, and in contact with the guides 349 and 366 for entry into the cassette body 12. However, in Mode G (fast forward/rewind mode), the tape lifter is actuated by the cam follower 413 passing over the lobe 425, and the tape lifter assumes the full outline position as shown, where the tape is now lifted off the magnetic head 345 and the guide 349 and extends from the guide 347, to the tape lifter 351, then to the guide 366 as shown. The tape lifter 351 and the tape lifter cam follower 413 are mounted on respective radially extending arms which are journalled for rotation about an axis passing concentrically through the guide 349. A torsion spring 456 enclosing the guide 349 applies a force to the cam follower 413, biasing the follower and associated lifter 351 to the retracted or broken outline positions 413.1 and 351.1 as shown which represents the position for most modes.

Operation of Second Embodiment

Operation of the second embodiment has many similarities with the first embodiment, but is considerably simpler due to the elimination of the re-entry loop guides, and elimination of mounting of the pinch rollers on a movable platform. Furthermore, the tape shifter arm of the second embodiment swings through a much shorter arc than the first embodiment and there are a corresponding smaller number of tape guides and distinct modes of operation.

Referring to FIG. 21 showing Mode A, the pre-loading mode, the exit and entry guide posts 354 and 366 respectively are fully retracted from the well 24 by appropriate shifting of the exit and entry post supports. Similarly, the outer portion 340 of the tape holder 336, and the pinch roller 321 are similarly retracted to facilitate insertion of the cassette 10 into the cassette compartment. The cassette is seated on the control surfaces 318, and automatic tape slack take-up is performed.

To pass from Mode A to Mode B, not shown, the primary cam disk 381 is rotated in accordance with the arrow 384, and the tape shifter cam follower 389 is shifted by the dual function groove 423 which moves the cam follower 389 out of the expanded portion 424. This initiates inward clockwise rotation of the tape shifter 326, so that the outer portion 340 of the tape holder, as shown in broken outline in FIG. 25, passes under the lower edge of the tape in the supply capstan well 24. In this condition, the outer portion 340 is maintained in the retracted position because the inner portion 342 sweeps over the lobe 406 carried on the plate 399 and spring biasing force on the tape holder is resisted, similarly to operation of the first embodiment.

Referring to FIG. 22, showing Mode C, the plate 399 shifts leftwards per the arrow 401 as a result of the cam plate cam follower 403 being shifted by the dual function groove 423. This causes corresponding leftwards movement of the lobe 406, which slides from under the inner end 342 of the tape holder, permitting the tape holder to swing from the horizontal retracted position to the vertical extended position, also as shown in FIG. 25. Simultaneously, the leftwards movement of the plate 399 permits the cam follower 362 to slip off the lobe 410 and permits the exit guide post 354 to enter the supply well 24 under the influence of the spring bias causing it to rotate about the inner end 359. Simultaneously, leftwards movement of the plate 399 causes the cam follower 372 to slip off the lobe 408 permitting the entry guide post 366 to enter the supply well as the support 368 rotates about the inner end 370 in a similar manner. The pinch roller has moved to an intermediate position towards the take-up well 25 and thus is in a position ready to engage the capstan in the play mode E.

In Mode D, not shown, the reel brakes are released and preferably back tension is applied to both reel hubs. The tape shifter arm commences rotation in an anti-clockwise direction from the supply well per the arrow 388, pulling tape out of the well until the bearing extension 436 contacts the end of the slot 438 (FIG. 25) to locate the arm 326 in the fully extended position. The cam disk continues to rotate in the direction of the arrow 384, and passes fast forward/rewind, and search modes to stop at Mode D, the stop/pause mode. While passing the fast forward/rewind mode on the cam disk, a small amount of tape slack is created as the tape lifter momentarily engages and disengages the tape when it is wrapped around the head assembly. Reel brakes engage the reel hubs and an automatic slack take-up is activated to eliminate the tape slack after reaching the stop/pause mode. The tape extraction process is now complete and the system attains the stop/pause mode ready for other operations.

Referring to FIG. 23, the play/record Mode E is shown in which the tape shifter arm remains in the same position as in previous Mode D. The additional rotation of the cam disk 381 results in the pinch roller cam follower 393 being shifted inwardly by the groove 427 on the lower surface, rotating the control arm 391 which concurrently rotates the pinch roller mounting arm 322 to swing the pinch roller 321 inwardly to resiliently engage the capstan 320 to drive the tape. Reel brakes are released and the reel motor is activated in the forward direction.

To attain the search Mode F in the forward or reverse directions, the pinch roller is disengaged from the capstan and the tape lifter remains disengaged. The reel brakes are disengaged and the reel motor is activated to fast wind the tape in the either direction while the tape is in contact with the head for search or cueing functions.

To attain the fast forward or rewind modes of Mode G, not shown, the pinch roller 321 is disengaged from the capstan 320 and the tape lifter is engaged by rotation of the cam wheel to bring the tape lifter lobe 425 into contact with the tape lifter cam follower 413 as seen in FIG. 26, which rotates the tape lifter 351 to an extended position as shown in full outline, thus lifting or moving the tape to be clear of the magnetic head. The reel brakes are disengaged and the reel motor is activated to fast wind the tape in either direction as required.

In summary, it can be seen that the second embodiment has many similarities of the first embodiment, one of which relates to sharing a cam feature of the cam disk for two cam followers as follows. For example, in the first embodiment, the pinch roller cam lobe 194 is used to control four components, namely the pinch roller support 155, the tape lifter 91 and the two pinch rollers 43 and 44. In particular, the pinch roller cam followers 170 and 180 engage opposite surfaces of the same lobe, and thus approximately balance forces on opposite sides of the lobe. Similarly, in the second embodiment, the dual function groove 423 has opposite surfaces engaged by the cam followers 413 and 403 of the shifter arm 326 and the sliding cam plate 399 respectively. Thus, in both embodiments, a cam feature, whether it is a lobe or a groove, is shared by two or more components, which simplifies construction of the cam disk and requires less space on the cam disk, thus facilitating reducing size of the overall size of the apparatus. Also, similarly to the first embodiment, the exit and entry tape guides are actuated by a sliding cam plate, which is also actuated by the primary cam disk. The sliding cam plate could be defined as a single cam feature, namely the plate, which actuates two guide posts simultaneously, thus again, simplifying construction and permitting reduction in size of the apparatus. Thus, both embodiments provide a cam means with a cam feature having oppositely facing cam surfaces and both embodiments bias cam followers of at least two components in opposite directions against the oppositely facing cam surfaces to permit the cam followers to share the same cam feature. Thus, in both embodiments, the apparatus provides a cam which produces movement of the tape shifter and the exit and entry guide posts by moving cam means cooperating with the cam followers of the tape shifter and guide posts. In addition, in both embodiments, a tape holder is moved through a travel arc centered on a shifter hinge axis, which axis is located on a concave side of an arcuate tape wrap engaging the magnetic head, which provides an "automatic wrapping" of the magnetic head by the tape.

Third Embodiment—FIGS. 28 through 42

The first and second embodiments of FIGS. 1 through 27 disclose apparatus that could accommodate multiple magnetic head units or transducers for all recording and playback capabilities of analog and/or digital signal processing on magnetic tape. The third embodiment is primarily for accommodation of one physical magnetic head unit which may be capable of performing one or more functions, depending on the type of magnetic head mounted. Because only one magnetic head is required, a further reduction in size of the apparatus when compared with the second embodiment is realized. Thus, the third embodiment has particular use often in playback only applications commonly found in tape transports for mobile use, such as automobile systems, amplified portable systems (so-called "boom boxes") and personal portable systems (pocket-size headphone systems), applications all of which require minimum tape transport size.

FIG. 28

A third embodiment 480 of the apparatus is shown with an extracted portion 482 of tape extending from the supply well 24 of the cassette 10, the tape portion 482 having an exit portion 484 and entry portion 485. Spaced control surfaces 487 contact the processing edge portion 20 of the cassette which is located in a cassette compartment as in the first and second embodiments. A capstan 489 extends through a clearance opening in the take-up well 25, and a pinch roller 491 cooperates with the capstan to drive the tape as in a conventional Compact Cassette tape drive. The pinch roller is mounted on a pinch roller mounting arm 493 for rotation about a roller arm hinge 494 which is actuated in a manner to be described. The capstan and pinch roller as above described can be identical to prior art. Similarly to the second embodiment, if a bi-directional drive is required, the capstan direction is reversible to permit "push-feed" drive.

Figure 28:
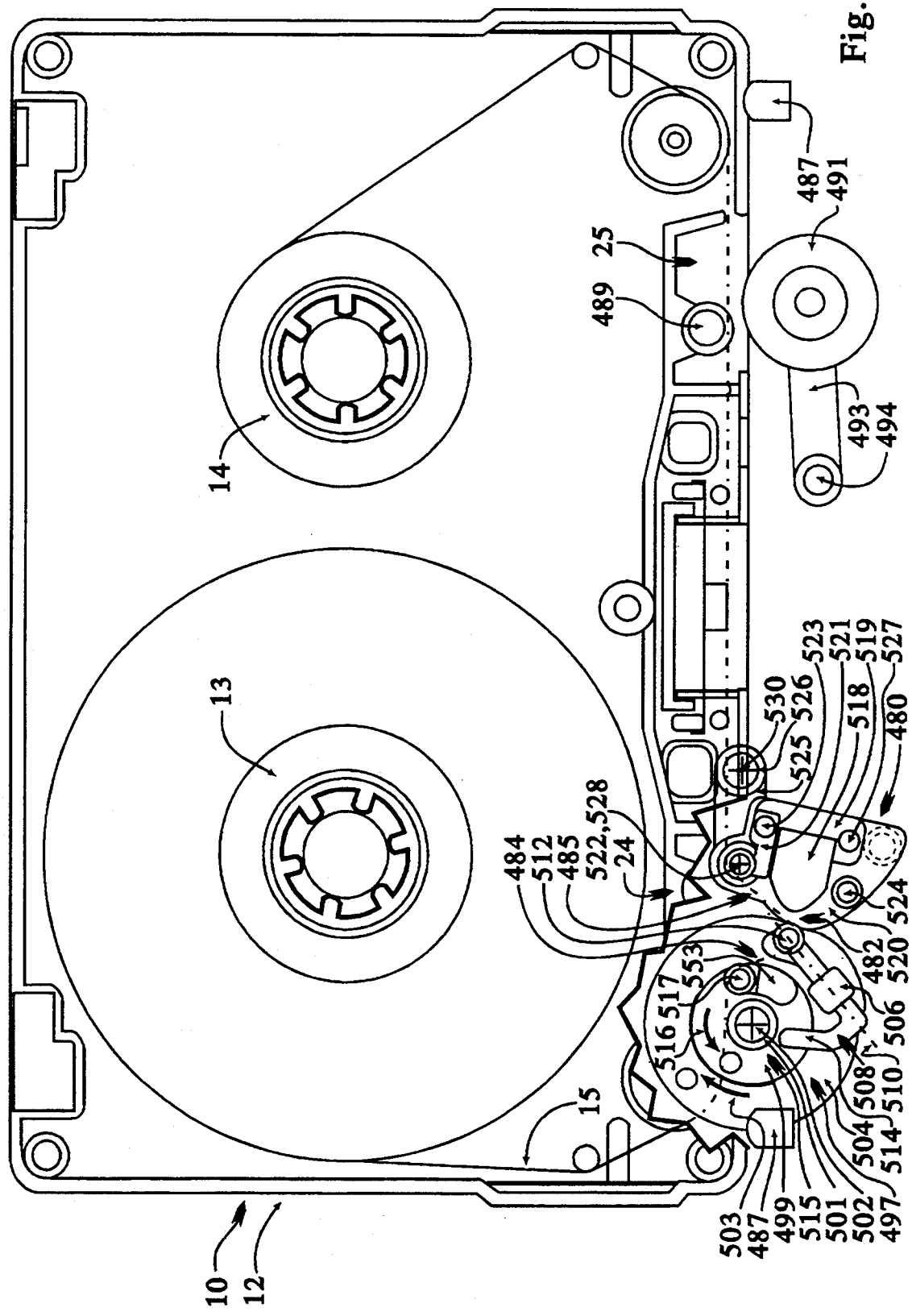
FIGS. 28 through 41 are simplified diagrams of a third embodiment of the invention having a single capstan drive apparatus, which is also limited to use of one magnetic head only, i.e. primarily it is most suitable for playback only, the figures showing some relevant portions of the apparatus for a specific mode or function, while other portions are omitted or shown in broken lines for clarity.

A tape shifter disk 497 has an inner portion 499, which is hidden and not shown in FIG. 28, journalled for rotation about a shifter hinge 501 having a shifter hinge axis 502. The shifter disk is thus concentric with the shifter hinge axis and is spring-biased in a clockwise direction of an arrow 503. The disk 497 has an outer portion 504 adjacent the periphery thereof carrying a sleeve bearing 506 which journals a tape holder 508 for rotation with respect to the tape shifter disk about a tape holder axis 510. The tape holder 508 is generally similar to the previously described tape holders and is biased by a spring, not shown, to rotate the holder to contact a stop in a particular position as previously described. The tape holder has an outer portion 512 which has a guide post which, in a raised or extended position thereof, is partially wrapped by the extracted tape portion 482, and defines transition between the exit and entry portions 484 and 485 of the extracted tape. The spring bias on the shifter disk is in a direction to locate the outer portion of the tape holder in a final position of the tape holder for operation of the apparatus. The outer portion 512 is spring biased to the raised position and locked therein by teeth, generally similar to the teeth described with reference to the first and second embodiments. Force between the teeth is further augmented by force of the tape acting on the outer portion for all positions of the tape shifter arm, as will be described with reference to FIG. 32. The holder 508 has an inner portion 514 which serves as a cam follower as will be described.

An inner disk 515 is mounted for rotation about the shifter hinge axis 502 and has a diameter smaller than the tape shifter disk 497 so as to be located within, and clear of, the outer portion 504 of the tape shifter disk to avoid interference with the bearing 506. The inner disk 515 shares a common hinge pin with the disk 497, and is thus concentric with the disk 497 and is also positioned above and covers the inner portion 499. The disk 515 also carries an exit guide post 517 which is thus rotatable about the shifter hinge axis 502 and, when located within the well, prevents the exit portion 484 of the tape from contacting the well as will be described. The disk 515 is spring-biased in an anti-clockwise direction of an arrow 516, and thus is biased in an opposite direction to the disk 497. As with the previously described tape guides, the spring bias acting on the guide post 517 is in a direction so as to locate the guide post 517 within the well against a stop. Thus, the exit guide post 517 is a first tape guide mounted on a first tape guide mounting means which is rotatable about the shifter hinge axis in response to movement of the cam means so as to be locatable into the well of the cassette.

The apparatus further includes a single magnetic head 518 which, in this instance is a playback only head, and is of very small size to reduce overall size of the apparatus. The magnetic head is mounted directly on a head sub-plate 519 which is secured to a head plate 520, the head plate carrying an inner tape guide 522 on one side of the head, and an outer tape guide 524 on an opposite side of the head. The inner tape guide 522 serves as an entry guide post and is mounted on an entry guide support 521 secured to the head sub-plate 619 and the head plate 520 by a support screw 523. The guide 522 is locatable within the supply well 24 to prevent the entry portion of tape 485 from contacting the cassette body when a portion of the tape is extracted from the cassette body. A screw 527 secures an opposite side of the sub- plate 519 to the head plate 520 with adjustment means as will be described. The head plate 520 is journalled, by means to be described, on a head support arm 525 for rotation about a head axis 528 which is aligned with the entry guide post or inner tape guide 522 and is disposed parallel to the shifter hinge axis 502. The head support arm 525 is a portion of an L-shaped head bellcrank 529 which is journalled for rotation on a fixed support arm hinge pin 526 having a support axis 530 as will be described. Thus, the head 518 is rotatable about the head axis 528, e.g. the inner tape guide 522, and also about the support axis 530, e.g. the pin 526, which axes are both parallel to the shifter hinge axis 502.

FIG. 29

Figure 29:
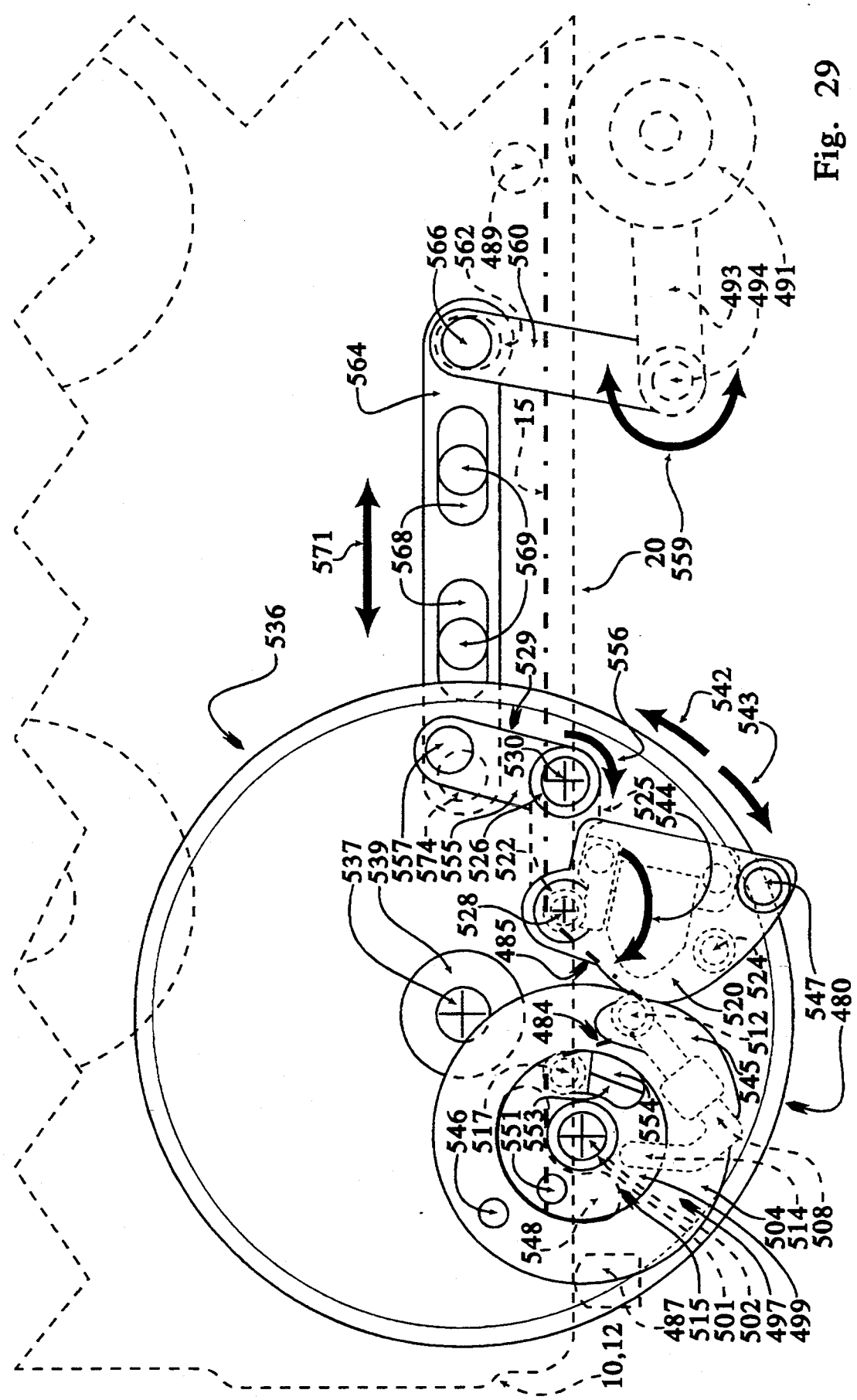

FIG. 29 shows structure in addition to that already shown in FIG. 28, most of the latter structure now being shown in broken outline. The additional structure of FIG. 29 is used generally to impart movement to components associated with shifting, feeding, guiding and scanning the tape in the tape path. Similarly to the first and second embodiments, the sequencing and actuation of essentially all components of the third embodiment are primarily controlled by a primary cam disk 536 mounted for rotation about a primary cam axis 537 in a cam disk journal 539, so as to rotate in a forward or loading direction as shown by an arrow 542, or in a reverse or unloading direction as shown by an arrow 543. Components for driving and monitoring of positions of the cam disk 536 are generally similar to those in the first and second embodiments, and are in accordance with prior art practice. As will be described with reference to FIGS. 35 and 35a, the cam disk 536 has top and bottom surfaces provided with cam features to impart motion to respective cam followers to actuate various components. As with the first and second embodiments, most of the components are spring-biased towards a stop to locate each component accurately in a desired final operative position, the cam releasing the cam follower to permit the component to contact the stop due to the spring-bias.

Figure 37:
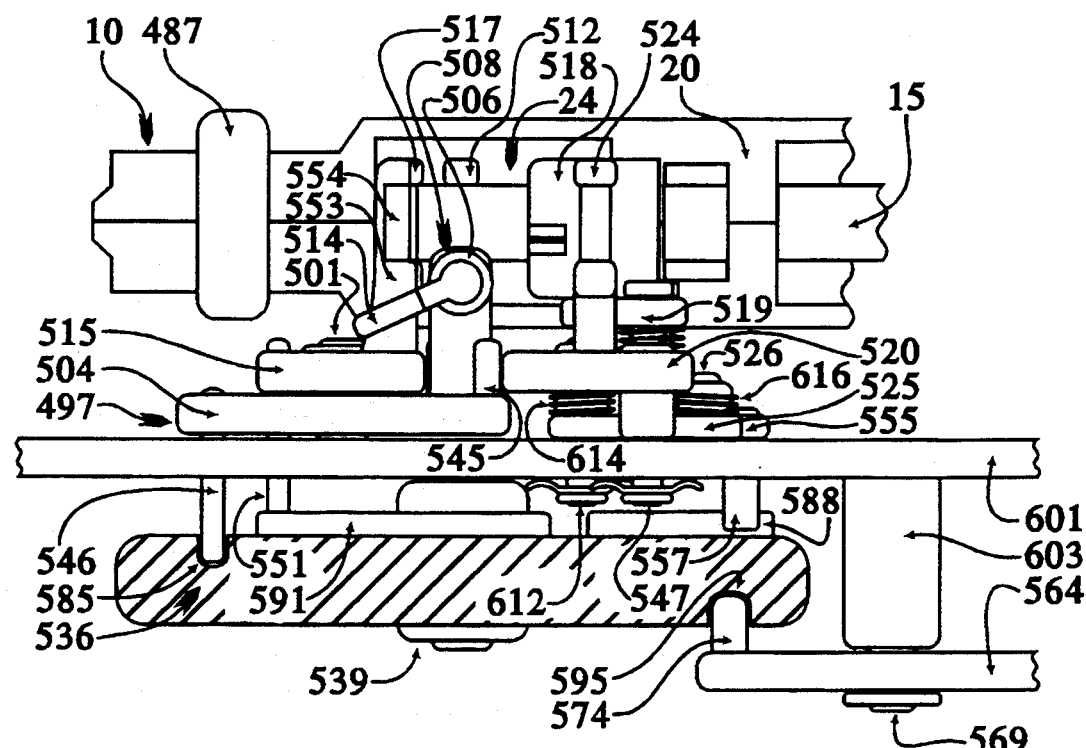

The head plate 520 is spring biased clockwise, termed a first direction designated by an arrow 544, to rotate about the head axis 528, thus forcing the head plate 520 towards the tape shifter disk 497. The outer portion 504 of the tape shifter disk has a head control lobe 545 which is positioned to be contacted by a leading portion of the head plate 520 in certain relative positions of the head plate and lobe, so as to resist the bias force about the head plate hinge pin 612, as shown in FIG. 37. The head plate also has a head guide pin 547 extending downwardly therefrom on an opposite side of the plate from the head axis 528. The pin 547 engages clearance and guidance slots in a transport chassis, to be described in greater detail with reference to FIG. 41.

The tape shifter disk 497 has a tape shifter cam follower 546 which extends downwardly from the disk 497 to engage a groove in the cam upper surface as will be described. The inner portion 499 of the tape shifter disk 497 has a kidney-shaped clearance opening 548 disposed beneath the inner disk 515. The inner disk 515 has an inner disk cam follower 551 which passes downwardly through the opening 548 and is actuated by the cam disk 536 as will be described with reference to FIGS. 35-38. The inner disk 515 also has a tape holder cam lobe 553 which is also kidney-shaped and extends upwardly from the inner disk to cooperate with the inner portion 514 of the tape holder 508 as will be described, the inner portion thus acting as a cam follower for the tape shifter. The lobe 553 has a tape clearance groove 554 which is described in detail in FIGS. 34, 36 and 39. It can be seen that the inner disk 515 serves as a secondary cam disk which, in combination with the primary cam disk 536, provides the cam means. The disks 536 and 515 are rotatable about laterally spaced apart, parallel, primary and secondary cam axes 537 and 502 respectively. The inner disk or secondary cam disk 515 has a secondary cam follower, namely, the inner disk cam follower 551, which cooperates with the primary cam disk 536 so that the secondary cam disk can rotate in response to movement of the primary cam disk. It is noted that the tape shifter 497 cooperates with the primary cam disk 536, and the tape holder 508 cooperates with the secondary cam disk 515. In addition, the secondary cam axis is concentric with the tape shifter hinge axis 502, and the exit tape guide post 517 is mounted on the secondary cam disk for rotation therewith to be and is locatable into the well of the cassette.

The head bell-crank 529 includes a support connector arm 555 which is co-planar with and extends rigidly from the support arm 525. Thus, the arms 525 and 555 are connected together and are journalled for simultaneous rotation above the pin 526. The arms 525 and 555 are spring biased to rotate together in direction of an arrow 556. The arm 555 has a head support arm cam follower 557 extending downwardly therefrom to cooperate with the upper surface of the cam disk 536 as will be described. It can be seen that the bellcrank 529 serves as a head support means journalled for rotation about the support axis 530, that is, an axis of the pin 526, which is disposed generally parallel to the shifter hinge axis 502. The head support rotates about the support axis in response to relative movement between the head support arm cam follower 557 and the cam means as will be described. Thus, it can be seen that the spring force on the head plate 520 serves as a head biasing means for biasing the magnetic head to rotate the magnetic head with respect to the head support means in the first direction per arrow 544 towards the extracted tape portion. Similarly, the spring force acting on the bellcrank 529 serves as head support biasing means for biasing the head support means to rotate the head support means in the first direction towards the extracted tape. In addition, it is seen that the entry tape guide 522 is mounted for rotation with the magnetic head in response to movement of the primary cam disk and is locatable into the well of the cassette.

A pinch roller control arm 560 extends from the roller arm hinge 494, and is spaced below and resiliently connected to the pinch roller arm 493 so as to rotate therewith, serving as a bellcrank. Similarly to the pinch roller assembly of the second embodiment, a torsion spring, not shown, applies a force to the arms 493 and 560, which biases the arms towards each other as shown per arrow 559, until the arms contact a stop to limit the angle between the arms to that as shown. A pinch roller connector arm 564 has a first end having an oval opening 562 which receives a hinge pin 566 connected to an outer end of the arm 560. The oval opening 562 is disposed laterally of the arm 564 to provide lost motion in the connection between the control arm 560 and the connector arm 564 to accommodate slight arcuate movement of the pin 566 as the arm 560 rotates about the hinge 494. The arm 564 has elongated axially aligned slots 568, and a pair of shouldered pins 569 extend from the transport chassis, not shown, through the slots so as to serve as guide means to limit movement of the arm 564 to direction of an arrow 571. The connector arm 564 has a second end having a pinch roller cam follower 574 which engages the primary cam disk 536 so as to impart motion to the connector arm 564.

FIGS. 30-34

The following is a brief description relating to general operation of the apparatus, showing initial and final locations of major components for various modes of operation. The operation of the apparatus is divided into five distinct modes, designated A through E, which start from a pre-loading condition, Mode A, representing insertion of the cassette into the apparatus, and follow rotation of the primary cam disk 536 in accordance with the arrow 542 which is the loading rotation direction for the cam disk. For simplicity, in the following five figures to represent each mode, only the grooves and lobes associated with actuation of the components of a particular mode are illustrated on the cam disk, and these will be described in greater detail with reference to the full description of the operation.

Figure 30:
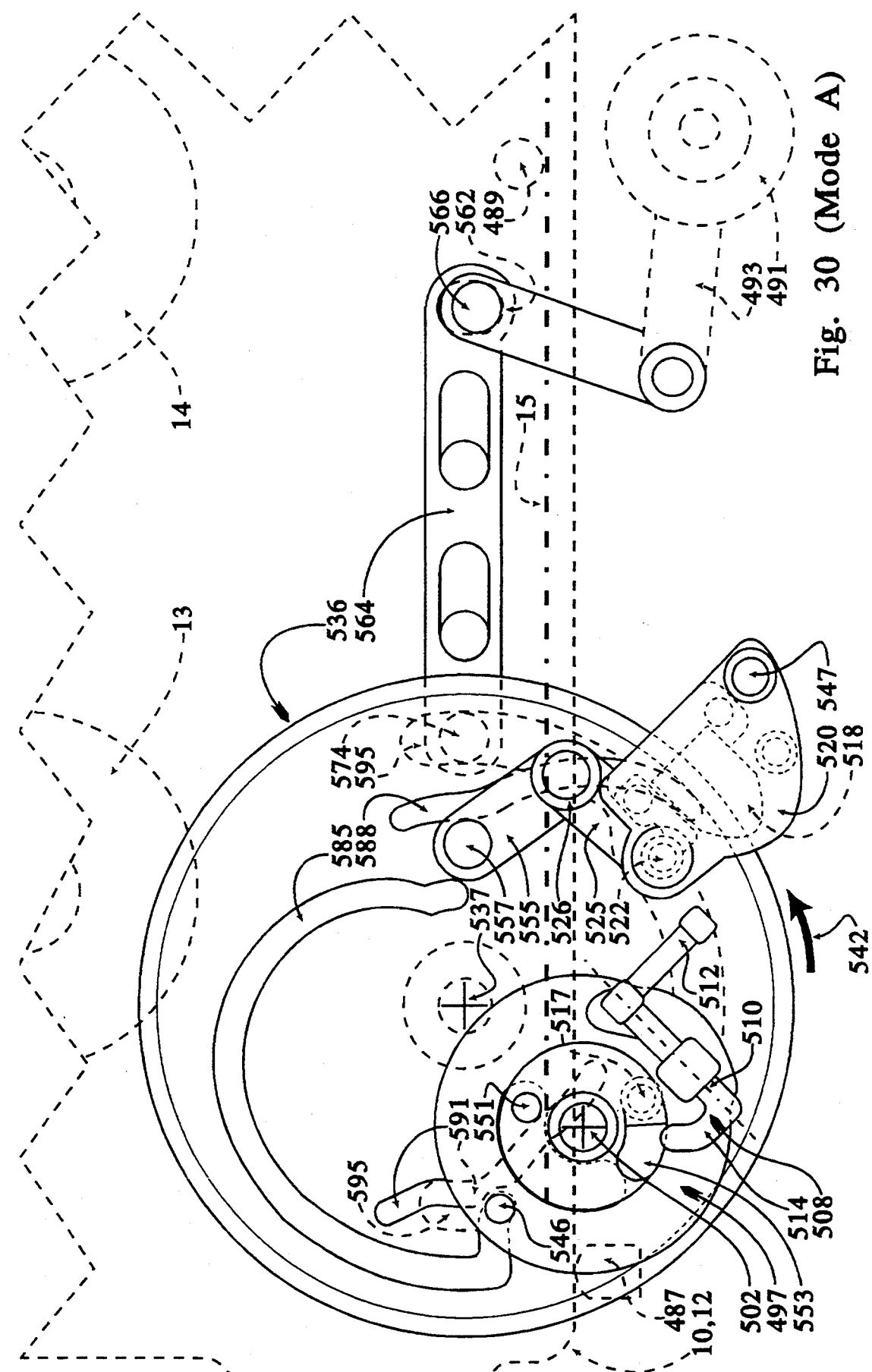

FIG. 30 shows Mode A (pre-loading) which is generally similar to Mode A of the first and second embodiments in which the cassette in located in the cassette compartment of the apparatus, the tape shifter disk is fully retracted, the exit and entry guide posts and the pinch roller are also retracted.

Figure 31:
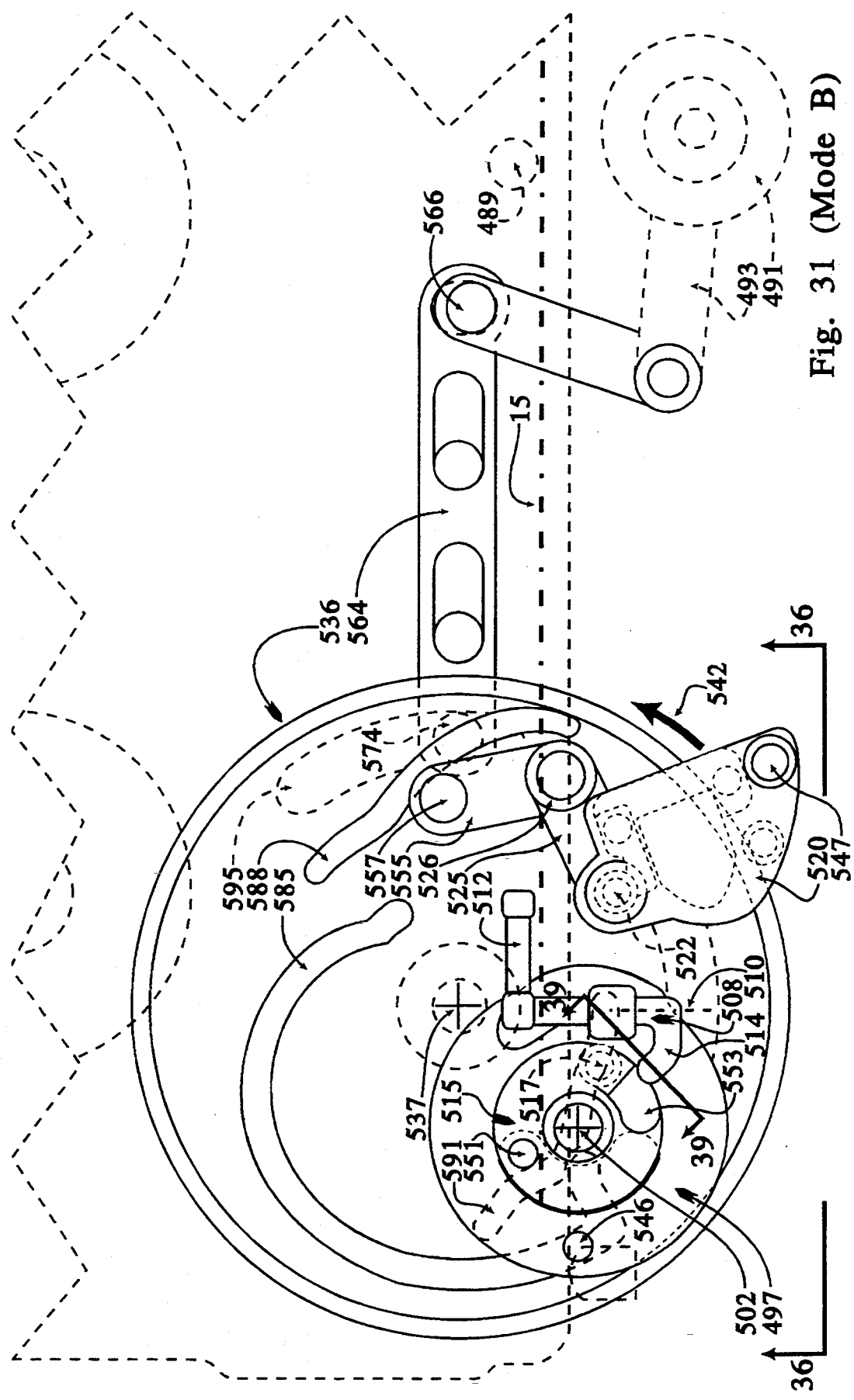

FIG. 31 shows Mode B in which the tape shifter 497 rotates anti-clockwise in a second direction (e.g. per the arrow 516, FIG. 28) to position the tape holder within the supply well in a lowered or retracted position. The head plate assembly and supports for the exit/entry guide posts commence to rotate inwardly towards the supply well.

Figure 32:
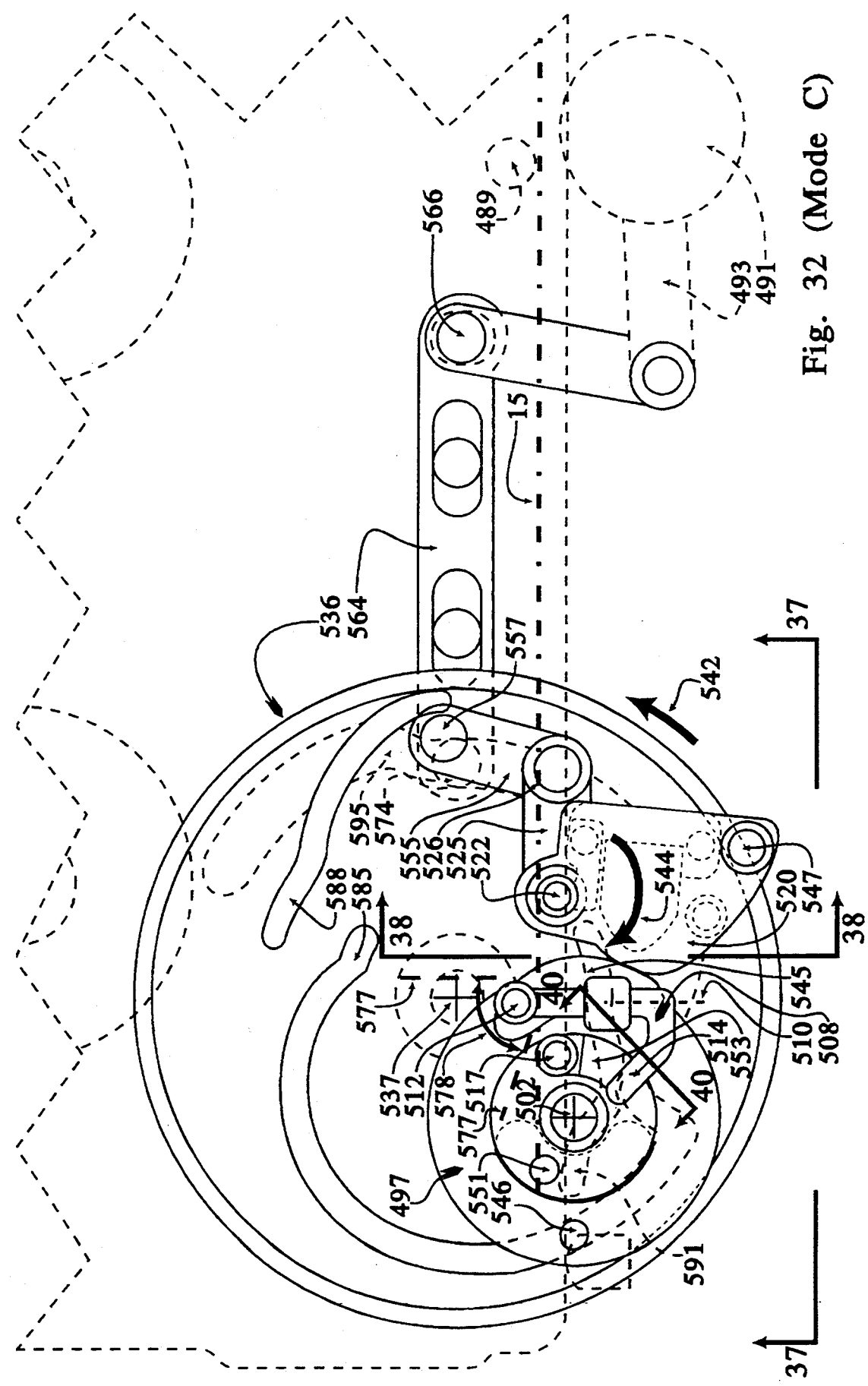

FIG. 32 shows Mode C in which the outer portion of the tape holder has rotated through 90 degrees and stands vertically adjacent the tape in the supply well. The exit and the entry guide posts are within the supply well while the head plate and pinch roller are in intermediate positions. For convenience, forces from the tape acting on the portion 512 are shown in this mode, although these are negligible forces on the portion in this mode. The tape forces are contained within envelope boundaries 577 which are spaced angularly apart at an angle 578. These forces augment spring forces on the tape holder to hold it in the extended position as in the previous embodiments.

Figure 33:
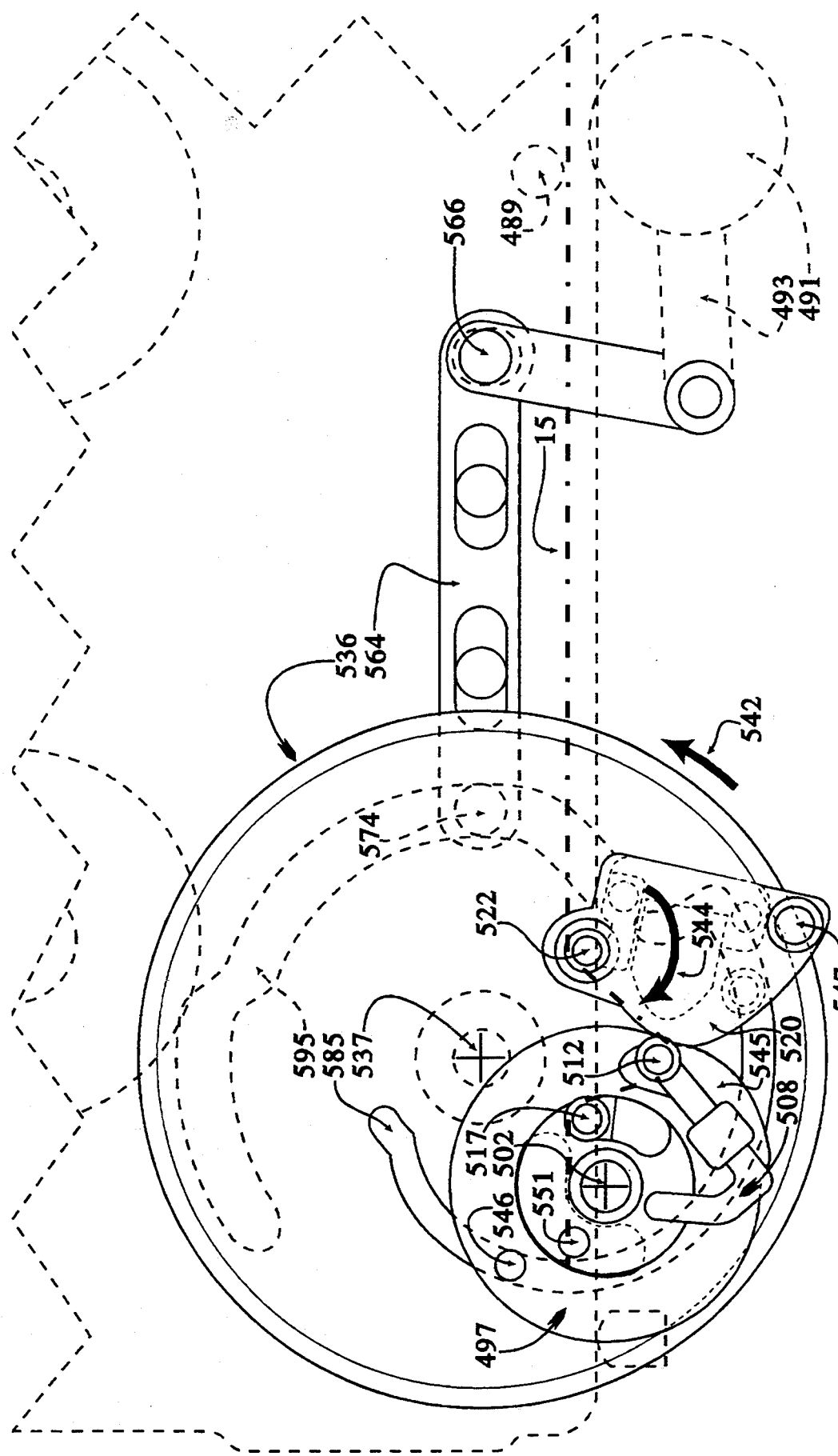

FIG. 33 shows Mode D in which the tape shifter disk begins to rotate away from the cassette shell, drawing a V-shaped extracted portion of tape from the well. The arm is shown in an intermediate or half-loaded position with the apparatus in stop/pause mode ready for other operations. This mode may also be used for fast forward or rewind operations which permits rapid reloading of the tape when engaging play mode.

Figure 34:
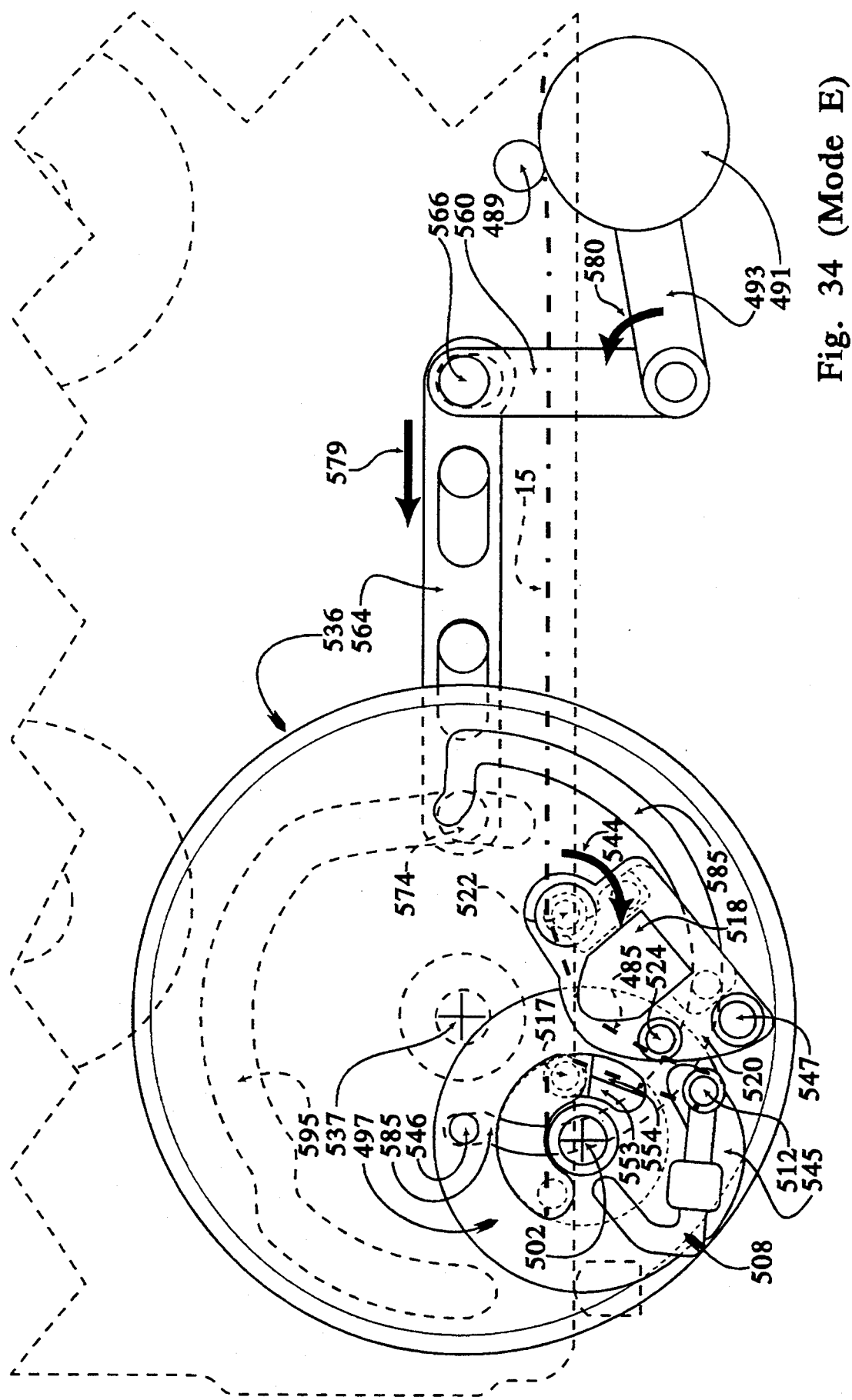

FIG. 34 shows Mode E in which the apparatus in the play or pause mode, where the tape shifter disk is in its final position, with the tape portions fully extracted from the well. The head plate has swung to an innermost position for the head 518 to engage the tape, the tape simultaneously passing over the first and second tape guides. Similarly to the first and second embodiments, most of the extracted portion of the tape is inclined obliquely or non-perpendicularly to the processing edge of the cassette. The entry portion 485 of the tape engages the head 518 and the guides 522 and 524 as shown and is deformed into an relatively conventional arcuate tape wrap. Note that the tape shifter hinge 502 is on a convex side of the arcuate tape wrap, which requires movement of the magnetic head into engagement of the extracted portion of the tape. This is in contrast with the previous embodiments which use fixed magnetic heads and the shifter hinge axis is on a concave side of the arcuate tape wrap. The exit portion 484 of the tape passes through the tape clearance groove 554, which is provided to prevent interference between the tape and the lobe 553 in the play or pause mode.

Figure 35:
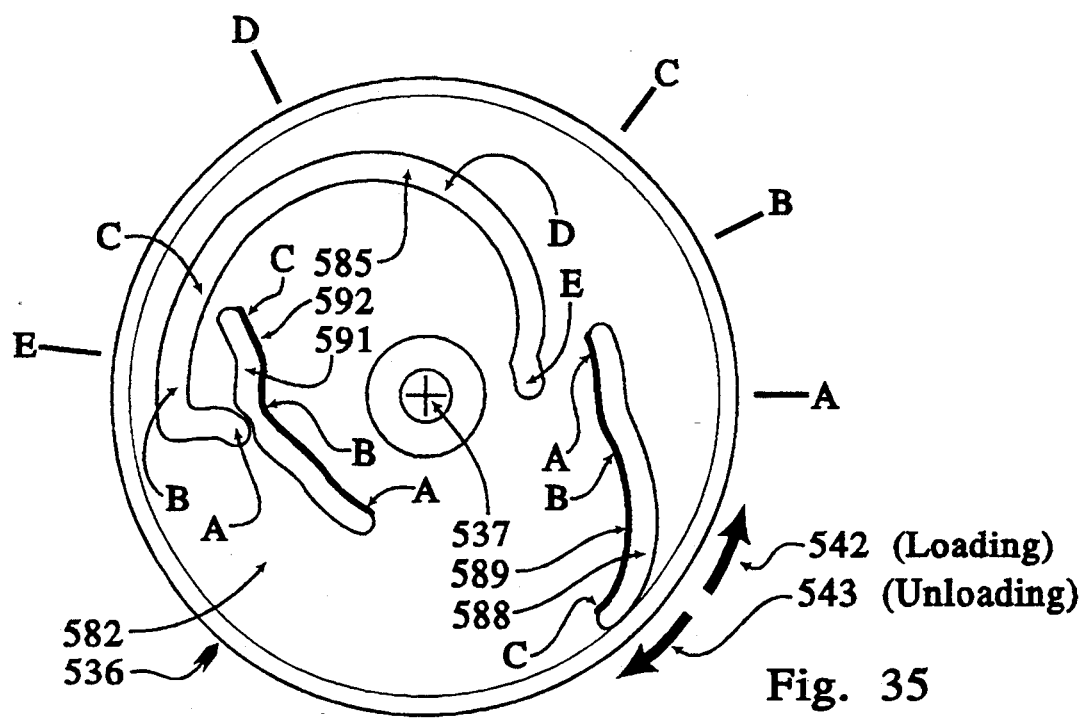
Figure 35A:
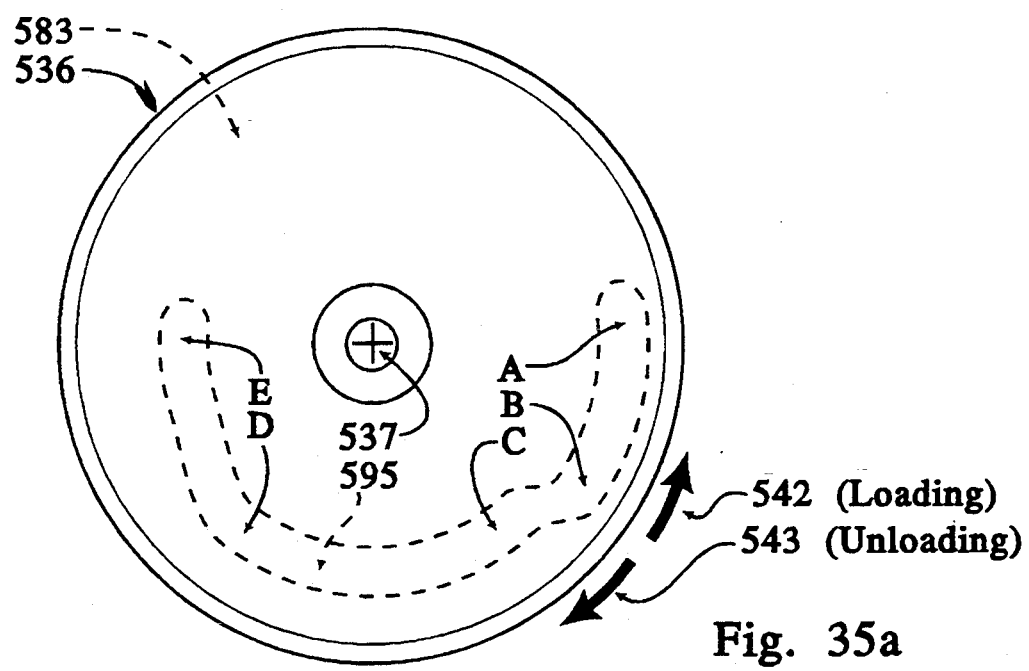
FIG. 35a is a top plan view of the cam disk in the same angular orientation as in FIG. 35, showing the groove on the lower surface in broken outline with operational mode positions also being shown, the grooves and lobes on the upper surface being omitted for clarity.

FIGS. 35 and 35a

The primary cam disk 536 has an upper surface 582 and a lower surface 583. As seen in FIG. 35, the upper surface 582 has a tape shifter cam groove 585 extending thereacross, location of the tape shifter cam follower 546 (FIG. 29) being shown in the groove 585 for particular modes designated by letters A through E. The upper surface 582 also has a head cam lobe 588 which has an inwardly facing face 589 which is engaged by the head support arm cam follower 557 (FIG. 29) at positions as shown designated with modes A, B and C. The surface 582 also has an inner disk or exit guide cam lobe 591 which has an inwardly facing face 592 which is engaged by the inner disk cam follower 551 (FIG. 29) at particular locations as designated with the Mode letters A through C. Clearly, the cam followers 557 and 551 are spring-biased at journals thereof to engage the appropriate inwardly facing faces of the respective cam lobes as described above which faces are designated by a heavy line.

Referring to FIG. 35a, the lower surface 583 has a pinch roller cam groove 595 extending thereacross which is engaged by the pinch roller cam follower 574 at locations in the groove as designated by Modes A through E.

Figure 36:
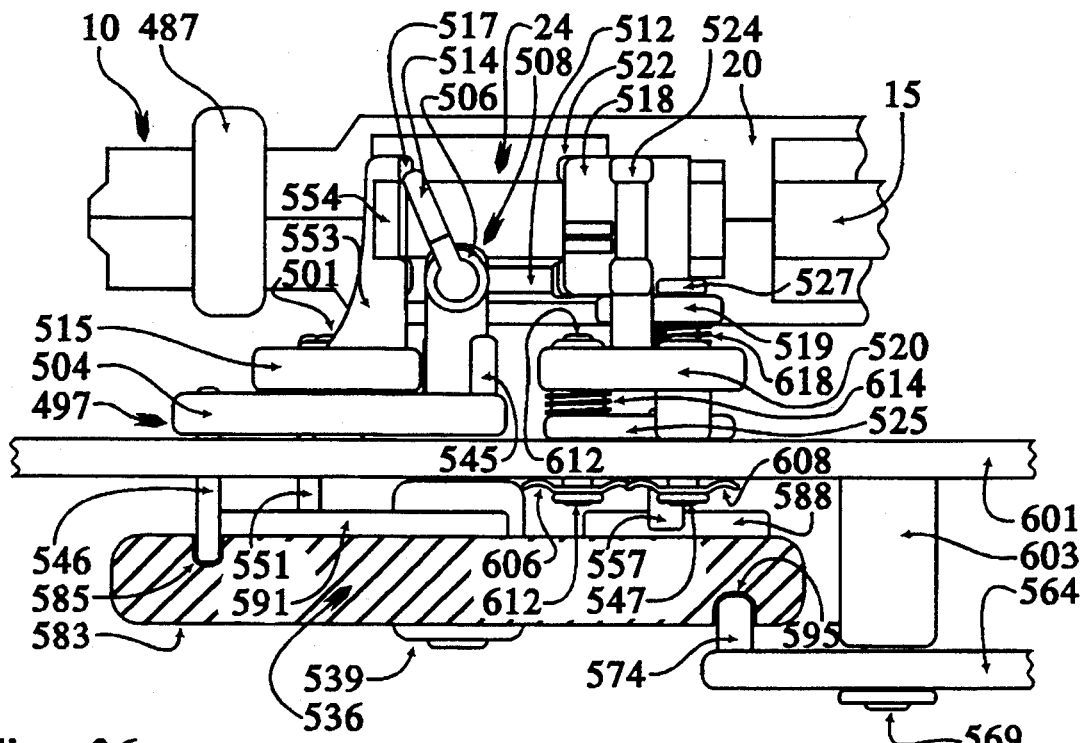
Figure 38:
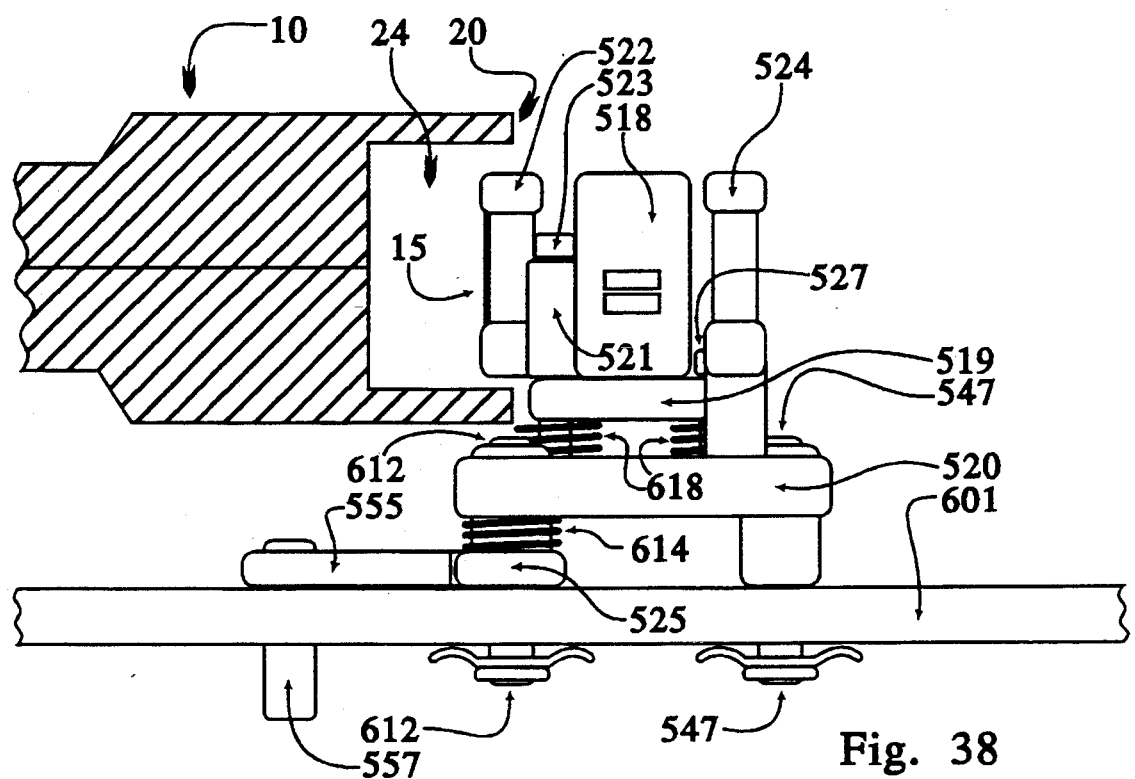

FIGS. 36 through 38

FIG. 36 reflects relative positions of components in Mode B, and FIG. 37 reflects relative positions of the same components in Mode C. FIG. 38 shows other components in Mode C.

Similarly to the first and second embodiments, most of the components of the third embodiment are supported by a transport chassis 601. As can be seen, the tape shifter disk 497 and associated inner disk 515 and associated lobes and bearings are fitted above the transport chassis 601. Similarly, the head plate 520 and associated magnetic head 518 and outer tape guide post 524 are also located above the chassis. In contrast, the primary cam disk 536 mounted on the cam disk journal 539, and the pinch roller connector arm 564 are mounted below the chassis 601. It is noted that the shouldered pins 569 are mounted on a pin support 603 extending downwardly from the chassis 601 so as to position the connector arm 564 below the cam disk 536, so that the pinch roller cam follower 574 extends upwardly to engage the pinch roller cam groove 595 on the lower surface of the cam disk. The head support arm cam follower 557 and the inner disk cam follower 551 are seen to be engaging faces of the head cam lobe 588 and inner disk or exit guide cam lobe 591 respectively.

As seen best in FIGS. 36 and 38, a head plate hinge pin 612 connects the head plate 520 to the head plate support arm 525 to permit hinging thereabouts. A torsion spring 614 extends around the pin 612 to apply a force between the head plate and the arm 525, direction of force on the head plate being shown by the arrow 544 in FIG. 29. The hinge pin 612 is generally axially aligned with the entry guide post 522 to provide a compact unit requiring minimal space for insertion of the head 518 into the well. The hinge pin 612 is also axially spaced from the entry guide post 522 to provide clearance for a lower wall of the cassette well 24 when inserting the guide post 522 into the well. Thus, rotation of the magnetic head 518, as seen in, for example, FIGS. 30 through 34 describing Modes A through E, is also about a central axis passing through the entry guide post 522. As seen only in FIG. 37, a head support torsion spring 616 encircles the support arm hinge pin 526 and applies the previously described spring bias to the arms 525 and 555 per the arrow 556 of FIG. 29. Thus, the head plate 520 is subjected to two main torques namely, the torque from the spring 614 encircling the pin 612, and the torque from the spring 616 encircling the hinge pin 526, both of which result in a twisting force urging the head towards the well as will be described. Lower ends of the head plate hinge pin 612 and the head guide pin 547 are provided with a retainer leaf springs 606 and 608 respectively which apply a restraining force to the ends of the pins to reduce lost motion in the connections between the various components to ensure accurate location of the head plate 520 and guide post 522 within the well. As previously described, the head sub-plate 519 is connected to the plate 520 by the screw 527, which screw is encircled by a compression spring 618 which facilitates fine adjustment of the position of the magnetic head with respect to the head plate 520 for head-to-tape alignment adjustment of the magnetic head.

Referring to FIG. 36 which shows Mode B, the outer portion 512 of the tape holder is shown in a lowered or retracted position after passing under a lower edge of the tape 15 for entry into the well 24 of the cassette. In this position, the inner portion 514 of the tape holder 508 is held as shown adjacent an upper portion of the tape holder cam lobe 553, force from the tape holder spring being overcome by the cam lobe 553. The portion 514 is clear of the tape clearance groove 554 in the lobe 553. The head plate 520 is biased by the force from the springs 614 and 616 towards the cassette well 24, and is still spaced from the head control lobe 545 carried on the shifter disk 497 by other restraining and guide means to be described with reference to FIG. 41.

Referring to FIG. 37 showing Mode C, the inner portion 514 of the tape holder 508 has moved downwardly along the tape holder cam lobe 553 in response to relative movement between the lobe 553 and inner portion and torque on the inner portion due to the spring bias of the holder 508. The inner portion 514 is now at a position disposed 90 degrees from the position shown in FIG. 36, and thus the outer portion 512 of the tape holder has correspondingly moved from the horizontal retracted position shown in FIG. 36, to a raised vertical position shown in FIG. 37, and is shown disposed adjacent an inner face of the tape 15 within the well 24. Similarly to the previously described embodiments, the spring bias force, augmented by tape forces, holds locking teeth, not shown, in engagement with each other to maintain the outer portion 512 accurately in the extended position. In this position, the head plate 520 has moved inwardly to contact the head control lobe 545 mounted on the shifter disk 497. Thus, the inner portion of the tape holder serves as the tape holder cam follower to cooperate with the cam means for rotating the tape holder in response to relative movement between the cam means and the tape holder cam follower.

Figure 39:
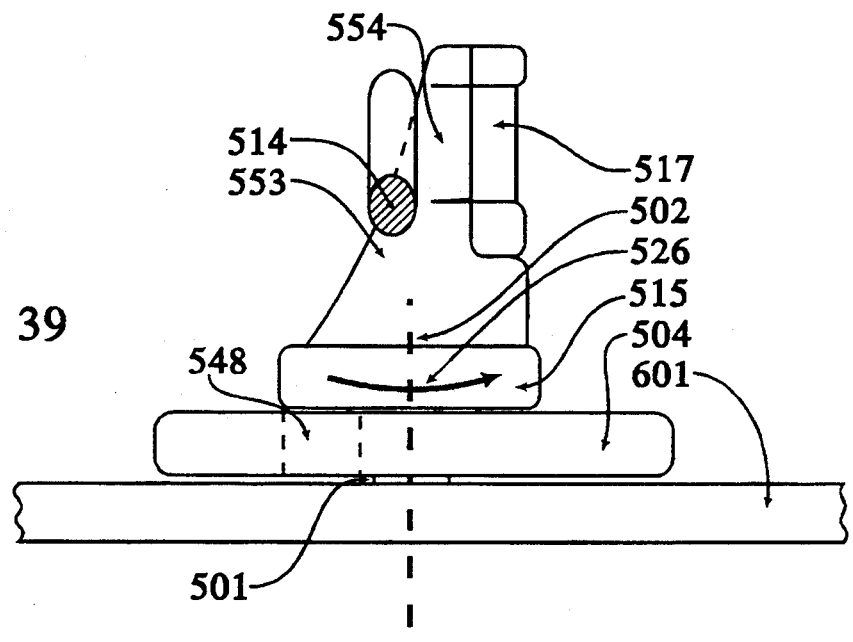
Figure 40:
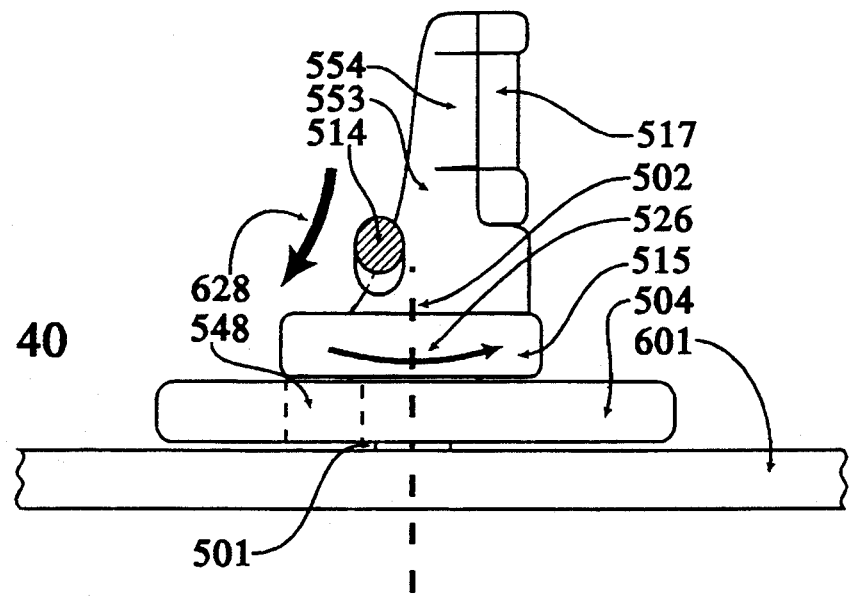

FIGS. 39 and 40

FIG. 39 shows the inner portion of the tape holder 514 engaging the tape holder cam lobe 553 in Mode B, whereas FIG. 40 shows the inner portion 514 engaging the tape holder cam lobe 553 in Mode C.

Referring to FIG. 39, the inner portion 514 is held against an upper portion of the lobe 553 by the torsion spring biasing the tape holder as previously described. As the inner disk 515 rotates in direction of an arrow 526, (corresponding to the arrow 516 of FIG. 28), the tape holder cam lobe 553 similarly shifts in the same direction, permitting the inner portion 514 to move downwardly in direction of an arrow 628 to assume the lower position on the lobe 553 as shown, without contacting the tape clearance groove 554. This full movement of the inner portion 514 occurs over a relative rotation of about 35 degrees between the shifter disk 497 and the inner disk 515.

FIG. 41

To reduce overall dimensions of the apparatus, the head plate 520 is mounted for a relatively complex movement to move between a retracted position as shown in FIG. 30, Mode A, to the fully engaged or extended position shown in FIG. 34, Mode E and vice versa. The transport chassis 601 has a plurality of clearance and guidance slots therein to provide clearance and guidance for various cam followers and the head guide pin 547 to control such movement as follows. A support arm clearance slot 638, and a head hinge pin clearance slot 640 are two angularly spaced arcuate slots concentric with the support arm hinge pin 526. The head guide pin 547 passes along an inner head guide clearance slot 643 and an outer head guide guidance slot 644 which are interconnected as shown. The slots 643 and 644 are also arcuate and represent essentially outer limits of movement of the head plate, which results in a smaller overall size of clearance required for rotating the head plate between the retracted and extended positions. The slot 643 is concentric with the head pin 612 in a first full outline position as shown, and the slot 644 is concentric with the location of the support arm hinge pin 526.

For simplicity, the head plate is shown in full outline in a fully extended operative position as in Mode E, and the sequence of retraction of the head plate to the preloading Mode A will be described as follows, reference also being made to FIGS. 30-34. From the full outline position as shown, the head plate rotates about the head hinge pin 612 so that the head guide pin 547 sweeps to a first broken outline position 547.1 in accordance with an arrow 647. This motion is imparted by rotation of the shifter disk 497 anti-clockwise which causes the head control lobe 545 to force against the head plate 520 against biasing force from the spring 614. This is followed by shifting of the head support arm cam follower 557 per arrow 649 to attain a second or broken outline position 557.1 as a result of rotation of the cam disk 536. Simultaneously, the pin 612 rotates per arrow 651 to assume a second or broken outline position 612.1, and simultaneously the head guide pin 547 moves from the second or broken outline position 547.1 to the third or broken outline position 547.2 in accordance with an arrow 653. The head plate now assumes the broken outline position 520.1.

Figure 41:
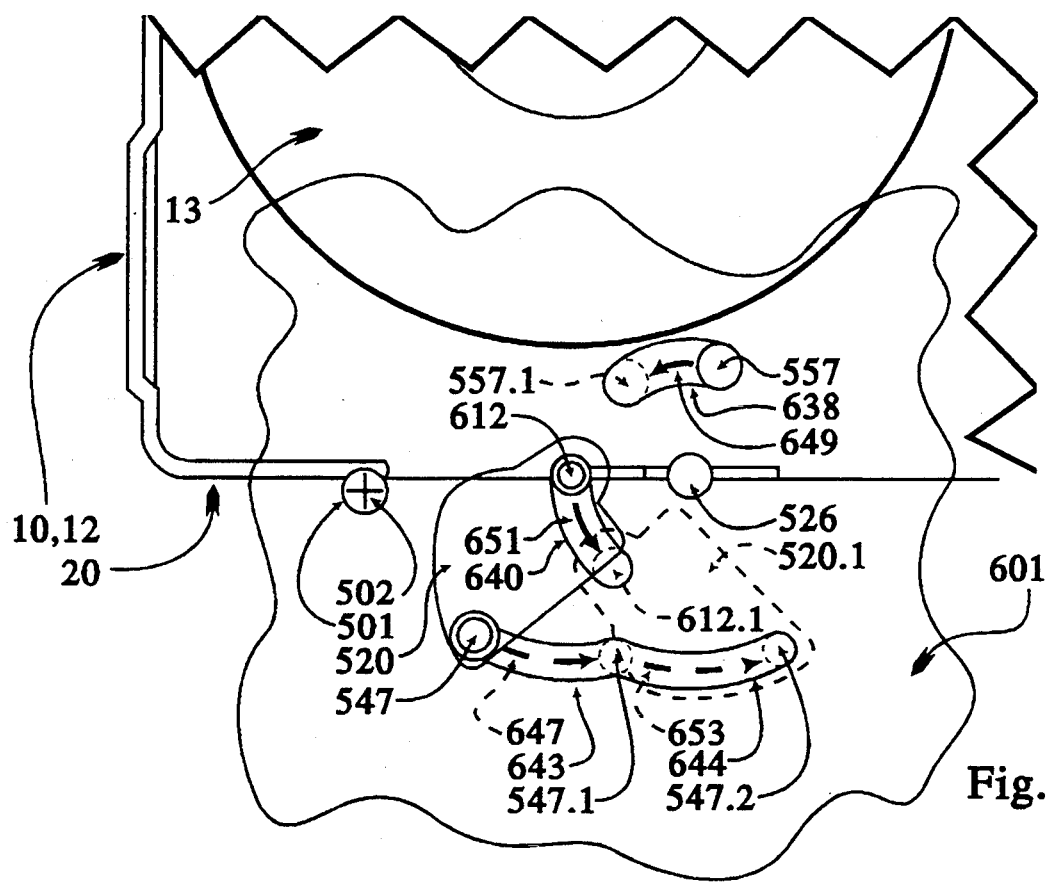

It is noted that the clearance slots 638, 640, and 643 are for clearance only, and do not control motion of the guide pin 547 passing along the clearance opening. In contrast, the slot 644 serves the function of both guidance and clearance for the head guide pin 547 as an outer concave wall of the slot 644 resists movement of the pin 547 and the head plate 520 about the head plate hinge pin 612 due to bias force from the head plate torsion spring 614. This guidance function occurs as the head plate moves between Modes A and B and immediately before Mode C while the hinge pin 612 reaches the final full outline position. This sequence of movements ensures that the magnetic head follows a path close to the cassette body to reduce overall size of the apparatus. Thus, as previously stated with reference to FIG. 36, until Mode C is attained, the head plate 520 is resisted from contacting the head control lobe 545 in the Modes A and B by cooperation between the head control pin 547 and the outer wall of the groove 644. An additional function of the grooves is that the head guide pin 547 is held in Mode E in the full outline position as shown in FIG. 41 by interference with the left-hand end of the inner slot 643. From Modes C to D, the head guide pin 547 traverses the groove 643 from the position 547.1 to an intermediate position between 547.1 and 547 during which time the head plate 520 contacts the head control lobe 545 which resists torque from the springs. From Modes D to E, the guide pin 547 continues movement and reaches the position 547, while the head plate 520 rotates to the full outline position of FIG. 41, the hinge pin 612 for serving as the center of such rotation.

In summary, it can be seen that the outer concave wall of the outer head guide slot 644 of FIG. 41, and the head control lobe 545 serve as head guide means cooperating with the magnetic head to assist in guiding the magnetic head as it moves towards and away from the magnetic tape. Also, the head support arm cam follower 557 and the associated support arm serve as head retraction means as a head cam follower cooperating with the magnetic head, and the cam means to rotate to the magnetic head in a direction opposite to the biasing force from the springs so as to move away from the extracted tape. The head support cam follower 557 cooperates with the cam means to rotate the head in the second direction as described. Also, it can be seen that the head plate 520 mounting the magnetic head has an inner end hinged to the head support means for rotating about the head axis 528, and an outer end remote from the inner end having the head guide means or pin 547. In addition, it can be seen that the magnetic head is rotated about the support axis 530 which is spaced from and parallel to the head axis 528, so that a portion of the head describes two interconnected circular arcs when passing between retracted and extended positions of the head.

Operation of the Third Embodiment

Operation of the third embodiment has some similarities with the previously described operations, but has some additional complications to accommodate the small size of the apparatus.

Referring to FIG. 30 showing Mode A, the pre-loading mode, the tape holder 308, the exit and entry guide posts 517 and 522 and the head 518 are fully retracted from the cassette well 24 by rotation of the inner disk 515, the tape shifter disk 497 and head support arm 525. The head plate 520 is located in a fully retracted position with the head guide pin 547 located at an extreme right hand position at 547.2 in the groove 644 (FIG. 41). The outer portion 512 of the tape holder 508 is in a lowered or retracted position and is located remote from the well 24 also by rotation of the disk 497. The cassette is seated on the control surfaces 487 and automatic tape slack take-up is performed.

To move from Mode A to Mode B in FIG. 31, the tape shifter disk 497 and the inner disk 515 rotate anti-clockwise in the second direction in unison due to the tape shifter cam follower 546 being moved by the tape shifter cam groove 585 against the spring bias, and the inner disk cam follower 551 being released by the inner disk or exit guide cam lobe 591 to move under its spring bias. The simultaneous movement produces no change in relative position between the tape holder cam lobe 553 and the inner portion 514 of the tape holder, consequently, there is no movement of the tape holder 508 about the axis 510. The outer portion 512 remains in the lowered or retracted position as it approaches the well 24, and the outer portion 512 then passes under a lower edge of the tape 15. The tape shifter disk 497 stops rotation when the outer portion 512 of the tape holder reaches the position as shown in FIG. 31, attaining Mode B. The head support arm 525 rotates clockwise in the first direction due to the cam follower 557 being moved by the head cam lobe 588 (FIG. 35), which in turn causes the head plate hinge pin 612 (FIG. 38) to commence movement along the clearance groove 640 (FIG. 41). Simultaneously, the head guide pin 547 is drawn along the head guide slot 644, and the head plate 520 commences rotation clockwise in the first direction towards the cassette.

As the primary cam disk continues to rotate to approach Mode C as shown in FIG. 32, the cam lobe 591 gradually releases the cam follower 551, permitting the inner disk to continue to rotate anti-clockwise due to its spring bias. Meanwhile, the tape shifter disk 497 is held stationary. Relative rotation between the inner disk 515 and the tape shifter disk 497 and spring bias on the tape holder 518 causes the inner portion 514 of the tape holder to move downwardly along the tape holder cam lobe 553 in direction of the arrow 628, as shown in FIG. 40. This causes corresponding rotation of the tape holder 508 about the axis 510, which rotates the outer portion 512 through 90 degrees to the raised or extended position adjacent an inner face of the tape, as shown in FIGS. 32 and 37.

As Mode C is attained, the exit guide post 517 is located in its final position adjacent the cassette well 524 on an opposite side of the tape 15 from the outer portion 512. Simultaneously, the entry guide post 522 is inserted into the well by continued rotation of the arm 525 due to action of the cam lobe 588 on the cam follower 557. At this stage, it can be seen that, prior to rotating the tape holder in the second direction to the extended position, the first tape guide 517 is rotated about the shifter hinge axis 502 so as to position the first tape guide adjacent the well, and the second tape guide 522 is rotated about the support axis 530 so as to position the second tape guide adjacent the well. Because the entry guide post 522 and the head plate hinge pin 612 are axially aligned with each other, the head plate 520 is also positioned in an inner position as shown, in which the head plate hinge pin 612 (not shown in FIG. 32) attains the position 612 within the groove 640 as shown in FIG. 41. In this position the head guide pin 547 reaches the position 547.1 in FIG. 41 between the two slots 643 and 644. As shown in FIG. 37 the head plate 520 now contacts the head control lobe 545, thus holding the head plate away from the cassette well 24 in opposition to the spring force as shown by arrow 544. At this stage of the operation, it can be seen that, prior to extracting the tape, and concurrently with moving the head towards a final position of the extracted portion of the tape, the tape guides are positioned adjacent a well of the cassette to prevent undesirable contact between the extracted portion of the tape and the cassette body as described with the previous embodiments.

To move from Mode C in FIG. 32 to Mode D in FIG. 33, the reel brakes are released and back tension is preferably applied to both reel hubs. Continued rotation of the primary cam disk per the arrow 542 results in the tape shifter cam follower 546 rotating the tape shifter disk 497 clockwise in the first direction to move the tape holder outer portion 512 outwardly from the well as shown. Simultaneously, a portion of the tape 15 is extracted and initially drawn generally perpendicularly from the well into a general V-shape, with the exit and entry portions 484 and 485 passing around the guide posts 517 and 522 respectively to prevent the extracted tape portion from contacting the cassette. Spacing between the tape holder and the shifter axis, i.e. radius of shifter "arm" in this embodiment is shorter than in the previously described first and second embodiments. Consequently, radius of the arc of travel of the tape holder is much shorter, and a portion of the travel of the tape holder between the tape guide posts 517 and 522 correspondingly has a greater curvature, and has a shorter distance being generally perpendicular to the processing edge of the cassette body. Consequently, the tighter curve of the arc must be observed to ensure adequate clearance between the tape guide posts as the outer portion 512 enters and leaves the well so as to produce no interference with the tape guide means. The inner disk remains stationary, and thus the exit guide post 517 also remains stationary. The head control lobe 545 sweeps past the head plate 520, holding the head plate against force from the spring 614 tending to bias the head in direction of the arrow 544 towards the well. In the position shown in FIG. 33, Mode D, the outer portion 512 is in an intermediate loaded position, at which time the reel brakes are engaged and the loading process is complete, with the apparatus in the stop/pause mode ready for other operations. This mode may also be used for fast forward or rewind operations to permit rapid reloading of the tape when switching back to the play mode as shown in FIG. 34, Mode E, as follows.

To move from Mode D, FIG. 33, to Mode E, FIG. 34, the tape shifter disk 497 continues clockwise rotation drawing more tape from the cassette until the outer portion 512 reaches the final position as shown. The reel motor is activated in the forward direction ready for play mode, and the primary cam disk 536 rotates further, releasing the reel brakes, while continuing rotation of the shifter disk in the clockwise direction. As the tape shifter disk approaches its final operative position, the head control lobe 545 moves clockwise to release the head plate 520, allowing the head plate to rotate further towards the cassette in direction of the arrow 544 under the influence of the spring bias. It can be seen that the head control lobe serves as a variable radius cam to release the magnetic head to move in a first direction thereof under the biasing force from the springs 614 and 616. When reversing the action, the lobe 545 moves the head against the biasing force, in an opposite second direction away from the tape.

The head guide pin 547 passes along the groove 643 of FIG. 41 and attains the full outline position at a left hand end of the groove 643 as shown in FIG. 41. The contact surface of the magnetic head 518 engages the entry portion of the tape 485, and full tape wrap of the head 518 is achieved as the entry portion of tape 485 finally contacts the outer tape guide 524 as shown in FIG. 34. Essentially simultaneously, the pinch roller connector arm 564 shifts linearly per an arrow 579 inwardly towards the cam disk axis 537 due to movement between the pinch roller cam groove 595 and the pinch roller cam follower 574, which results in simultaneous rotation of the pinch roller arm 493 per an arrow 580 to cause the pinch roller 491 to engage the capstan 489 and pinch the tape 15 therebetween. A slight resilience between the arms 560 and 493 ensures an adequate pinch force to drive the tape in the normal play mode. This mode may also be used as a pause mode by stopping the capstan motor and maintaining engagement of the tape by the pinch roller. The process can be reversed by reversing the method described above.

In FIG. 34, it is noted that the magnetic head and tape guide posts 522 and 524 are embraced by an arcuate tape wrap, which has a concave side on the side of the magnetic head, as in the first and second embodiments, but has a shifter hinge axis 502 on a convex side of the head, which is in contrast to the first and second embodiments. This is because the magnetic head is moved into the tape as it is drawn from the cassette well, and thus the tape does not form an arcuate wrap around the head on the same side as the shifter hinge axis 502 as in the previous embodiments. Thus, the method of operation of the third embodiment differs from the methods of the first and second embodiments by moving the tape holder through a travel arc centered on the shifter hinge axis, which axis is located on a convex side of an arcuate tape wrap engaging the magnetic heads.

In summary, for all three embodiments of the invention, it can be seen that the method of the invention for processing the tape of a data bearing tape cassette, includes the following steps. The first step relates to rotating an inner portion of a tape shifter in a first direction about a shifter hinge axis disposed parallel to axis of rotation of the cassette reels, so as to position a tape holder which is connected to an outer portion of the tape shifter adjacent a well of the cassette body to attain an inserted position. This is followed by passing the tape holder in a retracted position into the well between an edge of the tape and an oppositely facing portion of the well of the cassette body. This in turn is followed by rotating the tape holder about a holder axis disposed normally to the shifter hinge axis so as to extend and position the tape holder adjacent an inside face of a portion of the tape. The final step includes rotating the inner portion of the tape shifter in a second direction opposite to the first direction, so that the tape holder draws an extracted length of tape from the well of the cassette body for processing, while preventing the extracted length of tape from contacting the cassette body.

Additional Modifications to the Third and First Embodiments

FIG. 42

Figure 42:
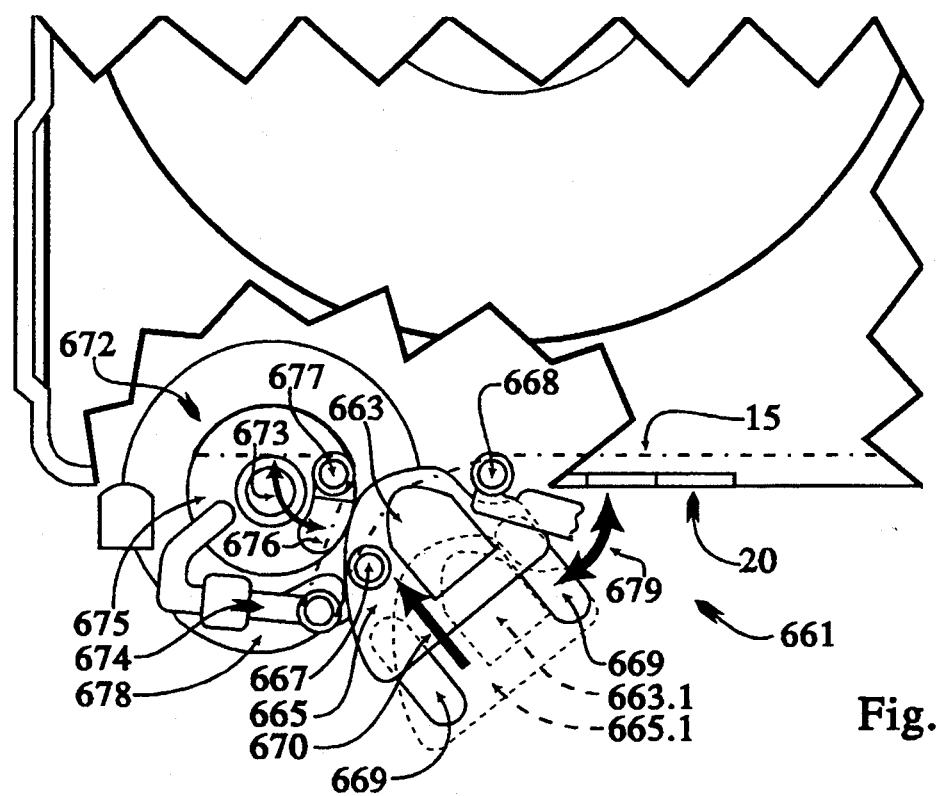
FIGS. 42 through 44 show additional modifications to the third and first embodiments, and use with an alternative DCC cassette.

The third embodiment of FIGS. 28 through 41 shows a magnetic head mounted for rotational or arcuate movement about a head support arm which itself is mounted for rotational movement. Thus, the head is subjected to a complex motion comprising of two rotations, which reduces clearance required for movement of the head from a retracted position clear of the tape, to an extended position in contact with an extracted portion of the tape. An alternative means of moving the head is to provide a linear or straight line guided head movement, thus eliminating the relatively complex rotational movement of the head as previously described. FIG. 42 is a highly simplified diagram showing one means of guiding the head for linear movement towards and away from the an extracted portion of the tape, resulting in a relatively small size of a tape transport of a similar order of magnitude as the third embodiment is shown in FIGS. 28 through 41.

A modified third embodiment 661 has a magnetic head 663 mounted on a head plate 665 with a first tape guide post 667 secured to the plate on one side of the head, and a second tape guide post 668 locatable by means, not shown, on an opposite side of the head. The head plate 665 is mounted for movement along head guide grooves 669 which cooperate with complementary guide groove engaging means (not shown) beneath the head plate to permit movement of the head along the grooves. The head is biased to move inwardly in direction of an arrow 670 by spring means, not shown, from a retracted position 665.1, shown in broken outline, to an extended position shown in full outline. In the extended position, the second guide post 668 is located in the well to serve as an entry guide post, at a position similar to the corresponding post in the third embodiment. The grooves, the groove engaging means (or functionally equivalent guides) and the spring means can be in accordance with prior art. The head plate is controlled by a cam follower cooperating with cam means, both of which are not shown, generally in accordance with prior art practice.

The modified third embodiment also includes a tape shifter 672 mounted for rotation and carrying a tape holder 674. An inner disk 675 is mounted on the tape shifter to control actuation of the tape holder, and to locate an exit guide post 677 mounted thereon into the well as previously described. Operation of the tape shifter and the tape holder is generally in accordance with that as previously described, the tape holder extracting a portion of tape 676 from the cassette well. An exit portion 676 of the tape is inclined obliquely at an acute angle 673, to the processing edge 20 of the cassette typically between 30 and 60 degrees. The tape shifter has a head control lobe 678 which cooperates with the head plate 665 to control position of the head plate 665 against force from the spring biasing the head plate to the extended position. The grooves 669 are inclined at an acute angle 679 to the edge 20 of the cassette, and preferably perpendicularly to the undisturbed entry portion of tape.

This alternative head mounting and moving means for the third embodiment provides a simpler head movement when compared with the previously described third embodiment, but in some instances, it would require additional space. Thus, in contrast to the third embodiment, in this modified third embodiment, the magnetic head moves along a linear path between retracted and extended positions, the linear path being inclined obliquely at the acute angle 679 to the processing edge of the cassette.

FIG. 43

Figure 43:
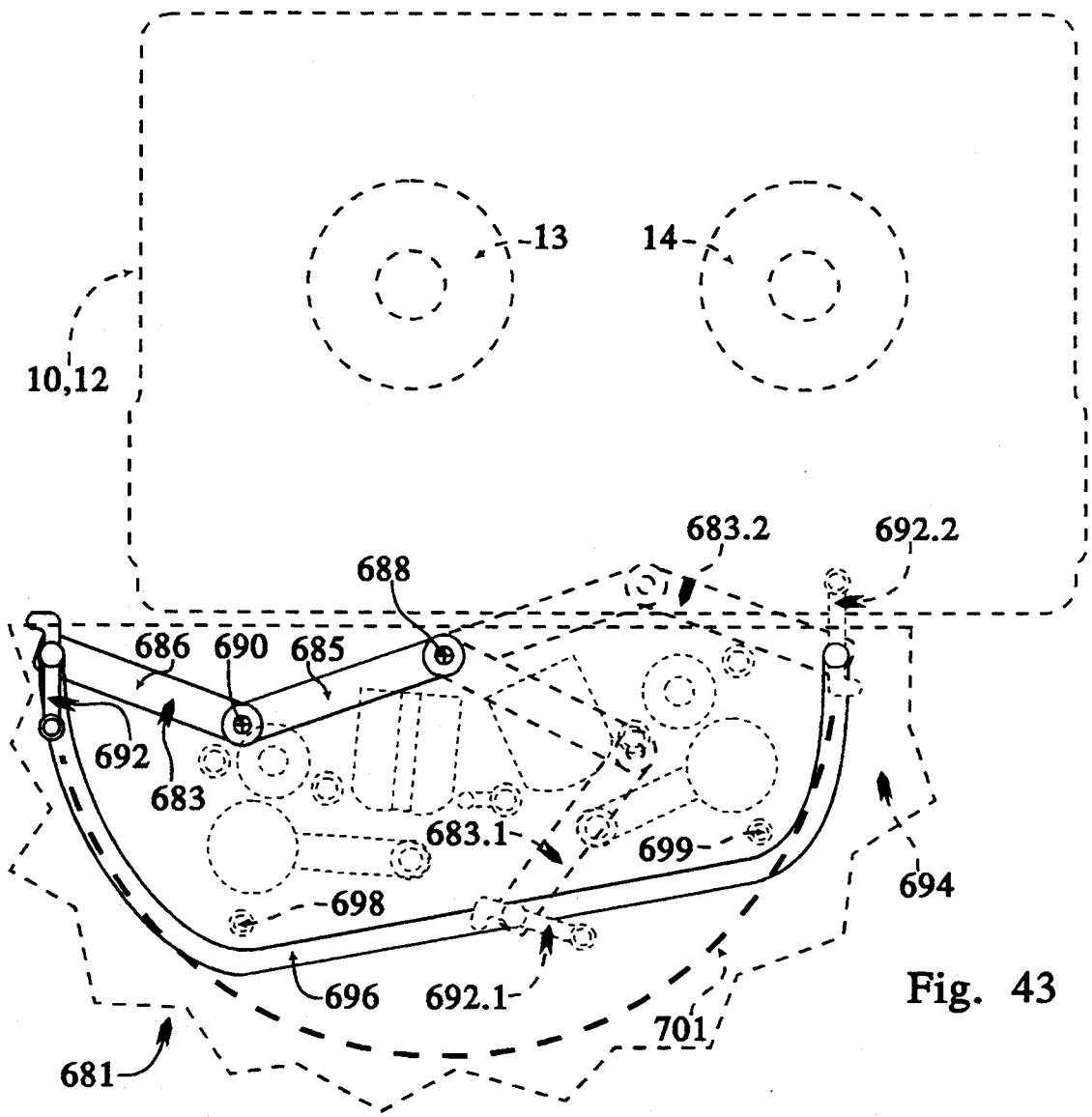

In all the previously described embodiments, the tape shifter has inner and outer portions rigidly connected together so that rotation of the inner portion about the shifter hinge axis causes an equal angular corresponding rotation of the outer portion, which in turn moves the tape holder connected thereto towards or away from the cassette on a circular arc. Particularly with respect to the first embodiment of FIGS. 1 through 18, the shifter arm requires sufficient space to permit 180 degrees of rotation between the extended and retracted positions, which correspondingly increases the amount of space required for such movement. FIG. 43 shows a highly simplified diagram of an alternative tape shifter which is an articulated arm and is particularly adapted to reduce the size of space that would otherwise be required for a rigid arm as shown in the first embodiment.

A modified first embodiment of the invention 681 includes a modified tape shifter arm 683 having an inner portion 685 and an outer portion 686 which are shown in full outline in a fully extended position. The inner portion 685 is journalled for rotation about a shifter hinge axis 688 at an inner end thereof, and is hinged to the outer portion 686 by a tape shifter elbow hinge for rotation about a tape shifter elbow axis 690 disposed parallel to the tape shifter hinge axis 688. An outer end of the outer portion 686 carries a tape holder 692 which is generally similar to the tape holders as previously described.

Structure common to the first embodiment is located on a transport chassis, for example, undesignated capstans, magnetic heads, fixed tape guides and re-entry tape guides 698 and 699, shown in broken outline and as previously described with reference to the first embodiment. A sub-chassis 694, mounted above the transport chassis, carries a tape holder guide 696 which is a groove in an upper surface of the sub-chassis adapted to receive an engaging means, not shown, extending downwardly from the outer end of the outer portion 686 of the arm. All tape processing items on the transport chassis are located within the tape holder guide 696.

The modified tape shifter arm 683 is shown in full outline in a fully extended position where a length of tape, not shown, extends from the take-up well of the cassette to the tape holder 692, passing through the guides and magnetic heads as previously described. The arm is also shown in broken outline in an intermediate position at 683.1, and a loading and unloading or inserted position at 683.2, wherein the tape holder, shown in broken outline at 692.2, is inserted into the take-up well of the cassette.

Yet a further alternative, would be to provide an arm with multiple articulation joints or elbows, or a fully resilient arm which can move between the fully retracted and fully extended positions as shown, with the tape holder traversing the path as shown. For comparison of size, a portion of a travel arc 701 is shown in broken outline to represent the travel arc 59 swept out by the tape holder of the first embodiment, showing the reduction in size between use of a rigid tape shifter arm of the first embodiment, and a single articulated arm as shown in the modified first embodiment.

FIG. 44

The previously disclosed embodiments show a plurality of tape transport apparatus particularly for use with a Philips Compact Cassette. As described previously, the present invention is also adaptable for use with a Philips Digital Compact Cassette (DCC) which has a cassette shell of generally similar dimensions to the Compact Cassette, and cassette compartment suitable for the DCC can also receive the compact cassette.

A DCC 706 has supply and take-up reels 707 and 708 and a processing edge having a reverse capstan well 709 and a forward capstan well 710. The DCC also has a sliding metallic shutter which is normally spring-biased to cover the wells, but the shutter is omitted in FIG. 44 for simplicity to illustrate location of the wells. Other aspects of the DCC are not described as they are not relevant to the following discussion.

Preferably, the reverse capstan well 709 is used for tape extraction, and exit and entry guide posts 711 and 712 are used and actuated as in the previously described first embodiment. A rigid tape shifter arm 714 is hinged for rotation at an inner end by a tape shifter hinge 715, and has an outer end carrying a tape holder 717. A length of tape 718 extends from the well 709 to the tape holder 717 and back to the well, and passes adjacent undesignated magnetic heads, tape guides and capstan and pinch roller assemblies. Operation of the DCC embodiment is essentially identical to that of the Compact Cassette embodiment. Because a DCC compatible tape transport requires bi-directional capability, it could only be used in the second and third embodiments if the second and third embodiments are modified to also provide reverse drive capabilities. Because the second and third embodiments use only one capstan, if these embodiments were to be made DCC compatible, the capstan would have to be reversible, and this would require the capstan to "let out" the tape, or in other words, for "push-feed" mode of operation. In general, this is not the preferred mode of operation for maximum tape speed stability but the digital nature of signal processing within the DCC audio processor effectively absorbs any minor increase in tape speed fluctuations in the push feed mode, essentially making the disadvantages inherent with a "push-feed" tape transport inconsequential.

DUAL CAPSTAN DRIVE ALTERNATIVES—FIGS. 45 through 54

The first, second, third and modified embodiments as previously disclosed describe apparatus which process the magnetic tape externally to the cassette body by extracting the tape from a supply or take-up well of the cassette. This approach provides most reliable handling of the tape from within one of the cassette outer wells by avoidance of tape handling via the cassette center head well, which contains a pressure pad assembly in both the Compact Cassette and Digital Compact Cassette (DCC). However, for applications which require a dual capstan apparatus, both capstans are externally located of the cassette body, resulting in a relatively large and complex apparatus shown as in the first embodiment 31 (FIGS. 1–18). In the second and third embodiments 313, FIGS. 19–27, and 480, FIGS. 28–41 respectively, and modified versions in FIGS. 42–44, only one capstan could be accommodated in one outer well of the apparatus, because the tape is extracted from the other outer well, and thus tape speed stability was compromised in the reverse tape travel direction during play or record mode, since the capstan could only "push feed" the tape. Due to increasing modern day requirements for bi-directional capability in addition to small tape transport size, the second and third embodiments would be particularly suited for such applications if dual capstans could be implemented without significant increase in apparatus size and complexity.

Dual capstans may be implemented on the second and third embodiments while maintaining a similar apparatus size by extracting the tape from the center head well of the cassette in contrast with the earlier embodiments where the tape is extracted from one of the outer wells. To maintain reliability of the tape handling process, a number of simple modifications are made to the previously described second and third embodiments.

Figure 54:
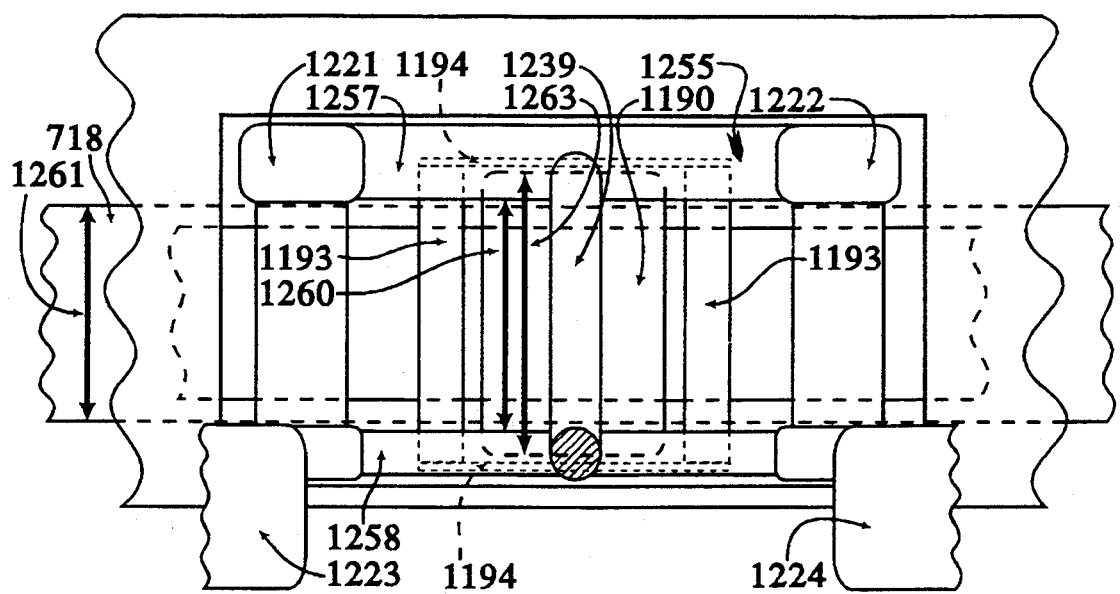
Figure 52:
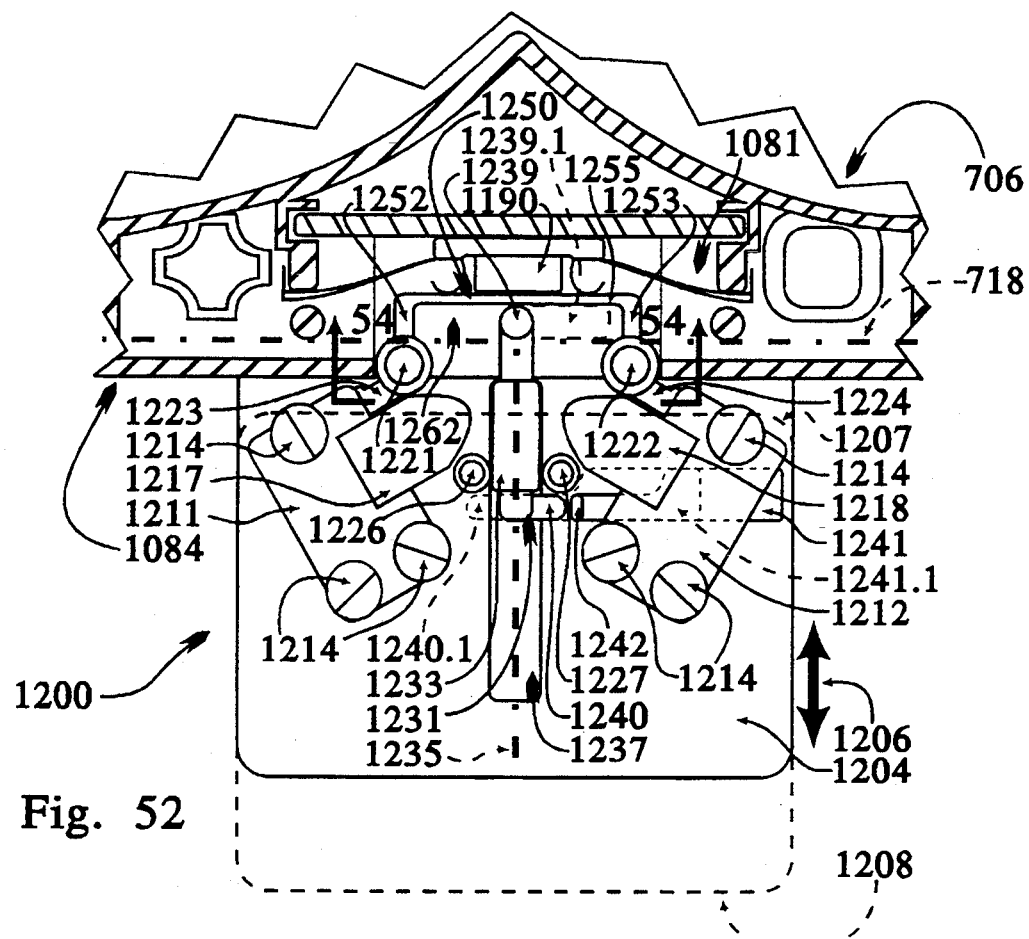
Figure 53:
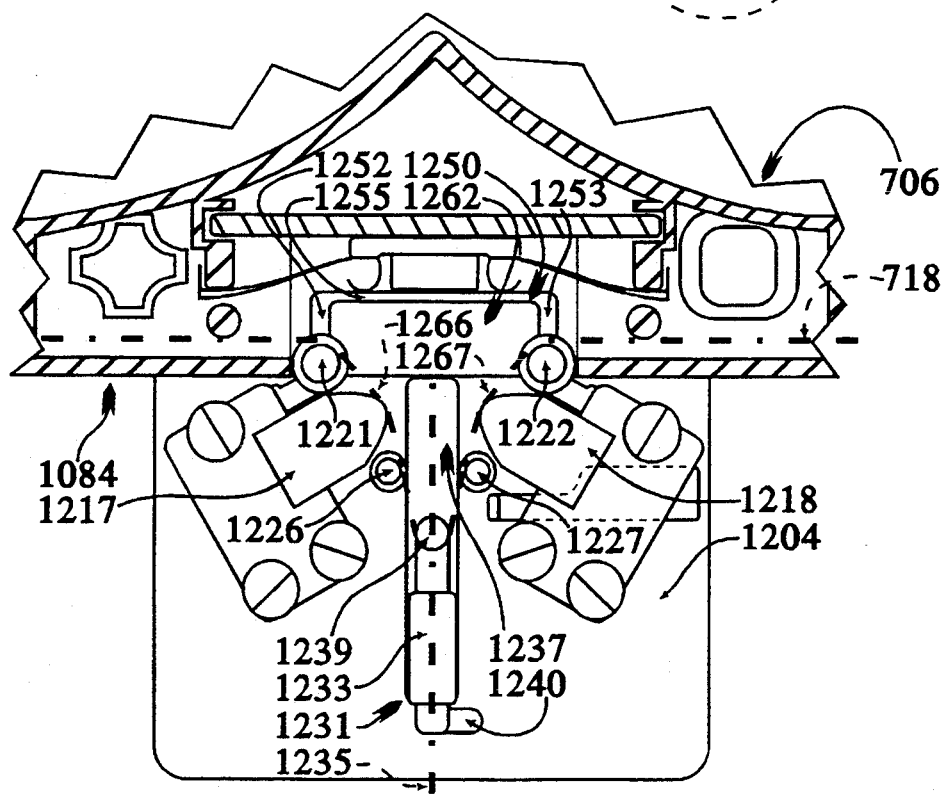

The description immediately following is related to a fourth embodiment of FIGS. 45–49 which describes apparatus modifications to the second embodiment which access the center well of a Compact Cassette, but it could easily be adapted for use to access the center well of a Digital Compact Cassette (DCC). The later descriptions relating to a fifth embodiment of FIGS. 50 and 51 (a modified third embodiment), and a sixth embodiment of FIGS. 52 through 54, are both shown and described to access a center well of a Digital Compact Cassette (DCC), and likewise these embodiments could be easily adapted to access the center well of a Compact Cassette.

Without exception, the following three embodiments can all utilize dual two capstans and are also capable of bi-directional feed without incurring problems associated with "push feed" in a reverse direction as found in some of the previously described embodiments. Because all three embodiments can also utilize essentially conventional capstan and pinch roller feeds in the supply and take-up wells, portions of the prior art designs can be used, and some of the complexities of previously described embodiments are eliminated.

Fourth Embodiment—FIGS. 45–49

A fourth embodiment 801 according to the invention bears many similarities to the previously described second embodiment 313 of FIGS. 19–27, and thus only some similarities and major differences between the two embodiments will be described in detail.

Figure 45:
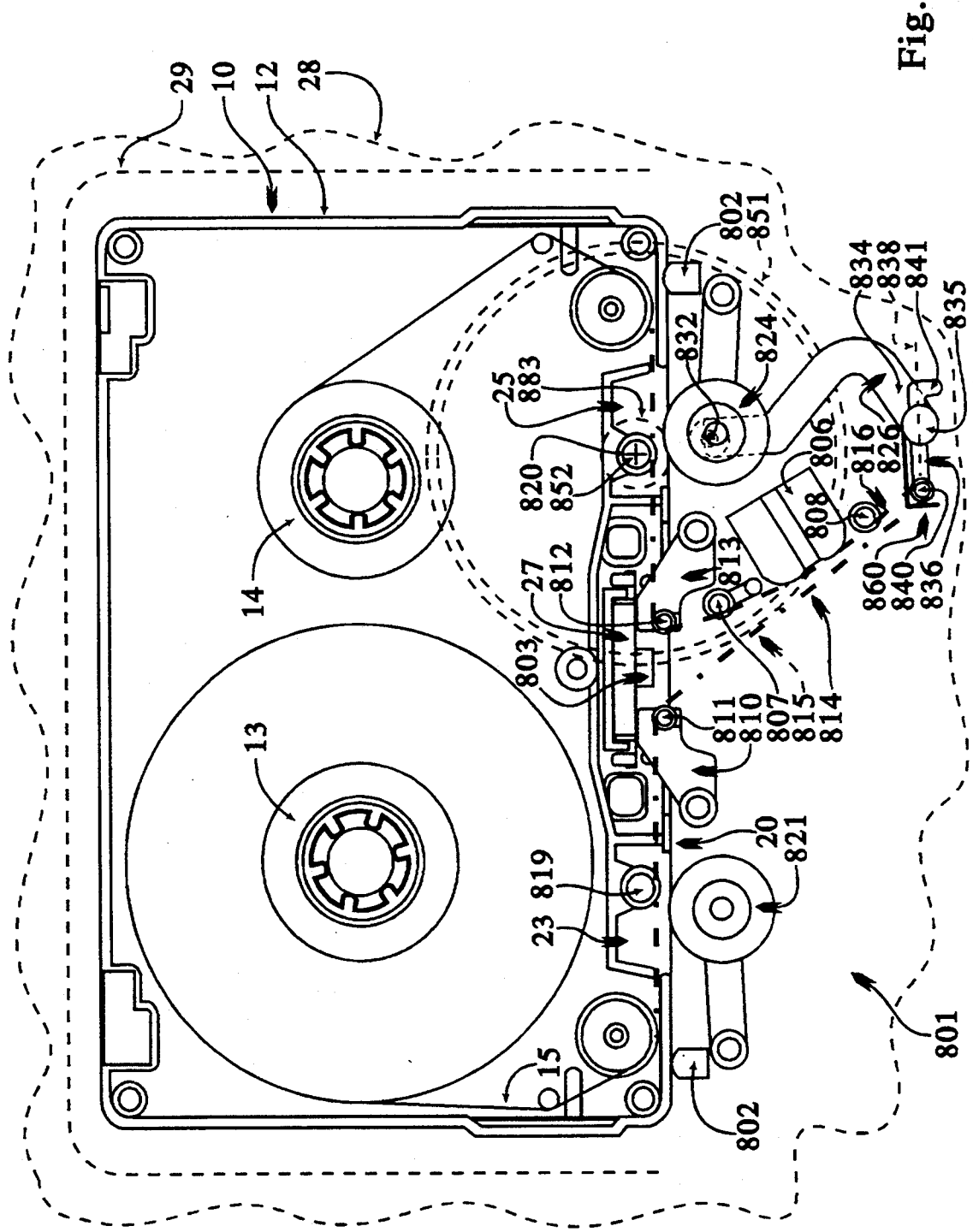
FIGS. 45 through 54 show fourth, fifth and sixth embodiments cooperating with a Compact Cassette or a Digital Compact Cassette (DCC) by using the center well thereof from which to extract the length of tape. Each of the three embodiments have an apparatus which utilizes a pressure pad lifter, and also provides dual capstan drive with uni-directional or bi-directional feed using two conventionally located capstans.

Referring mainly to FIG. 45, the processing edge portion 20 of the cassette 10 is held against spaced apart control surfaces 802, and the center well 27 in the edge portion has a pressure pad 803 which is to be described in greater detail with reference to FIG. 46. Similarly to the second embodiment, the fourth embodiment has a fixed magnetic head 806, and a rotatable tape lifter and guide 807 on one side, and fixed tape guide 808 on an opposite side. Exit and entry guide posts 811 and 812 mounted on respective guide post supports 810 and 813 are shown positioned adjacent the center well 27 and are structurally and functionally similar to the previously described exit and entry guides to prevent undesirable contact between an extracted length of tape and the cassette body. An extracted portion of tape 814 has an exit portion 815 passing around the exit guide post 811, and an entry portion 816 passing around the entry guide post 812. The supply well 23 has a capstan 819, and an associated pinch roller assembly 821 which co-operates with a length of the tape 15 passing through the supply well 23 in a conventional manner. Similarly, the take-up well 25 has a capstan 820 and a pinch roller assembly 824 associated therewith to cooperate with a length of tape passing through the take-up well 25. The pinch roller assemblies can be operated by cam means in a manner similar to those in the second and third embodiments, and for bi-directional transport, the two pinch rollers can be selectively enabled or disabled by means, not shown, similar to that shown in FIGS. 17 and 18 for the pinch roller selection in the first embodiment. Alternatively, the pinch roller assemblies can be operated conventionally as in a conventional cassette tape transport apparatus with dual capstans.

Also, similarly to the second embodiment, the fourth embodiment has a tape shifter arm 826 having an inner portion provided with a shifter hinge which mounts the shifter arm for rotation about a shifter hinge axis 832. The shifter arm has an outer portion 834 having a sleeve bearing 835 which journals a tape holder 836 for rotation about a tape holder axis 838. The tape holder 836 has outer and inner portions 840 and 841 which function similarly to the previously described portions. Thus, the outer portion 840 receives the extracted portion of tape 814 and assists in maintaining the extracted portion of tape in a fixed plane also defined by the guides 811 and 812, and 807 and 808, so as to prevent skewing of the tape. The inner portion 841 cooperates with the cam, not shown, and the tape holder is spring biased to rotate the tape holder between a retracted position (shown in FIG. 46), and the operative or extended position as shown in FIG. 45.

The apparatus includes a primary cam disk 851 mounted for rotation about a primary cam axis 852 which, for convenience of design and manufacturing, is concentric with the capstan 820 in the take-up well 25. Re-locating the primary cam disk from the previous location shown in the second embodiment to the new location as shown herein permits use of a larger cam disk than would otherwise be possible in the previous location. With suitable modification of the cam features, the exit and entry guides 811 and 812, the tape shifter 826, the tape holder 836, the tape lifter 807, the pinch roller assemblies 821 and 824 and related structure can be sequenced to move essentially identically to corresponding components in the second embodiment.

The above description outlines some of the differences and major similarities between the second and fourth embodiments resulting from extraction of the tape from the center well as opposed to from the previous supply well. In addition, the fourth embodiment includes a pressure pad lifter 860 according to the invention, which extends from the sleeve bearing 835 in a direction similar to the tape holder, so as to extend beyond the outer portion 840 of the tape holder 836 as shown. The pressure pad lifter is adapted to displace the pressure pad assembly 803 towards an inner wall of the cassette when the tape holder enters the center well 27, as will be described in greater detail with reference to FIGS. 46 through 49. Use of the pressure pad lifter is essential in this embodiment to provide additional clearance space within the center well to receive the outer portion of the tape holder 840 prior to and during extraction of the tape from the center well as will be described.

Figure 46:
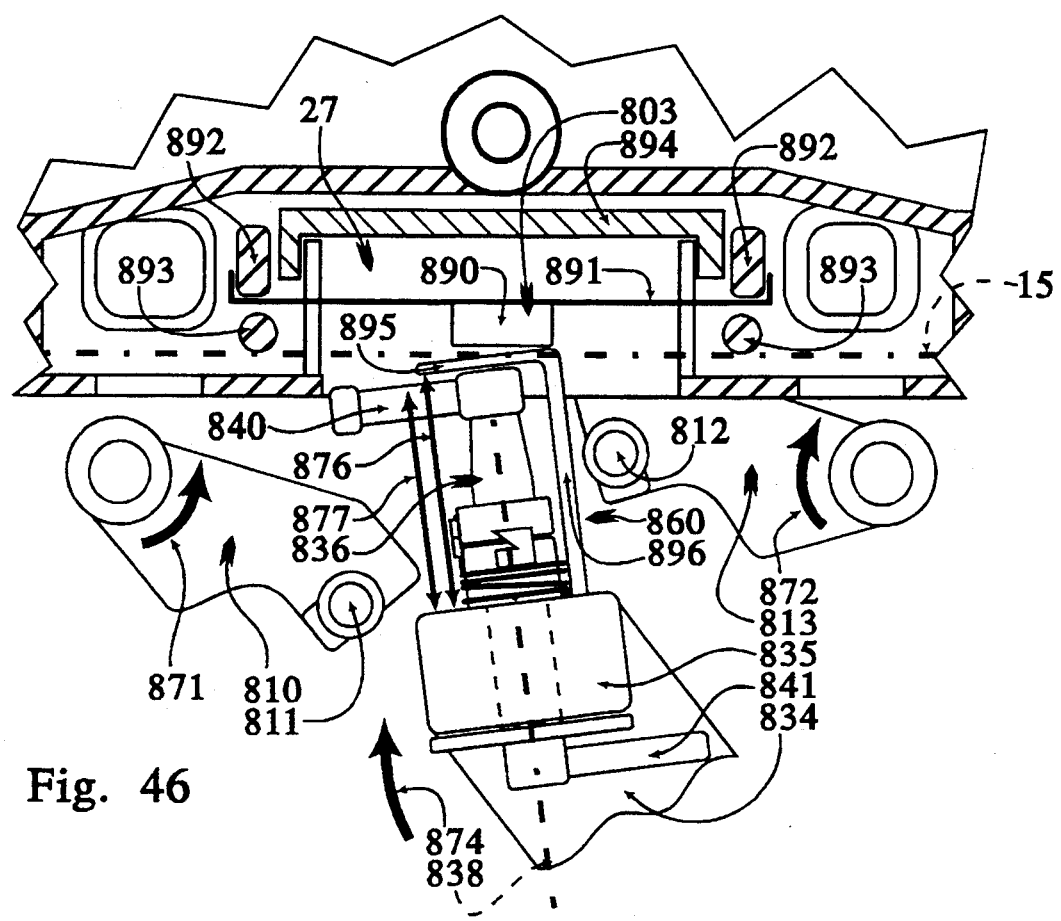

In FIG. 46, the apparatus is shown in an intermediate position prior to the outer portion 840 of the tape holder and pad lifter 860 entering the center well. In this intermediate position, the exit and entry tape guides 811 and 812 are approaching the center well to be inserted therein by rotating the exit guide post support 810 in direction of an arrow 871, and the entry guide post support 813 in direction of an arrow 872. Similarly, the tape holder 840 is entering the center well, in a retracted position, and in direction of an arrow 874, which is on an arc concentric with the shifter hinge axis 832 of FIG. 45. The pressure pad assembly 803 comprises a pressure felt pad 890 mounted on a flexible spring plate 891 which holds the pressure felt pad in a position closely adjacent the tape 15 as it extends through the center well as is well-known. The spring plate 891 has outer ends retained between anchor blocks 892 and head well guide posts 893 integral with the cassette body. In conventional Compact Cassette recording/playback apparatus, the pressure pad 890 normally applies pressure against the tape 15 and an inserted magnetic head so that tape-to-head contact is maintained during conventional tape travel. A magnetic shield 894 is located adjacent an inner wall of the well to reduce pick up of noise during playback by the inserted magnetic head.

The pad lifter 860 has a contact portion 895 adapted to contact the pressure felt pad 890, and a support portion 896 to support the contact portion in the desired orientation with respect to the tape holder. The support portion extends from the bearing 835 on the outer portion of the tape shifter in a direction generally parallel to the holder axis 838, and the contact portion extends from the support portion generally at right angles thereto. A spacing 876 between the contact portion and the outer end of the tape shifter is greater than a corresponding spacing 877 between the tape holder and the outer end of the tape shifter. The spacings 876 and 877 between the outer end of the tape shifter, i.e. the sleeve bearing 835, and both the pad lifter and the tape holder respectively are measured along, i.e. parallel to, the tape holder axis 838. This difference in spacing enables the tape holder 840 to rotate between the retracted position shown in full outline in FIG. 46 and in broken outline at 840.1 in FIG. 47, and the extended position as shown in full outline in FIGS. 45, 47, 48 and 49.

Figure 47:
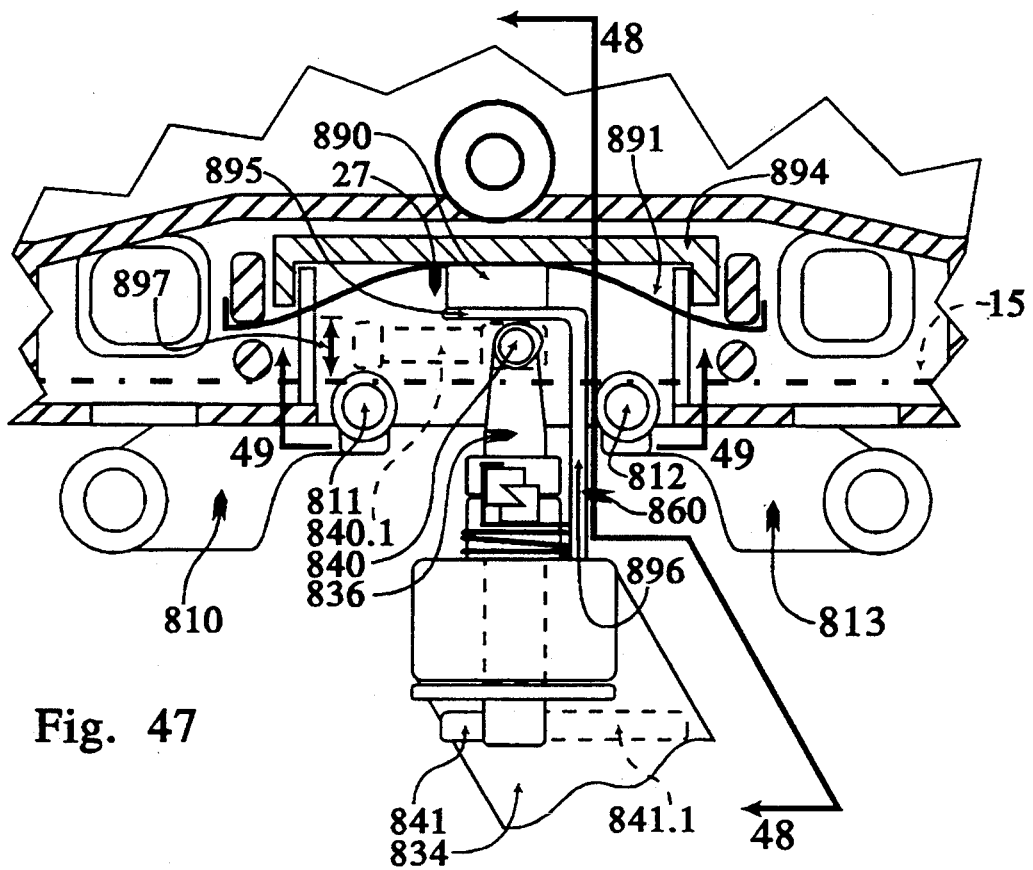

FIG. 47 shows the contact portion 895 of the pad lifter 860 in a final inserted position in which the felt pad 890 is fully displaced towards the inner wall of the well to provide a clearance space 897 between the tape and the felt pad 890, or more accurately between an inner face of the tape and an oppositely facing side of the contact portion of the pad lifter. The tape holder is shown in full outline in an extended position after rotating 90 degrees from the broken outline retracted position 840.1. The contact portion is sufficiently thin to provide the clearance space to receive the tape holder, and yet is sufficiently stiff to displace the pressure pad assembly with negligible deformation of the contact portion.

Figure 48:
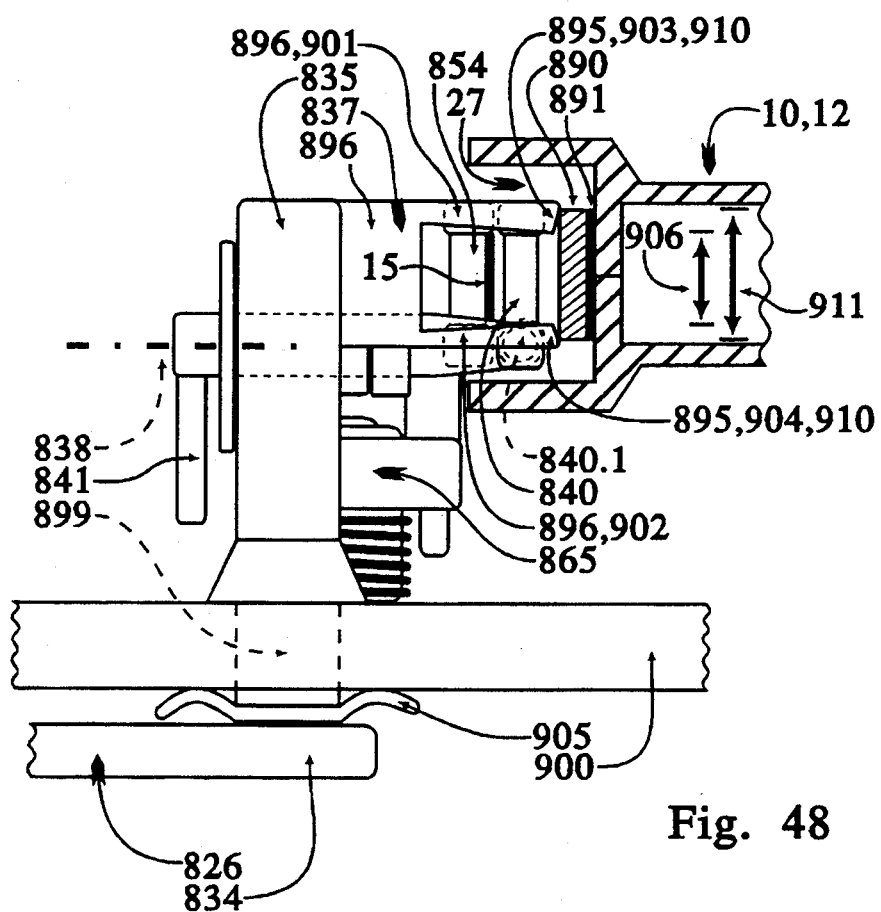
Figure 49:
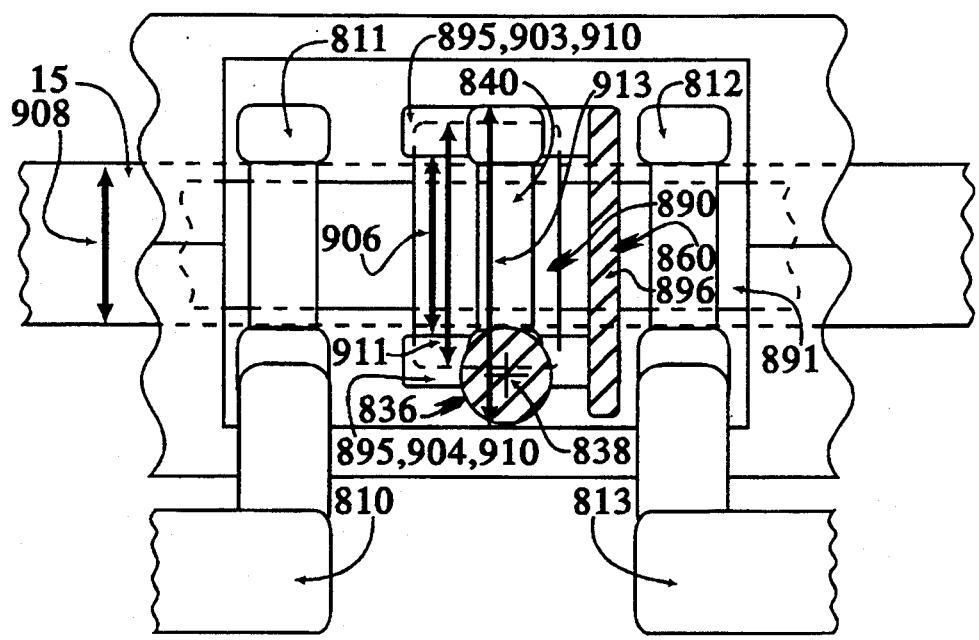

Referring to FIGS. 48 and 49, the sleeve bearing 835 adjacent the outer portion of the shifter arm has a connector portion 899, broken outline, received in a slot, not shown, in a transport chassis 900, similarly to the second embodiment. The inner end 841 of the tape holder is shown extending downwardly, which corresponds to the position when the outer end 840 of the tape holder is in the extended position as shown. Similarly to the first embodiment, a leaf spring 905 cooperates with the tape shifter and extends between the chassis 900 and the outer portion 834 of the shifter arm. The support portion 896 of the pad lifter resembles a fork tape guide and has a pair of legs 901 and 902 which extend generally parallel to the tape holder axis 838, outer ends of the legs being connected to the contact portion. The contact portion 895 has a similar pair of arms 903 and 904 which extend generally normally to the tape holder axis 838, (see FIG. 46) and have oppositely facing inner edges which are spaced apart at an outer end width 906 which is greater than width 908 of the tape. Thus, the arms accept the tape passing therebetween without interference with edges of the tape. As is well-known, the pressure felt pad 890 has a width 911 which is greater than width 908 of the tape to provide a margin of pad on either side of the tape. The legs 901 and 902 have inner edges which converge towards each other as the legs extend axially from the bearing 835 to increase width of the arms 903 and 904 of the contact portion, so as to increase the area of the contact portion that can contact edges of the pressure pad, thus increasing tolerance to variations in manufacturing accuracy.

In addition, the arms 903 and 904 of the contact portion have obliquely inclined end faces or pad contact surfaces 910 which are adapted to contact opposite edges or margins of the felt pad 890 so as to generate a self-centering force on the pad so that the pad is embraced generally equally by the respective arms as the pad is pushed towards a rear wall of the center well. Clearly, the width 906 between the inner edges of the arms is less than the width 911 of the pressure felt pad 890.

As best seen in FIG. 49, the outer portion 840 or guide portion of the tape holder 836 receives a portion of tape about to be extracted, and has a length 913 which is greater than the width or spacing 906 between the oppositely facing inner edges of the adjacent arms 903 and 904, or spacing between inner edges of the adjacent legs 901 and 902 of the pad lifter. Thus, when the tape holder carries the tape, it has sufficient length so that the arms of the contact portion and/or the legs of the support portion extend adjacent to the tape holder and are disposed perpendicularly thereto, so as to assist in holding of the tape on the tape holder.

Operation of the Fourth Embodiment

In operation, the sequence of operations of the components in the fourth embodiment 801 that are common to those of the second embodiment are unchanged. Similarly to the second embodiment, all operations are controlled by the central processor and/or by the cam disk 851 and, because there is essentially no movement between the pad lifter 860 and tape shifter 826, the pad lifter follows all movements of the tape shifter. Thus, apart from providing sufficient clearance for the pad lifter to follow rotation of the tape shifter between the fully extended and fully retracted positions, no additional changes to the structure are required. However, in the sequence of operations, there are additional process or method steps which occur while the tape holder is entering and leaving the center well as will be described.

Similarly to operation of the second embodiment, automatic slack take-up is activated to eliminate any tape slack and apply a low back tension to the tape so that the tape extends in an essentially straight line across the center well and the pressure pad. This slack take-up is particularly necessary with the fourth, fifth and sixth embodiments so that the tape assumes a relatively symmetrical position passing across the pressure pad, so as to reduce the chance of an edge of the tape being unintentionally trapped between the contact portion 895 and the pressure felt pad 890. The relative dimensions and accurate positions of the taut tape 15, the felt pad 890, and the arms 903 and 904 of the contact portion are sufficient to ensure that the contact portions of the pad lifter contact the pressure pad adjacent opposite side edges or margins of the pressure pad at positions spaced outwardly from edges of the tape extending across the pad. Clearly, unintentional trapping of the tape between the contact portion and the pressure pad could cause the tape holder to fail to contact the tape, but the obliquely inclined pad contact surfaces 910 reduce chances of this happening.

The inner portion of the tape shifter is moved in a first direction, i.e. clockwise, so as to position the tape holder adjacent the cassette well. This is followed by further rotation of the tape shifter in the first direction which moves the pad lifter 860 into the well to contact the felt pad 890. The pressure pad assembly 803 is moved further into the cassette well so as to provide the clearance space 897 between the inside face of the tape extending across the center well, and the contact portion or pressure pad. Because the tape holder moves into the cassette well at essentially the same time as the pad lifter, or very shortly thereafter, as before, the operation includes passing the tape holder in a retracted position into the well between an edge of the tape and an oppositely facing portion of the well of the cassette body. In this way, the tape holder is then located adjacent the clearance space 897 between the tape and the pad lifter. Similarly to the previously described embodiments, the tape holder is then rotated about the holder axis 838 so as to extend and position the tape holder in the clearance space 897 between the contact portion and the inside face of the tape.

As in the previous embodiment, prior to drawing the tape from the cassette well, the exit and entry guide posts 811 and 812 are positioned into the well adjacent outer portions of the well to prevent the exit and entry portions of the tape from undesirable contact with portions of the cassette body defining the well. This is followed by moving the inner portion of the tape shifter in a second direction opposite to the first direction, i.e. anti-clockwise, so that the tape holder draws the extracted length of tape from the well of the cassette body for processing. As the tape holder moves outwardly from the center well, the pad lifter moves away from the pressure pad assembly 803 and resilience in the spring plate 891 moves the pressure felt pad 890 outwardly to assume its former position before contact by the pad lifter. This aspect of the operation is also different from the previously described operation of the second embodiment. As the tape holder rotates about the tape shifter hinge axis 832, motion of the tape holder is similar to the previously described embodiment, and is followed by the pad lifter. The tape shifter guides the initial movement of the tape holder so as to be generally perpendicular to a processing edge of the cassette, that is while the tape holder is immediately adjacent the center well, during entry into the well, or exit from the well, and the movement is essentially generally perpendicular to the processing edge.

As the tape shifter rotates in the second direction and starts to draw the extracted length of tape from the center well, the spacing between the arms of the contact portion and the legs of the support portion assist in maintaining the tape positioned on the outer portion 840 of the tape holder due to passing the tape between the arms and legs of the pad lifter.

Similarly to the previously described second embodiment, the tape shifter locates the tape holder in the final operative position for processing the tape (see FIG. 45) so that most of the extracted length of the tape is non-perpendicular i.e. inclined obliquely, to the processing edge of the cassette, thus resulting in a relatively compact unit where there is sufficient length of extracted portion of tape to fit a conventional magnetic head, with guides on opposite sides of the head to ensure accurate tracking of the tape across the head with good azimuth control and negligible skewing of the tape.

Figure 50:
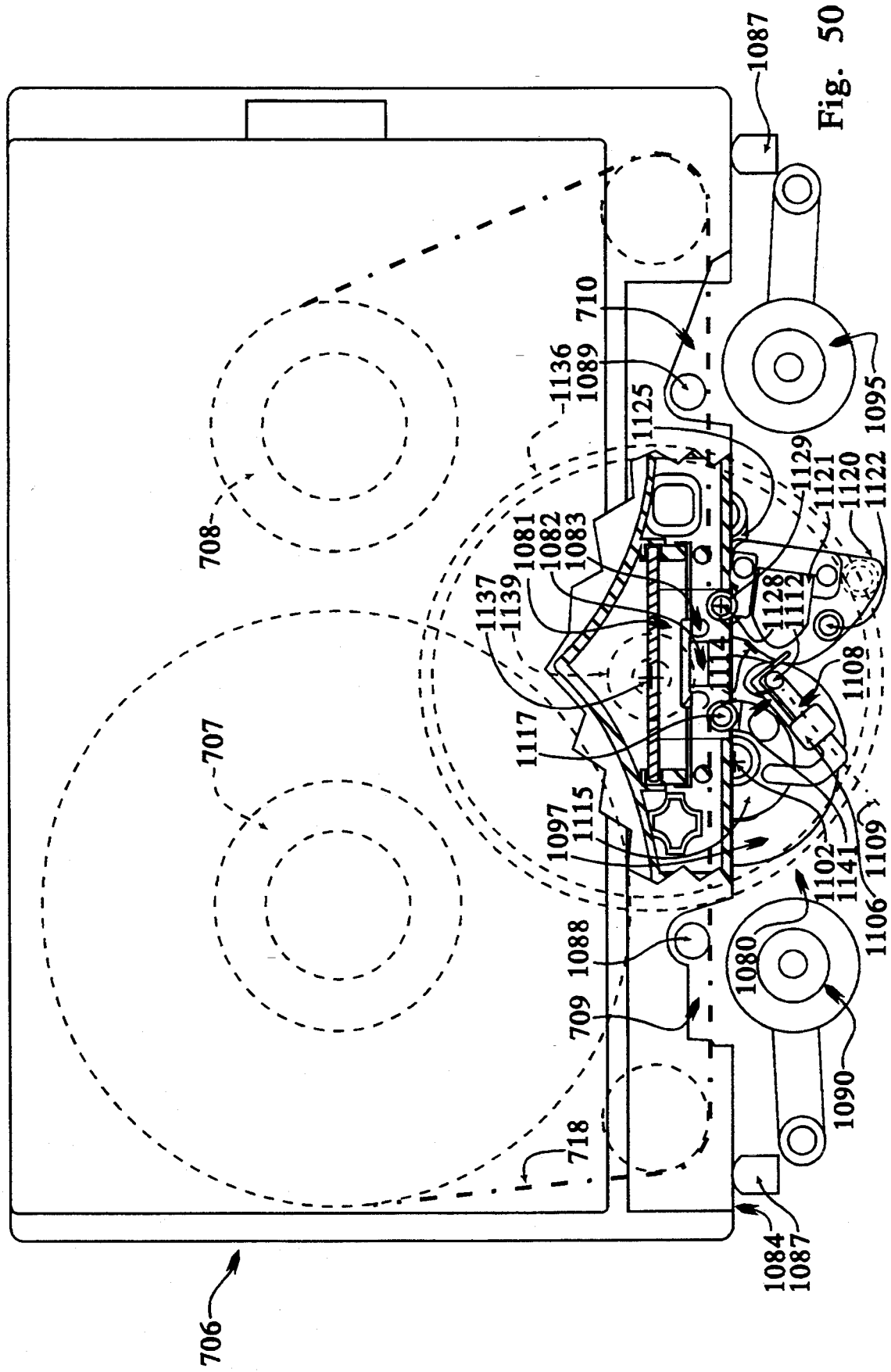
Figure 51:
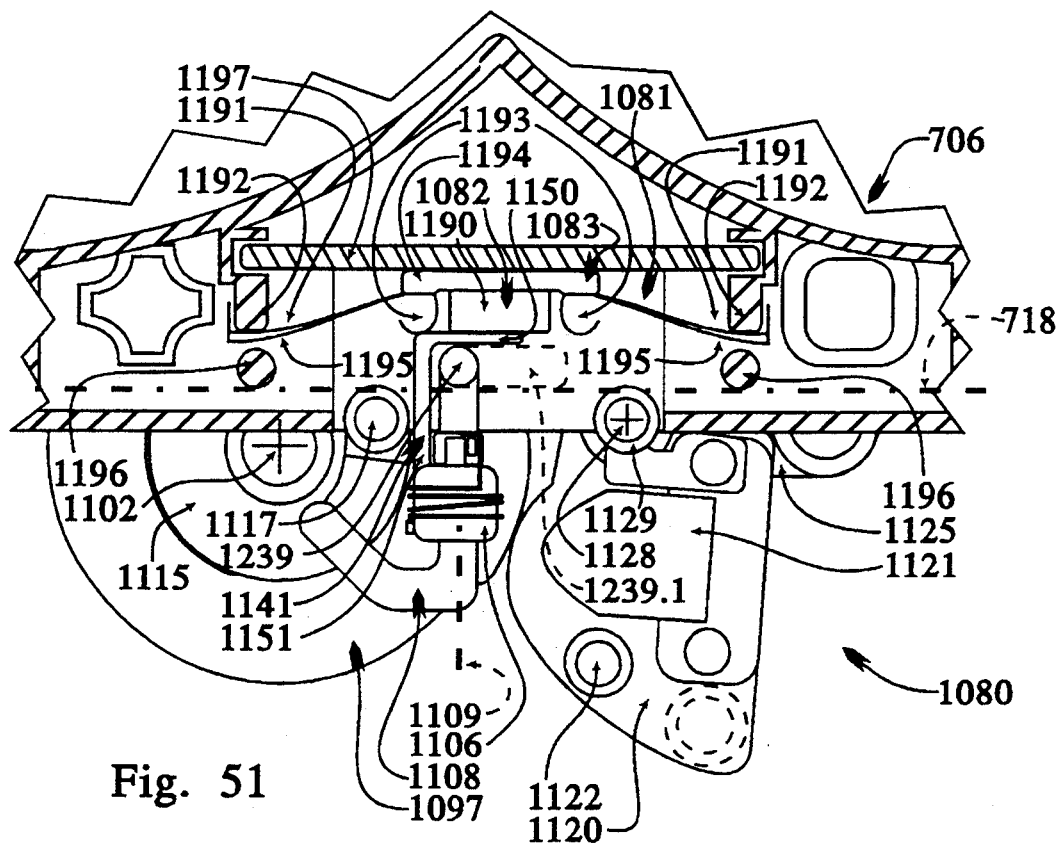

Fifth Embodiment—FIGS. 50 and 51

Figure 44:
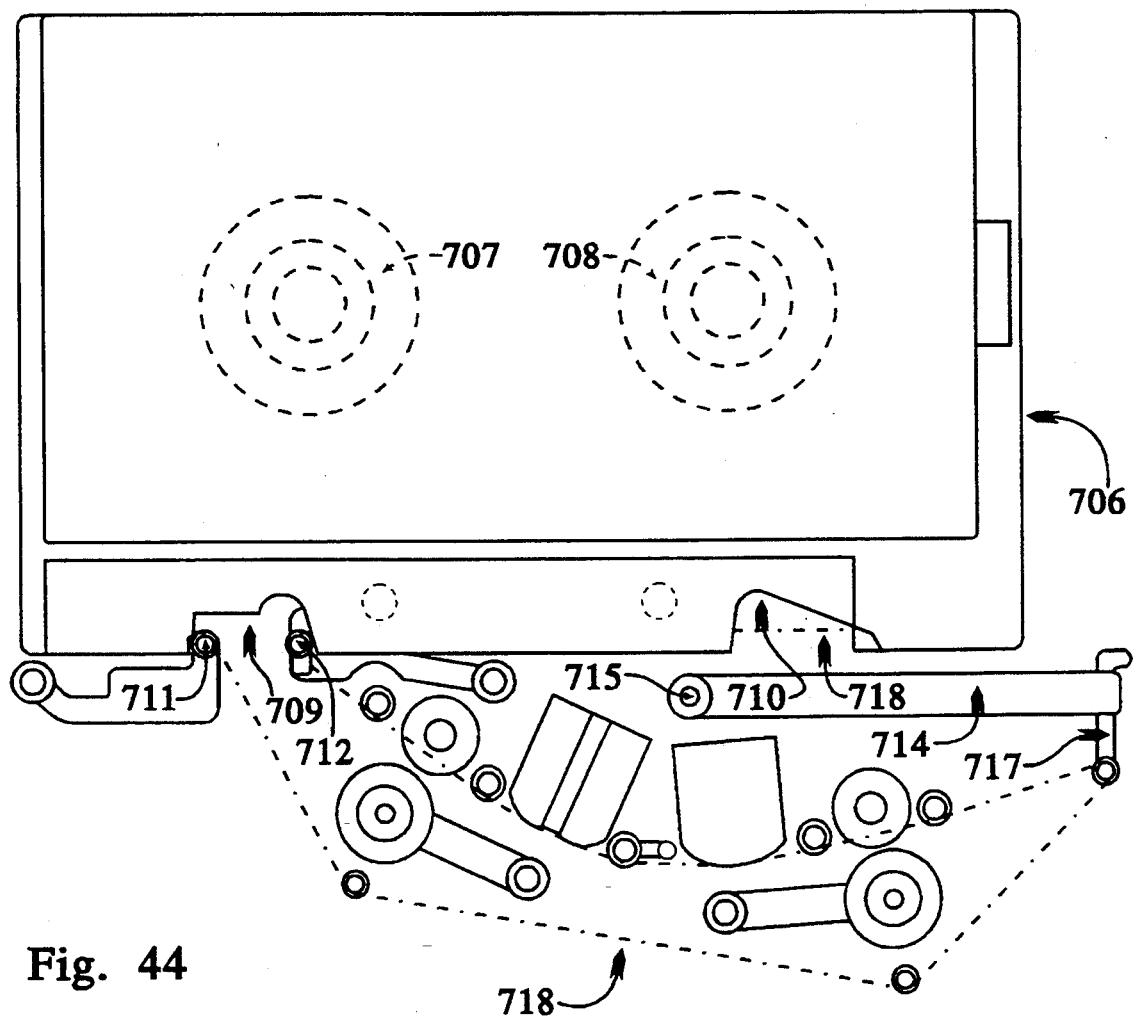

The Digital Compact Cassette (DCC) 706, previously described with reference to FIG. 44, is shown in FIG. 50 cooperating with a fifth embodiment 1080 of the invention, which is a modified version of the third embodiment 480 of FIGS. 28 through 41. The DCC 706 has a center well 1081 disposed between the reverse or supply capstan well 709 and the forward or take-up well 710 in a processing edge 1084 of the DCC. The center well has a pressure pad assembly 1082 which cooperates with an azimuth locking pin assembly 1083 to be described. The DCC is located accurately by a resilient force holding the processing edge 1084 against a pair of spaced apart control surfaces 1087 similar to the control surfaces used for locating the Compact Cassette. The reverse or supply capstan well 709 has a capstan 1088, and the forward or take-up well 710 has a capstan 1089, the capstans cooperating with pinch roller assemblies 1090 and 1095 respectively so as to transport the tape in reverse or forward directions respectively as is common practice with a DCC apparatus. Similarly to the fourth embodiment, the pinch roller assemblies 1090 and 1095 can be operated by cam means as previously described with reference to the second and third embodiments, with enabling and disabling means if required as shown in the first embodiment. Alternatively, conventional dual capstan drive means can be used.

The fifth embodiment 1080 bears many similarities to the third embodiment including a tape shifter disk 1097 which is mounted for rotation about a shifter hinge axis 1102. The tape shifter disk 1097 carries a sleeve bearing 1106 which mounts a tape holder 1108 for rotation about a tape holder axis 1109. The tape holder has an outer portion 1112 which engages a length of extracted tape 1114 extending across the center well and draws the tape to an extracted stop/pause position as shown in FIG. 50.

The shifter disk 1097 is concentric with an inner disk 1115 which has undesignated cam means to cooperate with the tape holder 1108 for shifting the tape holder between retracted and extended positions as previously described with reference to the third embodiment. Similarly, the inner disk carries an exit guide post 1117 which is moved from a retracted position when the cassette is installed, to an extended position inside the center well where it prevents undesirable contact between the extracted portion of the tape and the cassette body.

The fifth embodiment also has a head plate 1120 which carries a magnetic head 1121 and tape guide 1122 which assists in positioning the tape for accurate tracking across the head when in the playback position. The head plate is carried on a head support arm 1125 and is journalled for rotation about a head axis 1128 which is concentric with an entry guide post 1129. The entry guide post similarly is movable between a retracted position (not shown), and an extended position within the well (as shown) to prevent undesirable contact between the extracted length of tape and the cassette body. Similarly to the third embodiment, the fifth embodiment has a primary cam disk 1136 with cam features which control movement of the disks 1097 and 1115 and the head plate 1120 as previously described. The cam disk is rotatable about a primary cam axis 1137 of a cam disk journal 1139, broken outline, which is re-positioned below the center well of the cassette.

The description above relating to the tape shifter disk, the tape holder 1108, the inner disk 1115, the head plate 1120, the cam disk 1136 and tape guides is generally similar to that as described with reference to the third embodiment and thus further detailed description is not required.

Similarly to the fourth embodiment, the fifth embodiment has a pressure pad lifter 1141 which is mounted on the sleeve bearing 1106 and positioned with respect to the tape holder 1108 in a manner very similar to that as shown for the fourth embodiment 801, and is described in greater detail with reference to FIG. 51 as follows. The pressure pad lifter 1141 has a contact portion 1150 and a support portion 1151 which are generally similar to the contact and support portions 895 and 896 of the fourth embodiment. Thus, the support portion 1151 has a pair of legs, not shown, extending generally parallel to the tape holder axis, outer ends of the legs being connected to arms, not shown, of the contact portion 1150. All other structure of the pad lifter 1141 and its cooperation with the tape holder 1108 and the sleeve bearing 1106 are generally similar to corresponding structure in the fourth embodiment and is not described herein.

In FIG. 51 the pressure pad assembly 1082 has a pressure felt pad 1190 carried on a pressure pad spring plate 1191. The spring plate extends between a pair of pressure pad anchors 1192 adjacent a rear wall of the center well. The azimuth locking pin assembly 1083 has azimuth locking pins 1193 positioned on opposite sides of the felt pad 1190 and carried on an azimuth locking pin mounting bridge 1194. The mounting bridge 1194 is a portion of an azimuth locking pin assembly spring plate 1195 which is similarly mounted on the pressure pad anchors 1192 and, together with the pressure pad spring plate 1191 retained there against by adjacent head well guide post 1196. A magnetic shield 1197 extends adjacent an inner wall of the center well to reduce pick-up of noise during playback by the inserted magnetic head.

In some types of Digital Compact Cassettes (DCC), the azimuth locking pins 1193 can extend further from the spring plate than an outer face of the felt pad 1190, and thus one or possibly two pins are first contacted by the contact portion 1150 of the pressure pad lifter as the pressure pad lifter and tape holder enter the center well as shown in FIG. 51. Thus, it is not necessary for the contact portion 1150 to contact the felt pad itself, but instead it can first make contact with one or both of the azimuth locking pins depending on relative sizes. Because the azimuth locking pin assembly spring plate, the azimuth locking pin mounting bridge and the pressure pad spring plate are in close contact with each other, inwards movement of one or both pins causes the pressure pad to move inwardly without direct contact with the contact portion. Hereinafter and in the claims, where the contact portion of the pad lifter is referred to as contacting the pressure pad assembly, it is understood that, in a Digital Compact Cassette (DCC), the azimuth locking pin assembly and the pressure pad assembly together constitute the pressure pad assembly, and it is immaterial whether the pressure pad assembly is directly contacted by the pad lifter, or is contacted through the azimuth locking pin assembly.

Operation of the Fifth Embodiment

Operation of the fifth embodiment follows closely that of the third embodiment with respect to relative movements between the tape shifter disk, the tape holder, and the magnetic head assembly. Operation with respect to the pressure pad lifter follows closely that of the fourth embodiment and thus further detailed disclosure is not required.

Sixth Embodiment—FIGS. 52 through 54

In the previously described five embodiments and minor variations thereof, the inner portion of the tape shifter is mounted for rotation about a tape shifter hinge axis, which results in a corresponding guided movement of the outer portion of the tape shifter and tape holder. While rotating the inner portion of the tape shifter has many advantages, an alternative linear movement of the inner portion of the tape shifter can be substituted, which provides a corresponding linear movement of the tape holder. To facilitate extraction of the tape from the cassette well, the linear motion is preferably perpendicular to the processing edge of the cassette, and thus the actual motion of the tape holder of the sixth embodiment into and out from the cassette well resembles, to some extent, the linear motion of the previously described tape holders immediately adjacent the cassette well, i.e. when moving into and out from the cassette well. This generally perpendicular movement of the previously described tape holders is due to moving the tape holders along paths having sufficiently large radii, and location of particular portions of the paths with respect to the processing edge of the cassette.

In addition, some of the previous embodiments have at least one fixed magnetic head and at least two fixed guides associated with the respective head, thus simplifying tape alignment and reducing azimuth misalignment problems. In contrast, the third embodiment of FIGS. 28 through 41, and the fifth embodiment of FIGS. 50 and 51 disclose a rotating magnetic head and at least one guide which rotates therewith. The modified third embodiment of FIG. 42 discloses an obliquely linear moving magnetic head with associated tape guides moving therewith.

A sixth embodiment 1200 bears some resemblance to the previously described third and fifth embodiments having movable heads, and is shown cooperating with the Digital Compact Cassette (DCC) 706. As with the previously described embodiments, the various components of the sixth embodiment are actuated by a cam disk, not shown, so as to function equivalently to the previously described components. The sixth embodiment of the invention 1200 has a head plate 1204 mounted for movement in directions of an arrow 1206 which is generally perpendicular to the processing edge 1084 of the Digital Compact Cassette (DCC). The head plate is actuated and guided linearly using known means, for example, cam actuation as previously described, or, in certain circumstances, solenoid or spring actuation, or manual mechanical displacement through control buttons etc. The head plate is shown in a fully extended or operative position in full outline in FIGS. 52 and 53, and in FIG. 52, front and rear edges 1207 and 1208 of the plate 1204 are shown in broken outline in a fully retracted position. The head plate 1204 carries first and second head subplates 1211 and 1212 which are each secured to the head plate by three head support screws 1214 and mount first and second magnetic heads 1217 and 1218 respectively. Some or all of the screws also permit adjustment of alignment of the first and second magnetic heads 1217 and 1218 with respect to the headplate.

The sixth embodiment also includes exit and entry guide posts 1221 and 1222 which are mounted on respective guide post supports 1223 and 1224 which in turn are secured to the head plate 1204 for movement therewith. The guide post supports 1223 and 1224 cantilever the respective guide posts and space them from the head plate to permit entry of the guide posts into the center well of the cassette, in a manner similar to location of the entry guide post support of the third embodiment. First and second fixed tape guides 1226 and 1227 are mounted on the plate 1204 adjacent outer sides of the first and second heads respectively remote from the exit and entry tape guides, so that the guide on each side of each magnetic head provides guidance for the tape.

The sixth embodiment also includes a tape holder 1231 mounted within a sleeve bearing 1233 for rotation about a tape holder axis 1235. The sleeve bearing extends through a clearance slot 1237 extending generally perpendicularly to the processing edge 1084 of the cassette and having a central axis disposed within a plane containing the tape holder axis. The sleeve bearing 1233 also serves as a tape shifter and a lower portion of the bearing passing through the slot 1237 below the head plate cooperates with tape shifter moving means (not shown) to provide movement along the tape holder axis 1235, so as to move the tape holder perpendicularly with respect to the processing edge 1084 for the whole travel of the tape holder. The tape shifter moving means can be a cam follower extending downwardly from a lower surface of the sleeve bearing to engage the cam disk.

The tape holder 1231 has an outer portion 1239 adapted to cooperate with the tape, and an inner portion 1240 which cooperates with a cam lobe 1242 of a tape holder cam plate 1241 to control orientation of the tape holder with respect to the sleeve bearing. The cam plate 1241 and the cam lobe 1242 are functionally equivalent to the sliding cam plate 126 and cam lobe 140 as shown in FIG. 10 with reference to the description of the first embodiment. Similarly to the cam plate 126 of the first embodiment, the cam plate 1241 is restrained to movement generally parallel to the processing edge of the cassette, that is normal to the axis 1235. Also similarly to the first embodiment, a cam follower, not shown, extends downwardly through a clearance slot, not shown, on the head plate 1204 to cooperate with the cam disk. Similarly to the previously described embodiments, spring means, not shown, are provided to spring bias the tape holder to an extended position as shown in FIGS. 52 through 54. Thus, when the inner portion 1240 is free of the cam lobe 1242, the tape holder is held against a stop and assumes the extended position as shown. From the above, it can be seen that the cooperation between the tape holder 1231 and cam plate 1241 is very similar to the cooperation between the tape holder and sliding cam plate of the first and thus the second embodiment.

The sixth embodiment 1200 also includes a pressure pad lifter 1250 which extends between the exit and entry guide posts 1221 and 1222. The pressure pad lifter includes exit and entry support portions 1252 and 1253 extending from the entry and exit guide posts in a direction generally parallel to the tape holder axis 1235. The pad lifter also includes a contact portion 1255 extending between the support portions 1252 and 1253 in a direction generally perpendicular to the tape holder axis so as to form the bridge as shown in FIGS. 52 and 53. As best seen in FIG. 54, the contact portion 1255 has a pair of arms 1257 and 1258 which have oppositely facing inner edges spaced apart by a spacing 1260 which is wider than width 1261 of the tape 718 (broken outline), and narrower than width 1263 of the pressure felt pad 1190 (broken outline) or length of the azimuth locking pins 1193 spaced on opposite sides of the pressure felt pad. Similarly to the fifth embodiment, the arms 1257 and 1258 can either contact ends of the azimuth locking pins or the pressure felt pad depending on relative dimensions of the pad and pins, which are determined by the specific design of the cassette. Similarly to the arms of the contact portion of the fourth and fifth embodiment, the end faces of the arms 1257 and 1258 of the contact surface can be inclined inwardly so as to generate a self-centering force between the pressure pad assembly and the pad lifter, thus ensuring a linear displacement of the pressure pad assembly within the center well.

For insertion and removal of the tape cassette, the head plate and structure mounted thereon are moved to the retracted position (edges of the head plate only being shown), in which the exit and entry tape guides, the tape holder and the pad lifter are positioned fully clear of the center well of the cassette.

Operation of the Sixth Embodiment

In operation, the cassette is inserted in the cassette receiving compartment, and the head plate is moved from the retracted position to the fully extended position in which the pressure pad lifter, tape holder and exit and entry tape guides enter the center well of the cassette. The contact portion of the pad lifter contacts the azimuth locking pins 1193 or the felt pad 1190 which are moved inwardly into the cassette well, so that the pressure pad assembly moves inwardly "en masse" so as to provide a clearance space 1262 between an inner face of the tape and the pressure pad 1190 or contact portion 1255. Preferably, the sleeve bearing 1233, which as previously described serves as the tape shifter, is coupled for concurrent movement with the head plate, so as to move the tape holder towards the cassette well. The outer portion 1239 of the tape holder is in a retracted position 1239.1 in FIG. 52, and is preferably spaced closely from the contact portion of the pad lifter, and follows the pad lifter into the cassette well between the edge of the tape and the cassette body so as to be adjacent the clearance space 1262 between the tape and the pressure pad. Alternatively, the tape holder could enter the cassette well as a separate movement and shortly after the contact portion has displaced the pressure pad but this would require a separate sequencing step. With either arrangement, once the outer portion of the tape holder 1239 is located within the space 1262 and is clear of the inner face of the tape, the tape holder can rotate about the axis 1235 to attain the extended position as shown in FIGS. 52 through 54.

The bearing 1233 then moves linearly and perpendicularly away from the processing edge of the cassette to assume the fully extended position shown in FIG. 53, concurrently drawing an extracted portion of tape from the center well. The head plate remains in the extended position, so that the exit and entry tape guides prevent inadvertent contact between the extracted portion of the tape and edges of the cassette well. Thus, there is a provision for discrete or separate movement of the sleeve bearing and head plate, so that the tape shifter can move in a second direction outwardly from the cassette well to permit the extraction of the tape while maintaining the pressure pad displaced within the center well. Clearly, once the outer portion of the tape holder has moved from the cassette well, there is no requirement that the pressure pad assembly remain depressed. However, because the pressure pad assembly is directly connected to the exit and entry tape guides, which guides must remain in the center well while the tape is extracted, clearly the pressure pad is held depressed during processing of the tape. The extracted portion of tape has an exit portion 1266 passing from the exit guide post 1221, past the first magnetic head 1217, past the fixed tape guide 1226 around the outer portion 1239 of the tape holder, and an entry portion 1267 passing in a similar manner past the fixed tape guide 1227, the second magnetic head 1218 and entry guide 1222 back into the center well.

As seen in FIG. 53, the tape holder and sleeve bearing means serve as means for positioning the tape holder in a final operative position thereof, in which most of the extracted length of tape extending from the cassette well, that is the portions 1266 and 1267, is inclined non-perpendicularly to the processing edge 1084 of the cassette. As in the previously described embodiments, the contact portion of the heads 1217 and 1218 project beyond a line extending between the exit guide post 1221 and fixed guide 1226, or the entry guide post 1222 and the fixed guide 1227, so as to ensure an arcuate wrap of the head by the tape as it extends from the cassette center well to the tape holder in the final operative position. As in all the previous embodiments, when contacting the tape all tape guides are parallel to axes of the cassette reels, and if shoulders are provided on the tape guides, the shoulders are disposed within parallel respective planes containing edges of the tape. In this way the extracted portion of tape is not skewed as it leaves and re-enters the cassette, thus minimizing tape stresses.

In the sixth embodiment, it can be seen that the sleeve bearing serving as the tape shifter, and the tape holder are both mounted for linear movement in a direction generally perpendicular to the processing edge 1084 of the cassette along the holder axis 1235. Similarly, the exit and entry guide posts 1221 and 1222 and at least one magnetic head are mounted for the same linear movement in the same direction generally perpendicular to the processing edge. As the pad lifter 1250 is mounted directly on the exit and entry tape guide posts, the pad lifter is similarly mounted for linear movement in the same direction. Clearly, all such movement of the guides is between the two planes containing the faces of the cassette body.

While the pad lifter is shown cooperating with both the exit and entry tape guides for linear movement therewith inwardly into and outwardly from the well of the cassette, the pad lifter could be mounted to extend from one of the tape guides. Alternatively, the tape lifter could be mounted to extend from other structure associated with the moving headplate. Alternatively, in a manner similar to the fourth and fifth embodiments, the pad lifter could be mounted on the sleeve bearing 1233 for linear movement with the sleeve bearing and, if mounted in this manner, clearly the pad lifter would move outwardly from the center well concurrently with outward movement of the tape holder, which would permit the pressure pad to resume its normal position within the cassette well during processing of the tape externally of the well. In this alternative, the contact portion of the pad lifter is mounted on a support portion extending from the sleeve bearing which would have leg portions spaced apart to receive the tape therebetween in a manner similar to the previously described fourth and fifth embodiments. Because the tape holder in the linear moving sixth embodiment does not rotate about a shifter hinge axis as previously described, less clearance is required for the pad lifter externally of the cassette than in the previous embodiments, and this may reduce size of the apparatus. Nevertheless, spaced apart legs of the support portion would be spaced closely to the outer portion of the tape holder and would serve to maintain the tape on the tape holder during extraction of the tape, in a manner similar to the previously described embodiments.

In all embodiments it can be seen that the tape shifter has inter-connected inner and outer portions, with the inner portion being movable to effect movement of the outer portion. Also, in the fourth, fifth and sixth embodiments, the pad lifter is movable into the well to displace the pressure pad in the well from an inside face portion of the tape in the well to provide the clearance space between the inside face of the tape and the pressure pad, permitting room for the tape holder to rotate as required.

The linear moving sixth embodiment could also be used to access the tape in either of the outer wells of the Compact Cassette or the DCC. In this alternative, because the outer wells do not contain pressure pads, the pad lifter could be eliminated as it would not be required.

I claim:

1. A tape processing apparatus for a data bearing tape cassette having a center well in a processing edge thereof to provide access to the tape, and a pressure pad within the well, the apparatus comprising:
   (a) a cassette body holding means for holding the cassette,
   (b) a tape shifter having inner and outer portions, the inner portion being movable to effect movement of the outer portion,
   (c) a tape holder mounted on the outer portion of the tape shifter, the tape holder being rotatable with respect to the tape shifter about a holder axis disposed normally to axes of rotation of cassette reels of the tape cassette,
   (d) tape shifter moving means for moving the inner portion of the tape shifter so as to move the tape holder towards or away from the well,
   (e) a pad lifter, and a pad lifter mounting and moving means for mounting and moving the pad lifter into the well to displace the pressure pad inwardly into the well from an inside face of a portion of the tape in the well to provide a clearance space between the inside face of the tape and the pad lifter of a size sufficient to receive the tape holder, (f) tape holder rotating means for rotating the tape holder about the holder axis after entering the well of the cassette and after the pressure pad is displaced by the pad lifter, so as to position the tape holder in the clearance space between the inside face of the tape and the pad lifter to permit subsequent extraction of the said tape portion, and (g) a movable tape guide means to contact the tape at at least a single location, and means for mounting and moving said tape guide means into the well of the cassette to contact an outside face of the tape at at least the said single locations and to remain in the well while the tape is extracted, the tape guide means being adapted to hold at least a single portion of tape which is displaced outwardly from a normal position of the tape in the cassette to be clear of the cassette to prevent undesirable contact between the said portion of the tape and portions of the cassette defining the well.

2. An apparatus as claimed in claim 1, in which the movable tape guide means and the means for mounting and moving said tape guide means comprises:

(a) movable exit and entry tape guide means, and means for mounting and moving said exit and entry tape guide means into the well of the cassette to contact the outside face of the tape at two locations and to remain in the well while the tape is extracted, the tape guide means being adapted to hold exit and entry portions of the tape which are displaced outwardly from a normal position of the tape in the cassette to be clear of the cassette to prevent undesirable contact between the said exit and entry portions of the tape and portions of the cassette defining the well.

3. An apparatus as claimed in claim 2 in which:

(a) the entry and exit guide means are mounted for linear movement in a direction generally perpendicular to the processing edge of the cassette.

4. An apparatus as claimed in claim 3 in which:

(a) the pad lifter cooperates with at least one of the exit or entry tape guide means for linear movement therewith inwardly into and outwardly from the wall of the cassette.

5. An apparatus as claimed in claim 1 in which:

(a) the tape holder has an outer portion which is rotatable between extended and retracted positions, and (b) the tape holder has a holder stop means for limiting movement of the outer portion of the tape holder in the extended position thereof, so that in the extended position the outer portion of the tape holder is parallel to the axes of the cassette, and in the retracted position the outer portion of the tape holder is generally normal to the axes of the cassette.

6. An apparatus as claimed in claim 1 in which:

(a) the tape shifter moving means can locate the tape holder in a final operative position for processing the tape so that most of the extracted length of tape is non-perpendicular to the processing edge of the cassette.

7. An apparatus as claimed in claim 1 in which:

(a) the pad lifter has a contact portion having a pair of arms having respective contact faces which are obliquely inclined with respect to each other and to the pressure pad so as to generate self-centering forces between the pressure pad and the pad lifter.

8. An apparatus as claimed in claim 1 in which:

(a) the pad lifter is mounted on the tape shifter for concurrent movement therewith inwardly into and outwardly away from the cassette well.

9. An apparatus as claimed in claim 1 in which:

(a) the pad lifter has a support portion extending from the outer portion of the tape shifter, and a contact portion extending from the support portion, and (b) spacing between the contact portion and the outer end of the tape shifter is greater than a corresponding spacing between the tape holder and the outer end of the tape shifter.

10. An apparatus as claimed in claim 7 in which:

(a) the spacings between the outer end of the tape shifter and both the pad lifter and the tape holder are measured along the tape holder axis.

11. An apparatus as claimed in claim 1 in which:

(a) the pad lifter has a support portion extending from the outer portion of the tape shifter, and a contact portion extending from the support portion, (b) the contact portion has a pair of arms extending generally normally to the tape holder axis, the arms having oppositely facing inner edges spaced apart at a width greater than the width of the tape to accept the tape passing therebetween and less than the width of the pressure pad of the cassette, (c) the support portion has a pair of legs extending generally parallel to the tape holder axis, outer ends of the legs being connected to the arms of the contact portion so as to be spaced apart at a width greater than the width of the tape to accept the tape passing therebetween when the tape passes around the tape holder, (d) the tape holder has an outer portion to receive the extracted portion of tape, the outer portion of the tape holder having a length at least equal to spacing between adjacent arms or adjacent legs of the pad lifter, so that the tape holder has sufficient length so that the arms of the contact portion and the legs of the support portion extend adjacent to the tape holder and perpendicularly thereto so as to assist in holding the tape on the tape holder.

12. An apparatus as claimed in claim 1 in which:

(a) the inner portion of the tape shifter has a shifter hinge means to permit rotation of the inner portion about a shifter hinge axis disposed parallel to the axes of rotation of cassette reels of the cassette, and disposed normally to the holder axis of the tape holder, (b) the tape shifter moving means is a tape shifter rotating means for rotating the inner portion of the tape shifter about the shifter hinge axis.

13. An apparatus as claimed in claim 1 in which:

(a) the tape shifter and tape holder are mounted for linear movement in a direction generally perpendicular to the processing edge of the cassette.

14. An apparatus as claimed in claim 11 in which:

(a) the holder axis of the tape holder is disposed perpendicularly to the processing edge of the cassette, (b) the tape holder is mounted for linear movement with the tape shifter along the holder axis.

15. An apparatus as claimed in claim 11 further including:

(a) a magnetic head mounted for linear movement in a direction generally perpendicular to the processing edge of the cassette.

16. An apparatus as claimed in claim 11 in which:

(a) the pad lifter is mounted for linear movement in a direction generally perpendicular to the processing edge of the cassette.

17. A method of processing a tape of a data bearing tape cassette having a cassette body and a pair of cassette reels carrying the tape, the body having a processing edge having a cassette center well to provide access to the tape and a pressure pad within the cassette well adapted to contact a length of the tape extending across the well, the method including the steps of:
  (a) displacing the pressure pad inwardly into the cassette well so as to provide a clearance space between an inside face of the tape and the pressure pad of a size sufficient to permit extraction of the tape from the well,
  (b) passing a tape holder in a retracted position inwardly into the well between an edge of the tape and an oppositely facing portion of the well of the cassette body, so that the tape holder is located adjacent the clearance space between the tape and the pad,
  (c) rotating the tape holder about a holder axis disposed normally to axes of rotation of the cassette reels so as to extend and position the tape holder in the clearance space between the pressure pad and the inside face of a portion of the tape,
  (d) positioning a movable tape guide means into the well to contact an outside face of the tape at at least one location,
  (e) moving the tape holder outwardly from the cassette well so that the tape holder draws an extracted length of tape from the well of the cassette body for processing, and
  (f) maintaining the said movable tape guide means in the well while the tape is extracted to prevent undesirable contact of the extracted length of the tape with portions of the cassette body defining the well.

18. A method as claimed in claim 17 further characterized by:
  (a) prior to displacing the pressure pad, applying tension to the tape so that the tape extends in an essentially straight line across the center well.

19. A method as claimed in claim 17 further characterized by:
  (a) displacing the pressure pad by providing a pad lifter which enters the cassette well,
  (b) contacting the pressure pad with the pad lifter adjacent opposite side edges of the pressure pad, at positions spaced outwardly from edges of the tape extending across the pad.

20. A method as claimed in claim 19 further characterized by:
  (a) generating self-centering forces between the pressure pad and the pad lifter by contacting the pressure pad with obliquely inclined faces of the pad lifter.

21. A method as claimed in claim 19 further characterized by:
  (a) while moving the tape holder outwardly from the well, assisting in maintaining the tape positioned on the tape holder by passing the tape between leg portions of the pad lifter.

22. A method as claimed in claim 17 in which the said steps (d) and (f) relating to the tape guide means are further characterized by:
  (a) prior to displacing the tape outwardly from the cassette well, moving and positioning exit and entry tape guide means into the well to contact an outside face of the tape at two locations and to remain in the well while the tape is extracted to prevent undesirable contact of the exit and entry portions of the tape with portions of the cassette body defining the well.

23. A method as claimed in claim 17 further characterized by:
  (a) while the tape holder carrying the extracted length of tape is immediately adjacent the cassette, guiding an initial movement of the tape holder so as to be generally perpendicular to a processing edge of the cassette, and
  (b) locating the tape holder in a final operative position for processing the tape so that most of the extracted length of the tape is non-perpendicular to the processing edge of the cassette.

24. A method as claimed in claim 17 further characterized by:
  (a) concurrently moving the tape holder and the pad lifter into the well so as to displace the pressure pad essentially concurrently with passing the tape holder into the well.

25. A method as claimed in claim 17 further characterized by:
  (a) moving the tape holder by a tape shifter rotating an inner portion of a tape shifter cooperating with the tape holder about a shifter hinge axis disposed parallel to axes of rotation of the cassette reels.

26. A method as claimed in claim 17 further characterized by:
  (a) moving the tape holder by moving a tape shifter cooperating with the tape holder linearly in a direction generally perpendicular to the processing edge of the cassette.

27. A method as claimed in claim 26 further characterized by:
  (a) moving the tape shifter along the holder axis of the tape holder.

28. A method as claimed in claim 26 further characterized by:
  (a) moving a magnetic head linearly and generally perpendicularly to the processing edge of the cassette concurrently with movement of the tape holder.

29. A tape processing apparatus for a data bearing tape cassette having a center well in a processing edge thereof to provide access to the tape and a pressure pad within the well, the apparatus comprising:
  (a) a tape holder rotatable about a holder axis between retracted and extended positions of the tape holder, the holder axis being disposed normally to axes of rotation of cassette reels of the cassette,
  (b) tape shifter means for mounting and shifting the tape holder between an inserted position of the tape shifter adjacent a length of tape within the cassette center well, and an extended and final operative position of the tape shifter in which the tape is extracted or displaced outwardly of the well,
  (c) a pad lifter, and a pad lifter mounting and moving means for mounting and moving the pad lifter into the cassette well to displace the pressure pad inwardly into the cassette well from an inside face of the tape to provide a clearance space between the inside face of the tape and the pad lifter of a size sufficient to receive the tape holder,
  (d) sequencing means for controlling a sequence of operation of the tape shifter means, the tape holder, and the pad lifter, the sequence of operation comprising: moving the pad lifter so as to displace the pressure pad into the center well so as to provide the clearance space between the inside face of the tape and the pad lifter to receive the tape holder; moving the tape shifter means to shift the retracted tape holder generally perpendicularly to the processing edge inwardly into the well of the cassette body to position the tape holder adjacent the clearance space between the tape and the pad lifter; rotating the tape holder about the holder axis from the retracted to the extended position thereof to position the tape holder in the clearance space between the pressure pad and the inside face of the tape; and moving the tape shifter means to shift the tape holder initially generally perpendicularly to the processing edge of the cassette outwardly of the well to draw an extracted length of the tape from the well, and (e) a movable tape guide means to contact the tape at at least a single location, and means for mounting and moving said tape guide means into the well of the cassette to contact an outside face of the tape at at least the said single location, and to remain in the well while the tape is extracted, the tape guide means being adapted to hold at least a single portion of tape which is displaced outwardly from a normal position of the tape in the cassette to be clear of the cassette to prevent undesirable contact between the said portion of the tape and portions of the cassette defining the well.

30. An apparatus as claimed in claim 29 in which the sequencing means further comprises:
 (a) means for positioning the tape holder in a final operative position thereof in which most of the extracted length of tape extending from the cassette well is inclined non-perpendicularly to the processing edge of the cassette.

31. An apparatus as claimed in claim 29 in which the movable tape guide means and the means for mounting and moving said tape guide means comprises:
 (a) movable exit and entry tape guides means, and means for mounting and moving the said tape guide means into the cassette well prior to extraction of the length of tape from the cassette well to contact the outside face of the tape at two locations and to remain in the well while the tape is extracted to prevent undesirable contact between the extracted length of the tape and the cassette body.

32. An apparatus as claimed in claim 29 in which:
 (a) the tape holder has an outer portion which is rotatable between an extended position parallel to the axes of rotation of the cassette reels, and a retracted position perpendicular to the said axes.

33. An apparatus as claimed in claim 29 in which:
 (a) the pad lifter is mounted on the tape shifter for concurrent movement therewith inwardly into and outwardly away from the cassette well.

34. An apparatus as claimed in claim 29 in which:
 (a) the tape shifter is mounted for linear movement in a direction generally perpendicular to the processing edge of the cassette.

35. A method of processing a tape of a data bearing tape cassette having a cassette body and a pair of cassette reels carrying the tape, the body having a processing edge having a center well, and a pressure pad within the well adapted to contact a length of the tape extending across the well; the method including the steps of:
 (a) displacing the pressure pad into the well so as to provide a clearance space between an inside face of the tape and the pressure pad of a size sufficient to permit extraction of the tape from the well,
 (b) moving a tape holder in a retracted position thereof generally perpendicularly to the processing edge into the well to position the tape holder adjacent the clearance space between the tape and the pad,
 (c) rotating the tape holder about a holder axis disposed normally to axes of rotation of the cassette reels to locate the tape holder in an extended position thereof and to position the tape holder between the pad and the inside face of the tape,
 (d) prior to extracting the tape from the well, positioning a movable tape guide means into the well to contact an outside face of the tape at at least one location,
 (e) moving the tape holder outwardly from the cassette well so what the tape holder draws an extracted length of tape from the well of the cassette body processing, and
 (f) maintaining the said movable tape guide means in the well while the tape is extracted to prevent undesirable contact of the extracted length of the tape with portions of the cassette body defining the well.

36. A method as claimed in claim 35 further characterized by:
 (a) initially moving the tape holder generally perpendicularly to the processing edge of the cassette and outwardly of the well to draw an extracted length of tape from the cassette,
 (b) moving the tape holder to a final operative position in which most of the extracted length of tape is inclined non-perpendicularly to the processing edge of the cassette.

37. A method as claimed in claim 35 in which the said steps (d) and (f) relating to the tape guide means are further characterized by:
 (a) inserting exit and entry tape guide means into the cassette well to contact an outside face of the tape at two locations and to remain in the well during tape extraction to prevent undesirable contact between the extracted length of the tape and the cassette body.

* * * * *